(12) United States Patent
Czerwinski et al.

(10) Patent No.: US 12,540,372 B2
(45) Date of Patent: Feb. 3, 2026

(54) TITANIA BASED GENERATORS FOR AC-225 GENERATION

(71) Applicant: TerraPower Isotopes, LLC, Bellevue, WA (US)

(72) Inventors: Ken Czerwinski, Seattle, WA (US); Sayandev Chatterjee, Redmond, WA (US); Zuolei Liao, Redmond, WA (US); Pyoungchung Kim, Mill Creek, WA (US); Vladislav P. Vlasenko, Woodinville, WA (US); Russell C. Ludwig, Seattle, WA (US); Christopher P. Dunckley, Seattle, WA (US)

(73) Assignee: TerraPower Isotopes, LLC, Bellevue, WA (US)

( * ) Notice: Subject to any disclaimer, the term of this patent is extended or adjusted under 35 U.S.C. 154(b) by 892 days.

(21) Appl. No.: 17/725,409

(22) Filed: Apr. 20, 2022

(65) Prior Publication Data

US 2022/0339292 A1 Oct. 27, 2022

Related U.S. Application Data

(60) Provisional application No. 63/284,941, filed on Dec. 1, 2021, provisional application No. 63/177,037, filed on Apr. 20, 2021.

(51) Int. Cl.
*C22B 60/02* (2006.01)
*A61K 45/06* (2006.01)
*A61K 47/68* (2017.01)
*A61P 35/00* (2006.01)

(52) U.S. Cl.
CPC .......... *C22B 60/0295* (2013.01); *A61K 45/06* (2013.01); *A61K 47/6851* (2017.08); *A61P 35/00* (2018.01)

(58) Field of Classification Search
None
See application file for complete search history.

(56) References Cited

U.S. PATENT DOCUMENTS

| | | |
|---|---|---|
| 2,854,992 A | 10/1958 | Hewitt |
| 4,296,785 A | 10/1981 | Vitello et al. |
| 4,454,106 A | 6/1984 | Ganso et al. |
| 4,472,509 A | 9/1984 | Gansow |
| 4,663,129 A | 5/1987 | Atcher et al. |
| 4,732,864 A | 3/1988 | Tolman |
| 4,828,991 A | 5/1989 | Hanna et al. |
| 4,833,329 A | 5/1989 | Quint et al. |
| 4,923,985 A | 5/1990 | Gansow et al. |
| 5,038,046 A | 8/1991 | Norman et al. |
| 5,246,691 A | 9/1993 | Geerlings et al. |
| 5,254,328 A | 10/1993 | Herscheid et al. |
| 5,355,394 A | 10/1994 | van Geel et al. |
| 5,428,154 A | 6/1995 | Gasnow et al. |
| 5,457,323 A | 10/1995 | Geerlings et al. |
| 5,641,471 A | 6/1997 | Geerlings et al. |
| 6,403,771 B1 | 6/2002 | Geerlings |
| 6,899,864 B2 | 5/2005 | Hnatowich et al. |
| 6,995,247 B2 | 2/2006 | Brechbiel et al. |
| 7,087,206 B2 | 8/2006 | Bond et al. |
| 7,211,231 B2 | 5/2007 | Sylvester et al. |
| 7,347,936 B2 | 3/2008 | Iwata |
| 7,402,385 B2 | 7/2008 | Dadachova et al. |
| 7,547,441 B2 | 6/2009 | Ranson et al. |
| 7,632,927 B2 | 12/2009 | Allen et al. |
| 7,794,691 B2 | 9/2010 | Morgenstern et al. |
| 7,812,190 B2 | 10/2010 | Bolskar et al. |
| 7,998,934 B2 | 8/2011 | Ranson et al. |
| 8,540,965 B2 | 9/2013 | Scheinberg et al. |
| 8,697,031 B2 | 4/2014 | Ai et al. |
| 8,781,055 B2 | 7/2014 | Toth et al. |
| 9,035,023 B2 | 5/2015 | Maecke et al. |
| 9,056,141 B2 | 6/2015 | Xu et al. |
| 9,202,600 B2 | 12/2015 | Ravn et al. |
| 9,216,154 B2 | 12/2015 | Bossmann et al. |
| 9,242,016 B2 | 1/2016 | Robertson et al. |
| 9,266,924 B2 | 2/2016 | Demmer et al. |

(Continued)

FOREIGN PATENT DOCUMENTS

| | | |
|---|---|---|
| CN | 104415799 A | 3/2015 |
| DE | 102006008023 | 5/2008 |

(Continued)

OTHER PUBLICATIONS

Kandil, A. T. Synthesis of Amorphous Titanium Phosphate using Dihydrate Wet-Process Phosphoric Acid, Sep. 17, 2017, Science Pub, 15(10), 57-64 (Year: 2017).*
McAlister, D. R. Chromatographic generator systems for the actinides and natural decay series elements, Oct. 17, 2010, De Gruyter, 99, 151-159 (Year: 2010).*
Understanding and Using Acids. Jul. 5, 2019. accessed at https://conductscience.com/understanding-and-using-acids/ on Sep. 29, 2023. pp. 1-12 (Year: 2019).*
Aliev, R. Isolation of Medicine-Applicable Actinium-225 from Thorium Targets Irradiated by Medium-Energy Protons, Jun. 6, 2014, Taylor & Francis, 32(5), 468-477 (Year: 2014).*
Abrao, Alcidio, Preparation of Highly Pure Thorium Nitrate Via Thorium Sulfate and Thorium Peroxide, J. Alloys Compd 2001, 323-324, 53-56.

(Continued)

*Primary Examiner* — Noble E Jarrell
(74) *Attorney, Agent, or Firm* — Merchant and Gould, PC

(57) ABSTRACT

In one aspect, the technology relates to a method of producing Ac, the method including preparing a phosphate-modified titania material to produce an ion-exchange material, contacting a solution including $^{229}$Th with the ion-exchange material to produce a Th-loaded titania material, eluting the Th-loaded titania material with a wash solution to produce an eluted solution containing eluted compounds including $^{225}$Ac, concentrating the eluted solution to generate eluted compounds including the $^{225}$Ac, and separating the $^{225}$Ac from the eluted compounds.

16 Claims, 31 Drawing Sheets

(56) References Cited

U.S. PATENT DOCUMENTS

| | | | |
|---|---|---|---|
| 9,290,421 | B2 | 3/2016 | Gestin et al. |
| 9,463,256 | B2 | 10/2016 | Lub et al. |
| 9,486,547 | B2 | 11/2016 | Essler |
| 9,550,001 | B2 | 1/2017 | Tworowska et al. |
| 9,629,927 | B2 | 4/2017 | Scheinberg et al. |
| 9,782,500 | B2 | 10/2017 | Bonsdorff et al. |
| 9,951,399 | B2 | 4/2018 | Fassbender et al. |
| 9,976,137 | B2 | 5/2018 | Scheinberg et al. |
| 10,093,741 | B1 | 10/2018 | Burak et al. |
| 2006/0039858 | A1 | 2/2006 | Dadachova et al. |
| 2006/0058218 | A1 | 3/2006 | Syud et al. |
| 2006/0062728 | A1 | 3/2006 | Brogan |
| 2006/0072698 | A1 | 4/2006 | Morgenstern et al. |
| 2007/0009409 | A1 | 1/2007 | Gali et al. |
| 2007/0009427 | A1 | 1/2007 | Syud et al. |
| 2007/0009428 | A1 | 1/2007 | Syud et al. |
| 2007/0224115 | A1 | 9/2007 | Barr et al. |
| 2008/0107598 | A1 | 5/2008 | Yang et al. |
| 2009/0311174 | A1 | 12/2009 | Allen |
| 2010/0081799 | A1 | 4/2010 | Knor et al. |
| 2010/0178244 | A1 | 7/2010 | Arnsdorf et al. |
| 2010/0178245 | A1 | 7/2010 | Arnsdorf et al. |
| 2010/0240072 | A1 | 9/2010 | Wester et al. |
| 2010/0322855 | A1 | 12/2010 | Chong |
| 2011/0027172 | A1 | 2/2011 | Wang et al. |
| 2011/0085974 | A1 | 4/2011 | Chung et al. |
| 2011/0112293 | A1 | 5/2011 | Cyr et al. |
| 2011/0189088 | A1 | 8/2011 | Xu et al. |
| 2012/0034161 | A1 | 2/2012 | Robillard et al. |
| 2012/0039803 | A1 | 2/2012 | Robillard et al. |
| 2012/0325052 | A1* | 12/2012 | Rosch ............... G21G 1/001 266/168 |
| 2013/0163707 | A1 | 6/2013 | Habs et al. |
| 2014/0039153 | A1 | 2/2014 | Wester et al. |
| 2014/0093450 | A1 | 4/2014 | Robillard et al. |
| 2015/0202336 | A1 | 7/2015 | Peterson et al. |
| 2015/0297761 | A1 | 10/2015 | Caravan et al. |
| 2015/0306257 | A1 | 10/2015 | Ramdahl |
| 2015/0343099 | A1 | 12/2015 | Scholz |
| 2015/0344508 | A1 | 12/2015 | Wilson et al. |
| 2016/0189816 | A1 | 6/2016 | Czerwinski et al. |
| 2016/0235870 | A1 | 8/2016 | Chong |
| 2016/0303134 | A1 | 10/2016 | Liu et al. |
| 2016/0303136 | A1 | 10/2016 | Liu |
| 2016/0354313 | A1 | 12/2016 | De Beer |
| 2017/0065732 | A1 | 3/2017 | Srinivas et al. |
| 2017/0173172 | A1 | 6/2017 | Mangraviti et al. |
| 2017/0216773 | A1 | 8/2017 | Schultz et al. |
| 2017/0258936 | A1 | 9/2017 | Berkman et al. |
| 2017/0296684 | A1 | 10/2017 | Driver et al. |
| 2017/0297912 | A1 | 10/2017 | Scheinberg et al. |
| 2017/0342151 | A1 | 11/2017 | Ferrone et al. |
| 2017/0354744 | A1 | 12/2017 | Evans et al. |
| 2017/0360956 | A1 | 12/2017 | Butlin et al. |
| 2017/0368005 | A1 | 12/2017 | Babich et al. |
| 2018/0047474 | A1 | 2/2018 | O'Hara |
| 2018/0110888 | A1 | 4/2018 | Scholz |

FOREIGN PATENT DOCUMENTS

| | | | | |
|---|---|---|---|---|
| GB | 1282594 | A | 7/1972 | |
| WO | 2002015943 | | 2/2002 | |
| WO | WO-02067999 | A2 * | 9/2002 | .......... A61K 51/0482 |
| WO | WO-2015175056 | A2 * | 11/2015 | ............. F01D 5/141 |
| WO | WO-2019113031 | A1 * | 6/2019 | ............. A61K 31/10 |
| WO | 2019183724 | | 10/2019 | |

OTHER PUBLICATIONS

Apostolidis, et al., "Production of Ac-225 from Th-229 for Targeted _α_therapy" Anal. Chem., Oct. 1, 2005, pp. 6288-6291, vol. 77.

Bobtelsky, M., Thorium Citrate Complexes, their Composition, Structure and Behavior, J. Am. Chem. Soc. 1954, 76, 6, 1536-1539, 4 pages.

Department of Health TerraPower RAM License Amendment, RAM License L-0250, Mar. 20, 2020.

Fitzsimmons, Jonathan, et al., Optimization of Cation Exchange for the Separation of Actinium-225 from Radioactive Thorium, Radium-223 and Other Metals, Molecules 2019, 24, 1921; doi:10.3390/molecules24101921; www.mdpi.com/journal/molecules.

Hopkins, Phillip D., Synthesis and Radiometric Evaluation of Diglycolamide Functionalized Mesoporous Silica for the Chromatographic Separation of Actinides Th, Pa and U, Dalton Transactions Journal 2018, 47, 5189-5195, 7 pages.

Mastren, et al., Separation of 103Ru from a Proton Irradiated Thorium Matrix: A Potential Source of Auger Therapy Radionuclide 103mRh.

Mastren, Tara, Simultaneous Separation of Actinium and Radium Isotopes from a Proton Irradiated Thorium Matrix, Scientific Reports 7, 8216, Published online: Aug. 15, 2017; 7 pages.

McAlister, Daniel R., Selective Separation of Radium and Actinium from Bulk Thorium Target Material on Strong Acid Cation Exchange Resin from Sulfate Media, Applied Radiation and Isotopes. 2018, 140, 18-23.

Morgenstern, et al., An Overview of Targeted Alpha Therapy with 225 Actinium and 213 Bismuth, Current Radiopharmaceuticals, 2018, 11, 200-208.

Negron-Mendoza, A., Gamma Irradiation of Isocritric and Citric Acid in Aqueous Solution: Relevance in Prebiotic Chemistry, AIP Conference Proceedings 1671, 020012 (2015); https://doi.org/10.1063/1.4927189, Published Online: Jul. 31, 2015.

Robertson, et al., Development of 225 Ac Radiopharmaceuticals: TRIUMF Perspectives and Experiences, Current Radiopharmaceuticals, 2018, 11, 156-172.

Tsoupko-Sitnikov, V., Generator of Actinium-225, Journal of Radioanalytical and Nuclear Chemistry, Articles, vol. 205, No. 1 (1996) 75-83, 9 pages.

Tsuneki Ichikawa & Zenji Hagiwara (1973) Effect of Gamma-Irradiation on Cation Exchange Resin, Journal of Nuclear Science and Technology, 10:12, 746-752, DOI: 10.1080/18811248.1973.9735486; https://doi.org./1.1080/1881-1248.1973.9735486.

Van Cleve, et al., Thorium-229 Generator Production of Actinium-225 at Oak Ridge National Laboratory, Proceedings from the TAT11/Journal of Medical Imaging and Radiation Sciences 50 (2019) S11-S12, two pages.

Yang, Sen Ion-Imprinted Mesoporous Silica for Selective Removal of Uranium from Highly Acidic and Radioactive Effluent, Applied Materials & Interfaces (ACS), 2017, 9, 29337-29344, 8 pages.

Zielinska, et al., "An Improved Method for the Production of Ac-225/Bi-213 from Th-229 for Targeted Alpha Therapy" Solvent Extraction and Ion Exchange, Apr. 17, 2007, pp. 339-349, vol. 25, Taylor & Francis Group, LLC, Abingdon, United Kingdom.

PCTUS2022025631 International Search Report and Written Opinion. Sep. 29, 2022, 23 pages.

Ulstrup, J., "Methods of Separating the Actinide Elements" Atomic Energy Review, vol. 4, No. 4, Jan. 1, 1966, pp. 3-82, XP001269448, p. 8.

Geerlings M.W. et al., The Feasibility of 225 AC as a Source of Alpha-Particles in Radioimmunotherapy, Nuclear Medicine Communications, Lippincott Williams & Wilkins, US, vol. 14, No. 121, Jan. 1, 1993, pp. 121-125, Figures 1-2.

Miederer M. et al., "Realizing the potential of the Actinium-225 radionuclide generator in targeted alpha particle therapy applications", Advanced Drug Delivery Reviews, Elsevier, Amsterdam, NL, vol. 60, No. 12, Sep. 15, 2008, pp. 1375-1378, section 4.2, figure 2.

Qin X, et al., "Enhanced photoctalytic activity for degrading Rhodamine B solution of commercial Degussa P25 TiO "2 and its mechanisms", Journal of Hazardous Materials, Elsevier, Amsterdam, NL, vol. 172, No. 2-3, Dec. 30, 2009, pp. 1168-1174.

* cited by examiner

TITANIA BASED GENERATORS FOR AC-225 GENERATION

RELATED APPLICATIONS

This application claims the benefit of U.S. Provisional Application Nos. 63/177,037, filed Apr. 20, 2021, and 63/284,941, filed Dec. 1, 2021, which applications are hereby incorporated by reference.

INTRODUCTION

Alpha-emitting radionuclides offer promise as radiotherapeutic agents in the treatment of a wide and diverse range of malignancies. The high energies of alpha particles make them capable of destroying malignant tumors, while their short penetration depth limits the extent of damage to the surrounding healthy tissues. Of interest to medical researchers is actinium (Ac) and, particularly, the 225 radioisotope of actinium ($^{225}$Ac) for use in, e.g., Targeted Alpha Therapy (TAT). An advantage of $^{225}$Ac is that it has a nearly ideal 10-day half-life, and the range of the alpha particle emitted is approximately the same size as a human cell. Ligands may be used to attach the $^{225}$Ac to the monoclonal antibodies, which are preprogrammed for targeted transmission and delivery of these alpha emitters to the diseased cells.
Titania Based Generators for Ac-225 Generation In one aspect, the technology relates to a method of producing Ac, the method including preparing a phosphate-modified titania material to produce an ion-exchange material, contacting a solution including the 229 radioisotope of thorium ($^{229}$Th) with the ion-exchange material to produce Th-loaded titania material, eluting the Th-loaded titania material with a wash solution to produce an eluted solution containing eluted compounds including $^{225}$Ac, concentrating the eluted solution to generate eluted compounds including the $^{225}$Ac, and separating the $^{225}$Ac from other radioisotopes in the eluted compounds.

In other examples of the above aspect, preparing the phosphate-modified titania material includes mixing titania with a solution to produce a diluted titania solution or slurry, stirring the diluted titania solution at while maintaining the temperature within a selected range, extracting a phosphate-modified titania from the diluted titania solution by decanting the phosphate-modified titania, washing the phosphate-modified titania to produce a washed phosphate-modified titania, drying the washed phosphate-modified titania to produce a dried phosphate-modified titania, and collecting the dried phosphate-modified titania. For example, stirring the diluted titania solution may be performed at room temperature, or at a temperature of 80° C.

In another aspect, the technology relates to a method for separating Ac from a Ra/Ac mixture, the method including concentrating the Ra/Ac mixture in a first solution, passing the Ra/Ac mixture through a first resin, adding a second solution, passing the Ra/Ac mixture through a second resin, and separating Ra from Ac to produce separated Ra and separated Ac.

In yet another aspect, the technology relates to an Ac producing generator including a first portion of the generator, a first fluid valve at the first portion of the generator, a column body including an interior chamber, a second portion of the generator, and a second fluid valve at the second portion of the generator. In other examples, the Ac producing generator may include a quartz column configuration without the first and/or second fluid valve, for example using a U-tube instead of a valve for access to the Th-loaded media.

In one aspect, the technology relates to a system for separating Ra and Ac from a Ra/Ac mixture, the system including a first separating column including a first resin and a second resin in separate portions of a first internal chamber thereof, the first separating column including a first sealable access port configured to allow adding and removal of Ra/Ac mixture and of the first resin, and a second separating column including a plurality first resins in separate portions of a second internal chamber thereof, the second separating column including a second sealable access port configured to allow adding and removal of Ra residue, Ac residue, or the second resin.

In yet another aspect, the technology relates to an Ac producing generator including a first portion of the generator, a first fluid valve at the first portion of the generator, a column body including an interior chamber, a second portion of the generator, a second fluid valve at the second portion of the generator, a first separating column including a first resin and a second resin in separate portions of a first internal chamber thereof, the first separating column including a first sealable access port configured to allow adding and removal of Ra/Ac mixture and of the first resin, and a second separating column including a plurality first resins in separate portions of a second internal chamber thereof, the second separating column including a second sealable access port configured to allow adding and removal of dried Ra residue, dried Ac residue, or the second resin.

In a further aspect, the technology relates to a method of buffering a contact solution in a column of an Ac producing generator, the method including cycling a preconditioning solution in the column at a predetermined cycling rate for a predetermined duration of time, loading a Th material in the column after the cycling at a predetermined loading rate, and washing the loaded Th material at a predetermined washing rate.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

In one aspect, the technology relates to a method of producing Ac, the method including preparing a phosphate-modified titania material to produce an ion-exchange material, contacting a solution including $^{229}$Th with the ion-exchange material to produce a Th-loaded titania material, eluting the Th-loaded titania material with a wash solution to produce an eluted solution containing eluted compounds including $^{225}$Ac, concentration the eluted solution to generate concentrated compounds including the $^{225}$AC, and separating the $^{225}$AC from the eluted compounds. In another aspect, the technology relates to a method of separating Ac from chemical and radionuclidic impurities.

Currently, $^{225}$AC is produced by the irradiation of thorium metal with a proton beam. Irradiation of thorium metal including $^{232}$Th can yield over 700 different isotopes of potential interest, including $^{225}$Ra, which decays into $^{225}$AC. The desired radionuclides can be recovered subsequently by proton irradiation by dissolving the irradiated thorium in an acidic solution, and various chromatography techniques may be used to effect a separation of the desired actinium and radium products from the thorium starting material and other spallation products.

In addition to the production of actinium and radium, the irradiation of $^{232}$Th metal creates a substantial amount of undesirable radioisotopes relatively to the desired radionuclide products. For example, radioactive isotopes of lower lanthanide elements (e.g. lanthanum and cerium) are not desirable in preparations of radioisotopes intended for use in medical applications. In addition, another undesirable radioisotope formed by irradiation of $^{232}$Th is $^{227}$AC and this isotope is very difficult to separate from $^{225}$AC leading to a $^{225}$AC product that is almost always contaminated with some amount of $^{227}$AC. Accordingly, the generation of radioisotopes such as, e.g., lower lanthanide elements, is undesirable. Thus, it may be advantageous to remove such undesirable radioactive isotopes.

Figure 1:
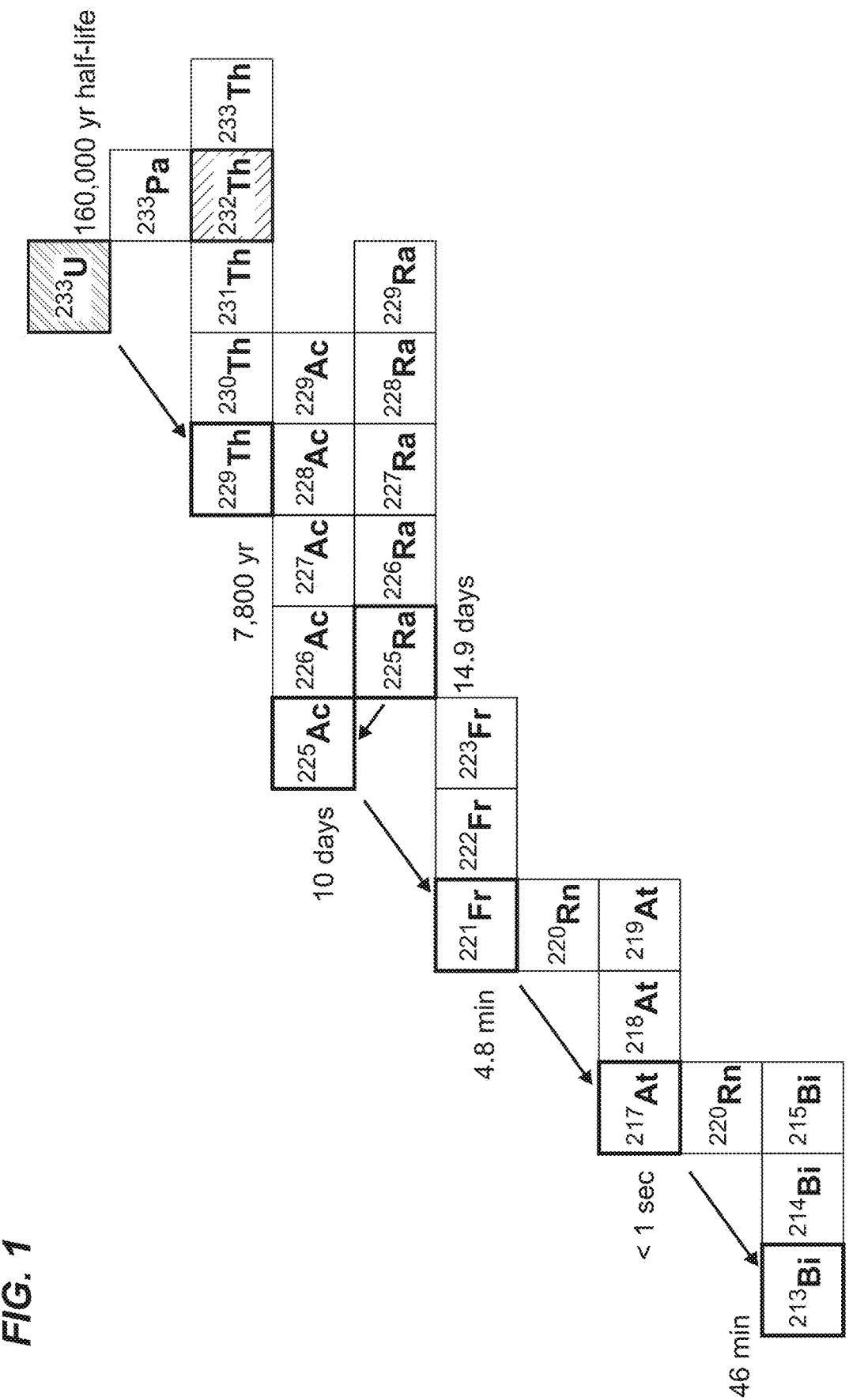
FIG. 1 is a schematic view of the decay chain of $^{233}$U to $^{229}$Th and subsequent daughters.

Examples of the principles of this disclosure include systems and methods of generating $^{225}$AC from a different isotope of Th: $^{229}$Th. In various examples, the $^{225}$AC is generated from $^{229}$Th, which originates from $^{233}$U. In addition, the $^{225}$AC product is substantially without $^{227}$AC as the 227 isotope is not in the $^{229}$Th decay chain. The natural decay of $^{229}$Th produces $^{225}$Ra, which beta decays to $^{225}$AC, as illustrated in FIG. 1 which is a schematic view of the decay chain of $^{233}$U to $^{229}$Th and subsequent daughters. As shown in FIG. 1, $^{233}$U has a half-life of 160,000 years, and it decays to $^{229}$Th. The $^{229}$Th has a half-life of 7800 years, and decays to $^{225}$Ra, which has a 14.9-day half-life. The $^{225}$Ra decays to $^{225}$AC, which has a 10-day half-life. Because of these relatively short half-lives, $^{225}$Ra and $^{225}$Ac may be harvested from the $^{229}$Th on a regular basis.

In various examples of the methods according to the present disclosure, a stock solution containing the $^{229}$Th isotope and its progenies may be contacted with an ion-exchange (IX) material that is configured to both selectively capture $^{229}$Th and selectively reject the progenies, e.g., Ra and Ac, which may remain in the contact stock solution. In the systems and methods described herein, the IX material may be or include porous titania ($TiO_2$) that is maintained or modified under conditions conducive to the selective capture of $^{229}$Th. Therefore, the example systems and methods described herein represent a configuration where the $^{229}$Th from the feedstock solution can be more readily separated from the progenies and immobilized onto a capture platform. The $^{225}$Ac can be periodically harvested by simple elution of the $^{229}$Th-loaded IX materials with a wash solution, without the requirement of comprehensive pre- or post-processing steps. Use of the IX material in a column configuration marks a robust, readily scalable, and reproducible approach without significant variation in the operational parameters.

Figure 2:
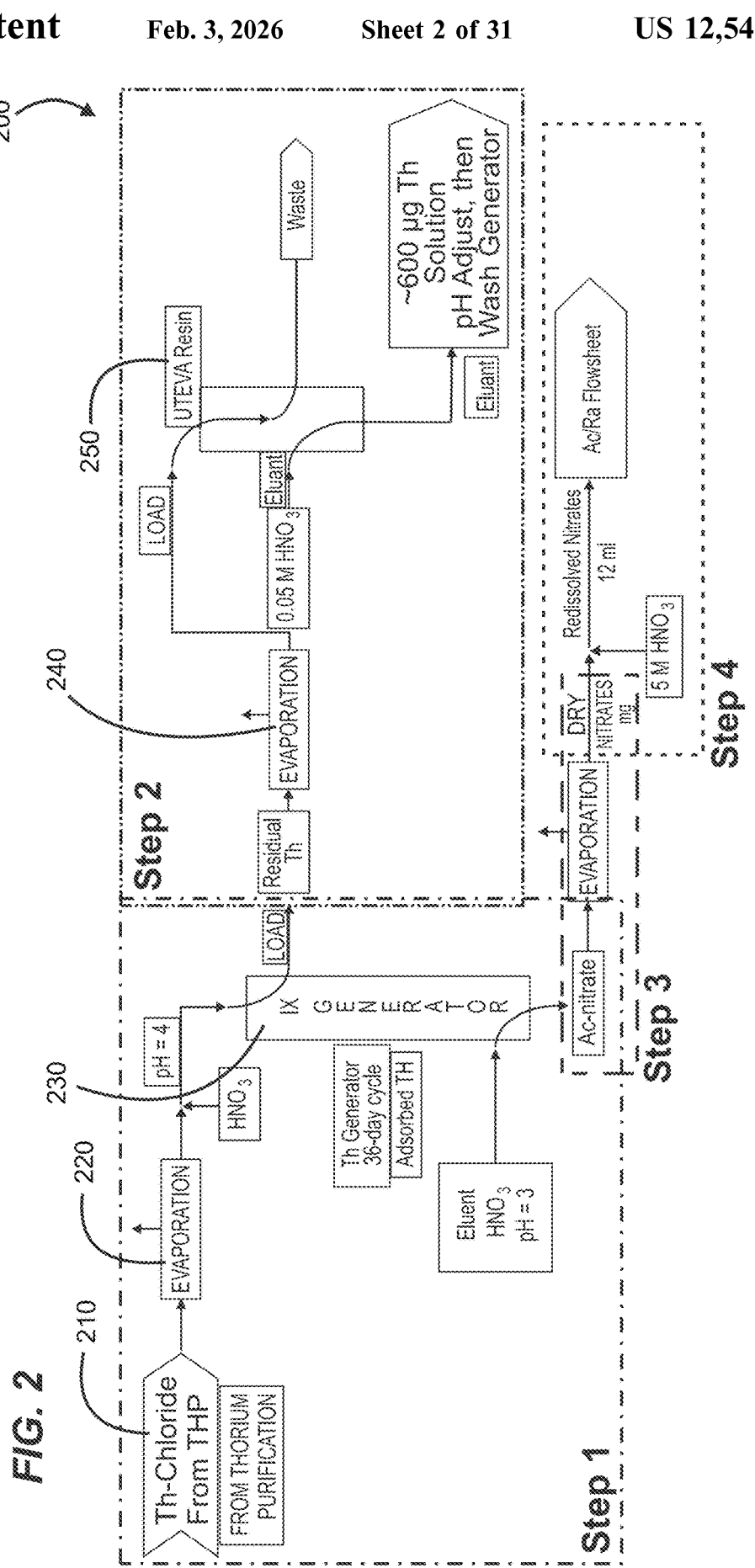
FIG. 2 is a schematic diagram of a process flow for Ac generation, in accordance with various examples of the disclosure.

FIG. 2 illustrates an example of the process flow 200 for Ac generation, according to various examples of the present disclosure. For example, the flow 200 may include at least the following:

Passage of the $^{229}$Th stock solution (post uranium parting) through the IX generator column for Th capture on the IX material and Ra/Ac elution, described as Step 1 in FIG. 2; passage of residual Th stock solution through a UTEVA (Uranium and Tetravalent Actinides) resin or other Th recovery routes if needed, described as Step 2; eluting the IX material with an eluant washing solution to remove the desired Ac from the IX generator column and evaporation of the eluted solution to concentrate the content of the eluted daughters, described as Step 3; and Ac/Ra separation in which the Ac is separated from the Ra and other eluted daughters to obtain a purified Ac solution for use in targeted alpha therapy pharmaceutical production, described as Step 4 in FIG. 2.

STEP 1: STEP 1 is a loading operation that can include a plurality of actions designed to load the $^{229}$Th onto the selective IX material. After loading, the $^{229}$Th will subsequently decay over time to generate its daughter products including $^{225}$Ac. In the embodiments described herein, the ion-exchange material includes a titania material such as, e.g., $TiO_2$, or porous $TiO_2$. In yet another example, the titania material is modified with phosphorous by mixing the titania material with a $H_3PO_4$ solution such as, e.g., a 1 M $H_3PO_4$ solution. Also, mixing the titania material with the $H_3PO_4$ solution may take place at room temperature for a duration of 16 to 45 hours. Mixing the titania material with the $H_3PO_4$ solution may also take place at a temperature of up to 80° C., and for a duration of about 5 hours. For example, a thorium-containing stock solution 210 is contacted with an ion-exchange material in a column 230. In another example, the thorium-containing stock solution is contacted with a phosphorous-modified titania material such as, e.g., phosphorous-modified $TiO_2$, or phosphorous-modified porous $TiO_2$ in the column 230. In another example, the Th stock solution may include any one or more of, e.g., $NaNO_3$, HOA (acetic acid), NaOA (sodium acetate) and $HNO_3$ (nitric acid). In another example, column 230 includes the titania material. In addition to the durations and temperatures discussed here, other durations and other temperatures may also be application. For example, mixing the titania material with the $H_3PO_4$ solution may take place at temperatures ranging from 1-100° C., such as, for example, a range of 10-90° C., from 10-30° C. or from 70-90° C. In other examples, the durations of mixing the titania material with the $H_3PO_4$ solution may be in the range of 0.1-100 hours, such as, for example from 5-50 hours, or from 10-40 hours.

The column 230, since the $^{225}Ac$ is generated within it over time as the Th decays, may be referred to as the 'generator' column, the 'actinium generator' column, the 'actinium generator' or, simply as the 'generator' 230. Although referred to as a 'column' herein, the generator 230 may take any shape including capsule-shaped (spherocylindrical), cylindrical, spherical, conical, pyramidal, frustoconical, or frustopyramidal, to name but a few. In an embodiment, the column 230 is a sealable vessel which contains the IX material (and thorium after loading) and allows the IX material to be washed with an eluant without loss of the IX material. Additional aspects of the column 230 are discussed in greater detail below.

Before being contacted in the column 230, the thorium-containing stock solution may be dried in an evaporation device 220 to increase the thorium concentration. In another example, the flow rate of the thorium-containing solution in the column 230 when contacting the titania material is in a range of 2-10 mL/h. In yet another example, at least some of the $^{229}Th$ is sorbed onto the titania material inside the column 230.

After loading the thorium on the IX material in the column 230, the IX material in the column can then be washed with a liquid solution according to STEP 3 discussed below. Because the subsequent washing removes the Ac that built up in the column 230 over time since the last washing, the act of washing is sometimes referred to as 'milking' the generator 230.

STEP 2: STEP 2 is a thorium recovery operation to ensure as little thorium as possible is lost from system. The recovery operation may include a plurality of actions designed to recover any Th material that was not successfully captured onto the IX material during the loading operation. In one embodiment of STEP 2, the contacted stock solution obtained from the column 230 after contacting with the phosphate-modified titania material is dried and then passed through a resin such as, e.g., UTEVA resin 250. After passing through the UTEVA resin 250, the thorium is recovered after elution. The drying can be performed using any known method or device. In the embodiment shown in FIG. 2, the drying is performed in an evaporation device 240.

STEP 3: STEP 3 is the milking operation in which the Ac is washed from the IX material in the column and collected. The washing may alternatively be referred to as eluting and the solution used for washing as the eluant. The milking operation may be done periodically on a schedule or at random intervals based on Ac need. In the embodiment shown, the milking operation includes a plurality of actions designed to recover the Ac material and, because Ra is also generated in the column 230 and is itself potentially valuable, the Ra material. In STEP 3, a wash solution is passed through the column to produce a solution containing the thorium daughter products $^{225}Ac$ and $^{225}Ra$. The speed at which the washing solution is passed through the column 230 may be controlled to affect the amount of Ac and Ra obtained during any particular washing operation. For example, in one embodiment the elution speed of the wash solution is in a range of 30-60 mL/h. Different eluants may be used. In another example, the eluant includes, e.g., a HOA/NaOA solution.

STEP 4: STEP 4 is a Ac/Ra separation operation in which the Ra is separated from Ac. In the embodiment shown, the separation operation includes a plurality of actions designed to separate the Ac and Ra material. In STEP 4, any $^{225}Ac$ that is produced from the elution and the evaporation is collected. For example, the $^{225}Ac$ is collected by, e.g., separating $^{225}Ac$ from $^{228}Ra$ in the concentrated eluted compounds, and collecting the separated $^{225}Ac$ from the concentrated eluted compounds. In other examples, the separated $^{228}Ra$ may also be from the concentrated eluted compounds. In examples, the recovery rate of at least one of $^{228}Ac$ and $^{228}Ra$ from the concentrated eluted compounds is greater than 96% by weight. Unless otherwise noted or it is clear from the context, when % is used herein it refers to % by weight.

In various examples, the following experimental results provide examples of the various principles of this disclosure.

EXAMPLES

In the following experimental work demonstrating the feasibility of the titania-based Ac generator, in some cases for safety, the $^{232}Th$ isotope may be used as a surrogate for the $^{229}Th$ isotope. The generator behavior exactly, or substantially, replicates across these two isotopes with no significant variations due to near identical electronic structures.

Material Synthesis

Porous titania with phosphate modified surfaces may be prepared and the synthesis conditions are summarized in Table 1A below.

Sample 1 (TP168-31-1): ~1.0 g of titania obtained from Sachtopore is mixed with 125 mL of 1.0 M $H_3PO_4$ in a beaker. The mixture is placed on a stir plate and allowed to stir at a speed of 800 rpm for 45 hours at room temperature, after which the solids are allowed to settle for 1 hour. The solution is decanted off and the residue is washed five times with 10 mL of deionized (DI) water. The washed solids are allowed to dry by placing on a hot plate at 100° C. for 1 hour. Subsequently, the dried solids are collected, analyzed, and stored for future sorption experiments. The materials are characterized by X-ray diffraction and Scanning Electron Microscopy techniques. Scaling up the process by 5-fold may keep the product unaltered. Although the above concentration of $H_3PO_4$ is described as being equal to 1.0 M, various concentrations of $H_3PO_4$ may be used. For example, the concentration of $H_3PO_4$ may be in a range of 0.1 M to 10 M, including ranges of 0.1-0.5 M, 0.5-1 M, 1-5 M and 5-10 M.

Sample 2 (TP168-31-2): In a modified procedure, the reaction is conducted at an elevated temperature where $TiO_2$ (~1.0 g, Sachtopore) and 1.0 M $H_3PO_4$ (125 mL) are allowed to react at 80° C. for 5 hours while the mixture is stirred at 800 rpm. Subsequently, the heating is discontinued, while the stirring is continued for a further 16 hours. The product is collected, washed, and dried following the same protocol as that for the Sample 1 (TP168-31-1) material. The materials are characterized by X-ray diffraction and Scanning Electron Microscopy techniques. Scaling up the process by 5-fold may keep the product unaltered. Although the above mixture speed is described as being equal to 800 rpm, other mixture speeds may be used such as, e.g., in a range of 10 rpm-2000 rpm.

Sample 3 (TP168-32-1): This synthesis followed the same protocol as that for the synthesis of Sample 1 (TP168-31-1), a difference being the stirring time limited to 21 hours instead of 45 hours. Like the other two samples, the products are characterized using X-ray diffraction and Scanning Electron Microscopy techniques.

Sample 4 (TP168-36-1): This synthesis followed the same protocol as that for the synthesis of Sample 2 (TP168-31-2), a difference being the stirring speed reduced to 300 rpm.

TABLE 1A

Synthesis details of Phosphate-modified Titania

| Material Code | Temperature (° C.) | Duration (hours) | Stirring speed (rpm) | Product particle size (μm) |
|---|---|---|---|---|
| TP168-31-1 | Room temperature | 45 | 800 | ~5-10 |
| TP168-31-2 | 80 | 5 | 800 | ~30 |
|  | Room temperature | 16 |  |  |
| TP168-32-1 | Room temperature | 21 | 800 | ~30 |
| TP168-36-1 | 80 | 5 | 300 | ~70-80 |
|  | Room temperature | 16 |  |  |

In other examples, 42.5 ml 85% $H_3PO_4$ was added to 250 ml of DI water in a 500 ml beaker to form a 2.5 M $H_3PO_4$ solution. 28.18 g of $TiO_2$ (110 μm particle size) was added to the beaker and stirred at 420 rpm with an overhead stirrer. The mixture was then heated to an internal temperature of 70° C. on top of a hotplate under stirring. After 6 hours of heating, the mixture was cooled down to room temperature and stirred for an additional of 18 hours. Then the top liquid phase was decanted, and the $TiO_2$ slurry was then washed with 50 ml DI water 4 times. 100 ml DI water was added to the beaker, and the mixture was stirred for 1 hour, then decanted, and washed with 50 ml of DI water 4 times. Repeat this stir-decant-wash cycle 4 more times. After final decant, the beaker was placed on 160° C. hotplate for 1 hour for the $TiO_2$ to dry. 27.26 g of product was recovered. The results are illustrated in Table 1B below.

TABLE 1B

Synthesis details of Phosphate-modified Titania

| $TiO_2$ | $H_3PO_4$ concentration/ volume | Stirring method | Temperature and time | Additional stirring | Wash temperature |
|---|---|---|---|---|---|
| 6.11 g | 1M, 800 ml | Magnetic | 80° C., 5 hrs | 19 hrs | R.T. |
| 15.71 g | 1.5M, 400 ml | Magnetic | 70° C., 7 hrs | 17 hrs | R.T. |
| 18.07 g | 2M, 200 ml | Magnetic | 60° C., 4 hrs | 20 hrs | R.T. |
| 11.11 g | 2M, 100 ml | Overhead | 60° C., 6 hrs | 18 hrs | R.T. |
| 28.18 g | 2.5M, 250 ml | Overhead | 70° C., 6 hrs | 18 hrs | R.T. |

TABLE 1C

Additional experiments

| $TiO_2$ | $H_3PO_4$ concentration/volume | Stirring method | Temperature and time | Additional stirring | Wash temperature | Comments |
|---|---|---|---|---|---|---|
| 5 g | 1 M, 50 ml | Overhead | 50° C., 4 hrs | 20 hrs | R.T. | Lower limit |
| 5 g | 3 M, 50 ml | Overhead | 80° C., 8 hrs | 16 hrs | R.T. | Upper limit |
| 5 g | 2 M, 50 ml | Overhead | 70° C., 6 hrs | 18 hrs | 40° C. | Hot wash |
| 5 g | 2 M, 50 ml | Overhead | 70° C., 6 hrs | 18 hrs | 60° C. | Hot wash limit |

Material Characterizations

The synthesized materials are characterized using X-ray diffraction (XRD) and Scanning Electron Microscopy (SEM). XRD data are collected on a Rigaku MiniFlex benchtop X-ray diffractometer. SEM images are collected on an FEI Quanta instrument.

Sorption Experiments

The adsorption experiments consisted of batch contact experiments to assess and provide guidance to the conditions and materials necessary to increase or maximize uptake capacity and enhance sorption kinetics.

Batch Sorption

The sorption experiments are performed in centrifuge tubes at ambient temperature and pressure conditions. To each tube, a weighted amount of the sorbent material is added, followed by addition of a Th stock solution maintained at a desired pH using a combination of $HNO_3$ and NaOH. The stock solution is made by dissolving solid $ThCl_4 \cdot xH_2O$ (MW=505.978 g) in the desired solutions. pH ranges of 2-4 are used for the experiments. The resultant mixtures are shaken for a stipulated length of time by placing the centrifuge tubes over a horizontal shaker. Subsequently, the tubes are centrifuged to allow the solids to settle down, and a small amount of the supernatant is withdrawn to determine the thorium concentration remaining in the solution phase using a combination of ICP-OES and ICP-MS. The amount of thorium sorption is expressed as a distribution coefficient $K_d$ given by equation [1]:

$$K_d = \frac{[Th]_{initial} - [Th]_{final}}{[Th]_{final}} \times \frac{V}{M} \quad [1]$$

Here, $[Th]_{initial}$ is the initial concentration of thorium in the stock solution, $[Th]_{final}$ is the final concentration in the supernatant post contact with the sorbent, M is the mass of the sorbent used and V is the volume of the contact solution. Chemical analysis to determine the kinetics of the sorption processes are also conducted where the process of withdrawal of small amounts of the supernatants is repeated on the same solutions periodically.

Column

For column experiments, various configurations are used depending upon the column size. The typical column sizes are listed in Table 2 below:

TABLE 2

Column details

| Column type | Inner diameter (mm) | Height (mm) | Bed volume (mL) |
|---|---|---|---|
| 2 mL transfer pipette | 6.5 | 40 | 1 |
| 3.5 mL syringe | 10 | 50 | 2 |
| 5 mL VWR columns | 12 | 33 | 3.7 |
| 10 mL VWR columns | 22 | 67 | 7.7-8.1 |
| 50 mL VWR columns | 26.5 | 115 | 37 |

For a typical column run, desired amount of IX material is mixed with DI $H_2O$ and packed into column. The column is then pre-conditioned as described later, if desired. Th feedstock is made by dissolving $ThCl_4 \cdot xH_2O$ solid in DI $H_2O$ or buffer solution, and subsequently the pH is adjusted with NaOH or $HNO_3$ solution. Both gravity as well as pumped flow are used for the columns. For pumped flow, mechanical syringe pumps operated by J-KEM software are used. Eluants are collected in fractions and analyzed by chemical and radiochemical methods.

Chemical Analysis

Chemical analysis on the eluants and sample solutions are performed via ICP-OES and/or ICP-MS to analyze for Th, Ti and P concentrations in the sample solutions. For these measurements, fractions of sample solutions are diluted in 2% $HNO_3$ prior to the analyses.

ICP-OES analysis is performed using a Perkin Elmer Optima 8000 ICP-OES instrument. The eluants to be analyzed are diluted in 2% $HNO_3$ such that the final concentrations of the analyzed elements (Th, Ti or P) did not exceed 100 ppm.

ICP-MS analysis is performed using an Agilent 7800 Quadrupole ICP/MS (Inductively coupled plasma/mass spectrometer, Agilent Technologies). Similar to ICP-OES, the eluants analyzed are diluted in 2% $HNO_3$, ensuring the final concentrations of the analyzed elements did not exceed ~1 ppm.

Radiochemical Analysis

Radiochemical analysis on the eluants are performed using gamma and alpha spectroscopies. Gamma spectroscopy is an effective technique in the initial assessment of effectiveness of the generator to separate Th from the Ra/Ac daughters in the feedstock, as well provide a method to assess the efficiency of periodic Ra/Ac recovery during each harvesting cycle. As discussed above, $^{232}$Th (half-life 1.4× $10^{10}$ years) may be used as the surrogate for $^{229}$Th. There are several relevant isotopes in the $^{232}$Th decay chain, including $^{228}$Ra (half-life 5.7 years), $^{228}$Ac (half-life 6.1 hours), $^{228}$Th (half-life 1.9 years) and $^{224}$Ra (half-life 3.6 days). The isotopes $^{228}$Ra and $^{224}$Ra may be good simulators for $^{225}$Ra in the Ac generator, whereas $^{228}$Ac may be used to simulate the chemical behaviors of $^{225}$Ac product. The $^{228}$Ac isotope is also advantageous in the analysis of the gamma data.

For example, the isotope $^{232}$Th may not emit gamma rays by itself, while the $^{228}$Ac isotope generated via $^{232}$Th decay process represented by equation [2] below has sufficient photopeaks for analysis by gamma spectroscopy. The relevant decay shown in equation [2] represents the decay from $^{232}$Th to $^{228}$Th ($t_{1/2}$=1.91 years). The relevant gamma peaks are shown in Table 3 (data based on IAEA isotope browser).

$$^{232}Th \rightarrow \alpha + ^{228}Ra \rightarrow \beta^- + ^{228}Ac \rightarrow ^{228}Th \quad [2]$$

TABLE 3

Tabulation of gamma spectroscopic characteristics of $^{228}$Ra and $^{228}$Ac

| Isotope | Half-life | Decay mode | Decay constant ($s^{-1}$) | Gamma energy (keV), % yield |
|---|---|---|---|---|
| $^{228}$Ra | 5.75 years | $\beta^-$ | $3.82 \times 10^{-9}$ | N/A |
| $^{228}$Ac | 6.15 hours | $\beta^-$ | $3.82 \times 10^{-9}$ | 338.3, 11.3 |
| | | | | 911.2, 25.8 |
| | | | | 969.0, 15.8 |

Therefore, the distribution between $^{232}$Th and its $^{228}$Ra and $^{228}$Ac daughters at the separation time in a sample can be determined based on the activity of the $^{228}$Ac. The 911.2 keV line is chosen for the analysis. The $^{228}$Ac present in a gamma sample is due to the original amount of separated $^{228}$Ac and the ingrowth of $^{228}$Ac from the decay of $^{228}$Ra. At any given time, the activity of $^{228}$Ac is therefore related to the initial activity of $^{228}$Ac and $^{228}$Ra from growth and decay given by equation [3].

$$^{228}Ac_t = {}^{228}Ac_o e^{-\lambda t} + {}^{228}Ra_o(1 - e^{-\lambda t}) \quad [3]$$

This necessitates the collection of multiple data points for each sample to accumulate kinetic information on the Th decay and carefully determine the $^{232}$T/$^{228}$Ra/$^{228}$Ac ratio. Therefore, data are collected shortly after the collection of the eluant from the column and subsequently after a time interval.

The gamma spectroscopy is performed with 5 mL samples loaded on the gamma detector in the sample holder and set to count for 3600 seconds or until 1000 counts are collected at the 911 keV region of interest. The collected data is copied from RPT files and transferred to Excel to be worked up. The time and date the load sample is added to the column is used as the start time of actinium and radium decay. This value is subtracted from the time and date of the gamma data collection for each sample to determine how much time has passed since the equilibrium between thorium, radium, and actinium is disturbed. From this the remaining amount of the initial actinium and the amount of actinium expected to have grown in from the radium is determined via the decay rate and growth and decay equations. Values for the initial $^{228}$Ra and $^{228}$Ac activity are determined by a least-squares fit to the experimental data.

As can be inferred from the half-lives of the $^{228}$Ra and $^{228}$Ac daughters, while gamma spectroscopy is effective for the initial evaluation of separation of $^{232}$Th from its daughters in a feedstock, it is not equally effective to monitor the effectiveness of Ra/Ac harvesting periodically from the column. This is because the long time required for $^{228}$Ra to grow into secular equilibrium from $^{232}$Th makes this process a time consuming. Therefore, alpha spectroscopy provides a second verification for the evaluation of the efficiency of periodic Ra/Ac recovery through the direct observation of $^{224}$Ra from the decay of $^{228}$Th.

Alpha spectroscopy provides an effective way to probe the periodic harvesting of the Ra/Ac daughters. An ideal way to probe the efficiency of harvesting the Ra/Ac daughters would be to evaluate the efficiency of the process from the time t=0 when Th is loaded onto the column, to the time when the Ra/Ac daughters are eluted. However, the excruciatingly long half-life of the $^{232}$Th isotope reduces or eliminates the possibility of generation of reasonable fractions of the $^{228}$Ra/$^{228}$Ac within a lifetime, and therefore precludes direct analysis of the efficiency of the harvesting process from these progenies. Therefore, an indirect technique is to be adapted.

Figure 3:
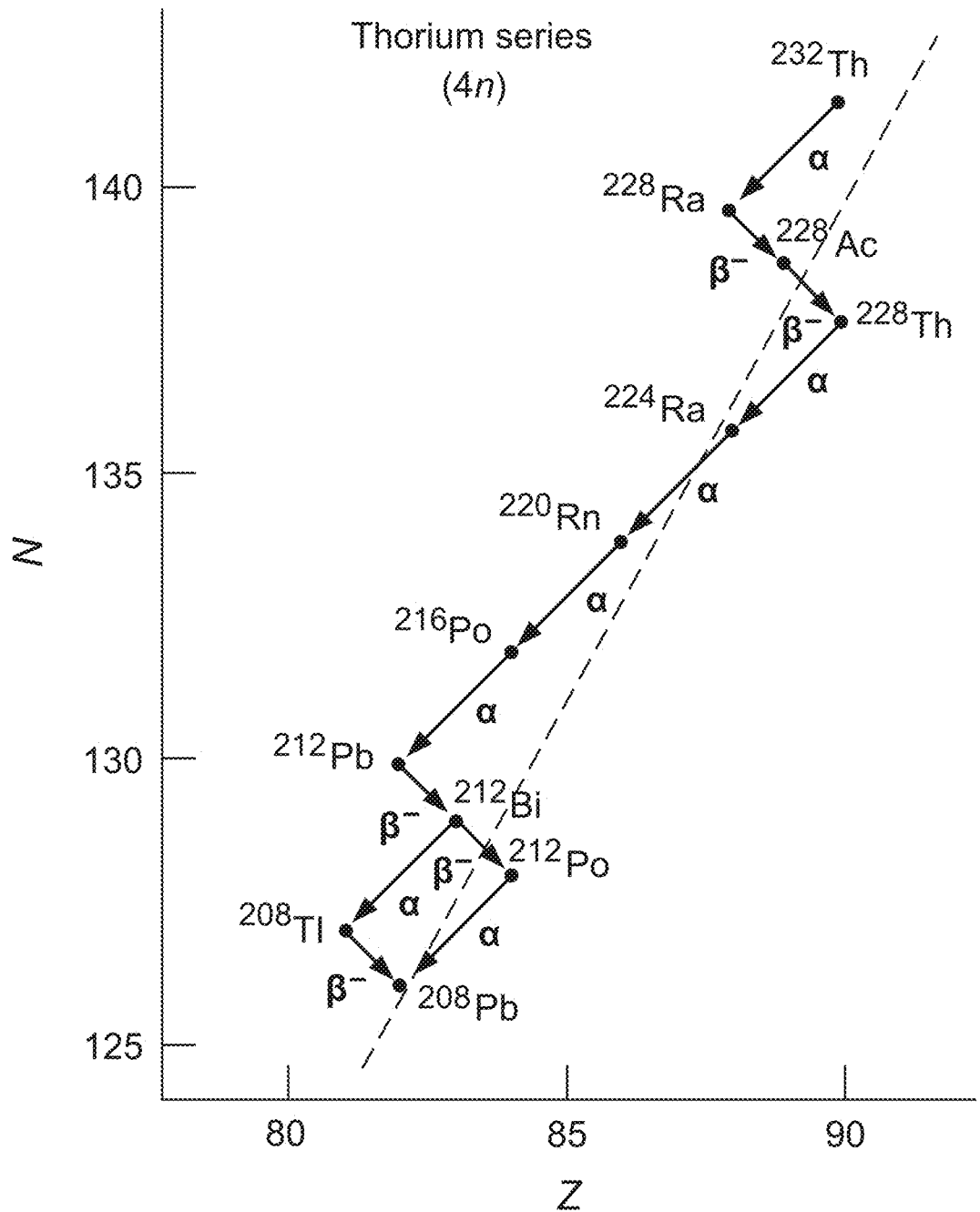
FIG. 3 is a plot illustrating the $^{232}$Th decay chain.

FIG. 3 is a plot illustrating the $^{232}$Th decay chain. For example, FIG. 3 is a plot illustrating the $^{232}$Th decay chain. The $^{228}$Th (half-life=1.9 years) is one of the decay products for the $^{232}$Th isotope, as shown in FIG. 3, and is generated along with the $^{228}$Ra and $^{228}$Ac in the feedstock. During the initial loading of the column, $^{228}$Th is anticipated to be retained in the column along with $^{232}$Th while the Ra and Ac daughters are eluted through. The $^{228}$Th isotope decays to $^{224}$Ra, and due to a relatively shorter half-life, a sufficient amount of $^{224}$Ra can be built up over a reasonable time frame of 3-4 weeks. $^{224}$Ra has distinct alpha signatures at 5.423 MeV and 5.340 MeV respectively, and therefore it provides opportunities to study Ra in-growth behaviors in periodic harvesting cycles.

Alpha spectroscopy is collected on 1 ml sample volumes collected from each of the elute batches. The 1 mL solutions are electroplated and deposited onto a stub. Counting is performed with an ORTEC alpha analysis system.

Results

Scoping Experiments with Pure Titania (TiO$_2$)

Initial scoping experiments are conducted on pure titania in order to assess the sorption behavior of Th onto pristine (unmodified) TiO$_2$, before making modifications.

Distribution Coefficients ($K_D$) of TiO$_2$ as a Function of pH

Figure 4:
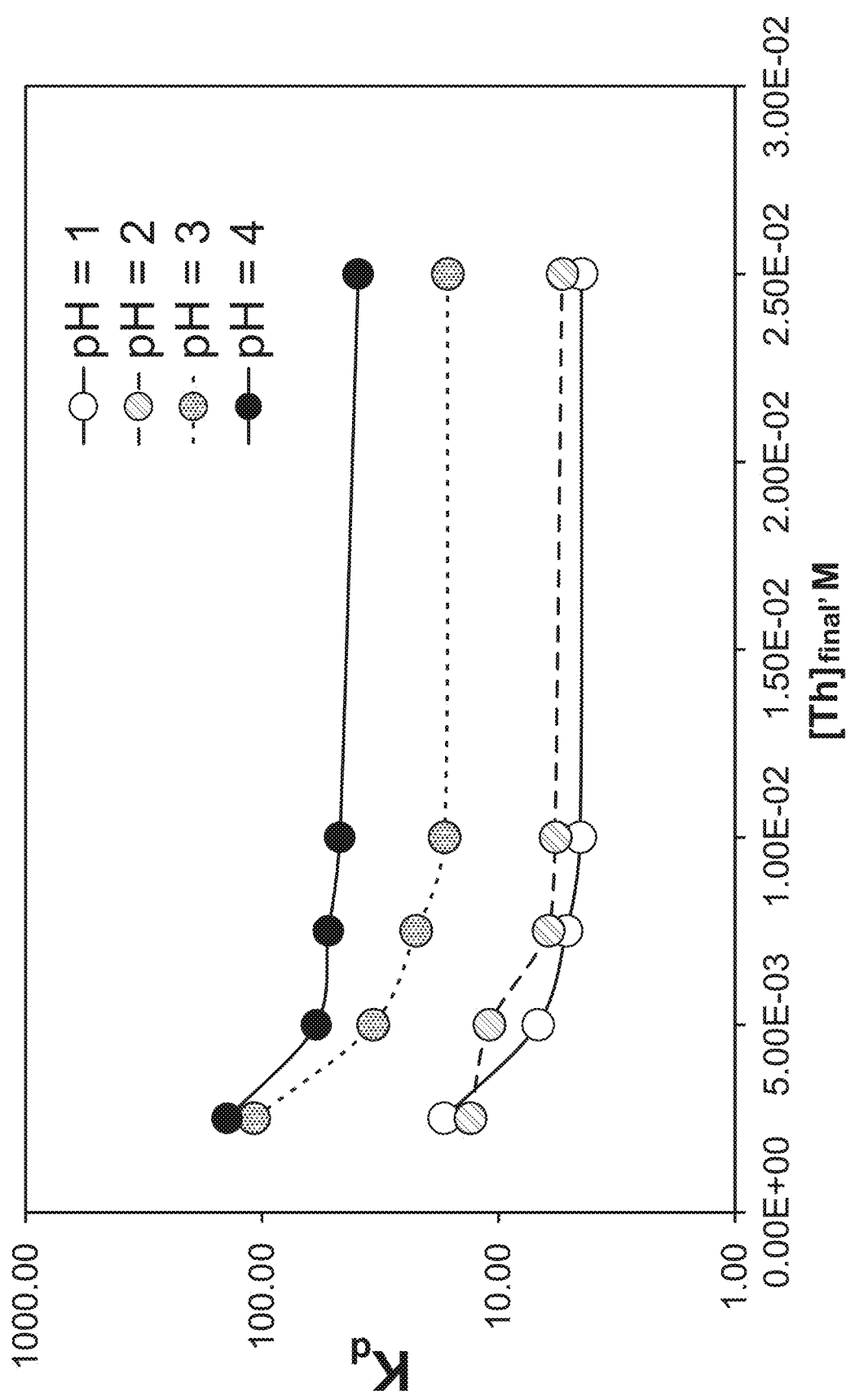
FIG. 4 is a plot illustrating the evolution of the distribution coefficient of $Th^{4+}$ uptake by as received nanoporous $TiO_2$ as a function of pH, according to various examples of the present disclosure.

FIG. 4 is a plot illustrating the evolution of the distribution coefficient of TiO$_2$ as a function of pH, according to various examples of the present disclosure. Determining the impact of pH on Th sorption by titania in order to select the appropriate pH of operation is described below. For example, the thorium sorption by titania (TiO$_2$) is measured at four different pHs, namely pHs of 1, 2, 3 and 4, respectively, as illustrated in FIG. 4. In the experiments, the amount of titania is kept constant at 50 mg while the Th concentrations are varied from 2.5×10$^{-3}$ M to 2.5×10$^{-2}$ M. It may be observed from the plot of FIG. 4 that for a given pH, the distribution coefficients $K_d$ progressively decreases as the Th concentrations are gradually raised, as also shown in Table 4 below.

In various examples, the distribution coefficient $K_d$ values increase as the pH of the stock solution increases gradually from 1 to 4, while maintaining the sorbent amount constant. Conditions are shown in Table 4, and the trends are shown in FIG. 4. Stock solutions with pHs greater than 4 typically exhibit Th precipitation as hydroxide species.

TABLE 4

Variation of $K_d$ for Th uptake by TiO$_2$ as a function of pH and Th concentrations

| TiO$_2$, g | [Th]$_{initial}$, M | pH$_{initial}$ | pH$_{final}$ | [Th]$_{final}$, M | $K_d$ |
|---|---|---|---|---|---|
| pH = 1 | | | | | |
| 0.0502 | 2.50E−03 | 1.03 | 1.09 | 2.30E−03 | 17.04 |
| 0.0504 | 5.00E−03 | 1.02 | 1.06 | 4.83E−03 | 6.83 |
| 0.0506 | 7.50E−03 | 1.04 | 1.05 | 7.34E−03 | 5.15 |
| 0.0503 | 1.00E−02 | 1.04 | 1.01 | 9.74E−03 | 4.50 |
| 0.0496 | 2.50E−02 | 1.05 | 1.04 | 2.45E−02 | 4.44 |
| 0 | 7.50E−03 | 1 | 0.92 | 7.42E−03 | NA |
| pH = 2 | | | | | |
| 0.051 | 2.50E−03 | 2.03 | 2.15 | 2.34E−03 | 13.16 |
| 0.0505 | 5.00E−03 | 2.05 | 2.15 | 4.74E−03 | 10.93 |
| 0.0513 | 7.50E−03 | 2.05 | 2.13 | 7.29E−03 | 6.16 |
| 0.0518 | 1.00E−02 | 2 | 2.06 | 9.69E−03 | 5.75 |
| 0.0515 | 2.50E−02 | 1.96 | 2.01 | 2.47E−02 | 5.38 |
| 0 | 7.50E−03 | 2.03 | 2.1 | 7.25E−03 | NA |
| pH = 3 | | | | | |
| 0.0498 | 2.50E−03 | 3.06 | 3.24 | 1.62E−03 | 108.54 |
| 0.0516 | 5.00E−03 | 3.02 | 3.14 | 4.25E−03 | 33.97 |
| 0.0512 | 7.50E−03 | 2.96 | 3.04 | 6.73E−03 | 22.34 |
| 0.0499 | 1.00E−02 | 2.95 | 2.99 | 9.24E−03 | 16.95 |
| 0.0499 | 2.50E−02 | 3.04 | 3.07 | 2.31E−02 | 16.43 |
| 0 | 7.50E−03 | 3.02 | 2.94 | 7.26E−03 | NA |
| pH = 4 | | | | | |
| 0.0514 | 2.50E−03 | 4 | 4.19 | 1.45E−03 | 141.01 |
| 0.0497 | 5.00E−03 | 4.07 | 4.1 | 3.94E−03 | 59.17 |
| 0.0513 | 7.50E−03 | 4.03 | 4.25 | 6.02E−03 | 52.45 |
| 0.0507 | 1.00E−02 | 4.01 | 3.94 | 7.69E−03 | 46.95 |
| 0.0505 | 2.50E−02 | 3.99 | 4.03 | 2.09E−02 | 39.24 |
| 0 | 7.50E−03 | 4.01 | 4.01 | 6.23E−03 | NA |

TiO$_2$ Column

In various examples, in order to tailor the column processing conditions that may increase uptake capacity and enhance sorption kinetics, column elution may be performed under systematic variation of a range of parameters that ranged from elution speed, column dimensions, pH of the Th feed as well as the preconditioning of the column material to make it suitable for improved Th uptake. The various column conditions and the Th retention results are tabulated in Table 5 below.

In various examples, the pH of the TiO$_2$/Ti—OH, as assessed by monitoring the pH of any contact solution, may undergo large variations with small changes in the feedstock pH and Th concentrations in solution. For example, this may be a consequence of the electrokinetic potential of TiO$_2$ being directly dependent upon the relative ratio of the protonated to the deprotonated forms of the surface hydroxyl groups. Within the pH range of 3-7, the relative ratio of the protonated to the deprotonated forms of the surface hydroxyl groups may be nebulous and can be readily perturbed by small changes in the solution properties of the solution interface. In addition, the Th uptake by TiO$_2$ is directly impacted by the relative ratio of the protonated to the deprotonated forms of the surface hydroxyl groups. Therefore, controlling the overall pH of the column to reduce or eliminate variabilities in Th uptake that may arise due to uncertainties in solution conditions may be advantageous. A few approaches are adapted to control the overall pH of the column by preconditioning of the IX material:

Preconditioning the TiO$_2$ prior to it being configured in the column may be accomplished by precontact of the material with pH adjusting solutions (solutions of pHs 4-8 may be used). The pH adjusting contact solutions are prepared by adjusting the HNO$_3$/NH$_4$OH ratio in de-ionized (DI) water. The preconditioning of the TiO$_2$ with these solutions are in general observed to enhance uptake capacity, the exception being pH ~8.

As another example, an alternate option may be to cycle a pH adjusting solution through the column for a prolonged period, prior to the elution of the Th feedstock through the column. The pH of the column may be monitored via examining aliquots of the eluant periodically. This is also observed to enhance the Th retention. However, there is an advantage in controlling the elution speed during the washing. Thus, column wash at speeds of 30-60 mL/h pre-Th loading may improve Th uptake, washing at 108 mL/h may deteriorate the Th retention. This may be a consequence of high wash speeds impacting the material configuration in the column (possibly making particles smaller via agitation), that led to adversely impacting Th retention.

Based on the column observations, the following conclusions and justifications may be reached:

The Th retention from a pH 4 feed is higher than that from a pH 3 feed, all other parameters remaining constant. This is consistent with the batch equilibrium experiments, and further supports the notion of the Th capture by TiO$_2$ being driven by an inner sphere mechanism leading to a Ti—O—Th bond formation, which may be energetically favored at higher pHs. These results point to Th retention being presumably dependent on the Ti—O—H/Ti—O$^-$ equilibrium, with the higher percentage of the Ti—O$^-$ fraction with increasing pHs leading to higher Th retention.

However, simply preconditioning the column with a high pH solution to substantially completely deprotonate the Ti—O—H to Ti—O$^-$ may have adverse effects. For example, preconditioning the resin with higher pH solutions (pH ~8) may deteriorate the Th retention, as reflected in the Th retention behavior of column 168-16 discussed below in Table 5. This may be a consequence of the Th species tending to not remain in solution but rather to form oxide and hydroxide aggregates that can precipitate out of the solution. These oxide/hydroxide precipitates may not get captured inside the pores of the titania, but rather block the pores and prevent more Th from getting captured. This is suggestive of requiring a fine balance between controlling the Ti—O—H/Ti—O$^-$ equilibrium and preventing Th precipitation.

Preconditioning the TiO$_2$ with pH adjusting solution of 4-6 may enhance the Th retention compared to the unconditioned TiO$_2$. However, the overall Th retention capacity of these preconditioned TiO$_2$ may undergo drastic and often non-linear variations depending on small changes in feed concentrations, feed pH, or column configurations that impact column bed volume and feed flow rate. Such temperamental variations in the treated TiO$_2$ behavior are a consequence of the electrokinetic potential of TiO$_2$ within the pH range of 4-7 being susceptible to small perturbations in the solution interfacial properties that may be caused by small alterations in pH, solution ionic strength, solution concentrations or even physical parameters.

Using a gravity-flow based elution in a column with narrow cross section where the total elution time is 2.5 mL/h (column 168-23), a 99.6% Th retention is described below. On the other hand, an attempt to enhance the flow rate by using a peristaltic pump where the elution speed is adjusted to 5 mL/h decreased the retention to 73.3% (column 168-23 in Table 5 below), all other factors remaining unchanged. This points to a slow to moderate kinetics of Th sorption by TiO$_2$.

TABLE 5

Tabulation of the column elution as a function of various parameters

| Unique column identifier | Column conditions | Flow | Feed pH | IX material mass (g) | Column BV (mL) | Column type | Th mass in feed (g) | % Th retention |
|---|---|---|---|---|---|---|---|---|
| 168-05 | Non-preconditioned TiO$_2$ | Gravity | 3 | 2.0 | 1.5 | 3.5 mL syringe | 0.109 g in 10 mL | 67.62 ± 0.12 |
| 168-07 | Non-preconditioned TiO$_2$ | Gravity | 4 | 2.1 | 1.5 | 3.5 mL syringe | 0.109 g in 10 mL | 70.43 ± 0.09 |
| 168-11 | Overnight preconditioning of TiO$_2$ with pH = 4 solution | Gravity | 4 | 2.0 | 1.5 | 3.5 mL syringe | 0.106 g in 10 mL | 81.41 ± 0.21 |
| 168-13 | Overnight preconditioning of TiO$_2$ with pH = 4; 0.1 M NaNO$_3$ solution | Gravity | 4 | 2.0 | 1.5 | 3.5 mL syringe | 0.111 g in 10 mL | 71.31 ± 0.12 |
| 168-15 | Overnight preconditioning of TiO$_2$ with pH = 6.3; 0.1 M NaNO$_3$ | Gravity | 4 | 2.0 | 1.5 | 3.5 mL syringe | 0.116 g in 10 mL | 87.3 ± 0.31 |
| 168-16 | Overnight preconditioning of TiO$_2$ with pH = 8; 0.1 M NaNO$_3$ solution | Gravity | 4 | 2.0 | 1.5 | 3.5 mL syringe | 0.107 g in 10 mL | 55.36 ± 0.41 |
| 168-23 | Overnight preconditioning of TiO$_2$ with pH = 5.6 | Gravity | 4 | 1.0 | 1.0 | 2 mL pipette | 0.051 g in 10 mL | 99.61 ± 0.01 |
| 168-25 | Overnight preconditioning of TiO$_2$ with pH = 5.6 | Pumped flow; 5 mL/h flow rate | 4 | 1.0 | 1.0 | 2 mL pipette | 0.057 g in 10 mL | 73.33 ± 0.12 |
| 166-67 | Column wash of 6 hrs. of continuous cycling | Pumped flow at 30-60 | 3 | 0.6 | 0.5 | 2 mL pipette | 0.011 g in 4.7 mL | 97 |
| 166-74 | of DI H$_2$O through column prior to Th loading | mL/h during washing, 60 mL/h during Th loading and wash | 3 | 2.0 | 1.5 | 2 mL pipette | 0.0495 g in 10 mL | 84 |

TABLE 5-continued

Tabulation of the column elution as a function of various parameters

| Unique column identifier | Column conditions | Flow | Feed pH | IX material mass (g) | Column BV (mL) | Column type | Th mass in feed (g) | % Th retention |
|---|---|---|---|---|---|---|---|---|
| 166-86 | Preconditioning of $TiO_2$ with 2% $HNO_3$ under stirring to reach p = 25.7 | Gravity flow slow; pumped flow at 108 mL/h for Th load & wash | 3.1 | 5.0 | 3.7 | 5 mL VWR column | 0.101 g in 10 mL | 40 |
| 166-90 | Column cycled with 100 mL pH 3 solution overnight at 60 mL/h | Pumped flow at 2 mL/h for loading and washing | 3 | 5.0 | 3.7 | 5 mL VWR column | 0.106 g in 10 mL | 83 |
| 166-95 | 45 mL DI water + 2 mL 2% $HNO_3$ cycled | Th loading at 2mL/h; | 3.2 | 5.0 | 3.7 | 5 mL VWR column | 0.099 g in 10 mL | 89 |
| 166-99 | 48 mL water + 2 mL 2% $HNO_3$ cycled through | Th loading at 2mL/h; | 3.9 | 5.0 | 3.7 | 5 mL VWR column | 0.102 g in 10 mL | 92 |

According to various examples, an advantageous aspect of the performance of a generator is the ability to selectively capture Th from the feedstock while its Ra/Ac progenies, which are already present in the feedstock as a result of prior Th decay, can elute through. While chemical characterization of the eluants via ICP-OES and ICP-MS may allow one to monitor the amount of Th being captured, gamma spectroscopy allows one to monitor the Ra and Ac eluting through, as described in the experimental section. Gamma spectroscopic results on select columns tabulated in Table 5 are shown in Table 6 below. In these experiments, sample solutions post their elution through the column are analyzed via gamma spectroscopy. The cumulative results show >95% recovery for both $^{228}$Ac and $^{228}$Ra, demonstrating the efficacy of this generator in effectively separating Th from Ra/Ac.

For improved accuracy on calculating Ra/Ac recovery, alpha spectroscopy may be performed, as discussed in subsequent sections. However, as discussed in the experimental sections, it takes 3-4 weeks for a substantial amount of $^{224}$Ra to build up from the decay of $^{228}$Th, and therefore alpha spectroscopy is limited to select samples for logistical reasons.

TABLE 6

Tabulation of $^{228}$Ac and $^{228}$Ra recoveries of select phosphate-modified $TiO_2$ columns

| Column | $^{228}$Ac | $^{228}$Ra |
|---|---|---|
| 168-15 | 98.9 ± 16.5 | 97.0 ± 32.4 |
| 168-16 | 97.3 ± 16.3 | 98.3 ± 12.4 |
| 168-23 | 98.9 ± 17.3 | 98.9 ± 19.4 |
| 168-25 | 96.5 ± 15.3 | 96.0 ± 19.2 |

To summarize the columns, the cumulative column results point to controlling pH of the column is advantageous in improving the $TiO_2$/Ti—OH ratio that increases or maximizes Th capture and ensure that Th is not precipitated as oxides. While the above methods are able to accomplish this at large, an improved, consistent method of such control is helpful to ensure reproducibility across operations and better control on the scalability of the approach. The rest of the experiments investigate two potential pathways for controlling pH in a titania-based $^{225}$Ac generator.

One potential pathway for pH control is through the use of a buffer solution to moderate the pH changes. The other alternative is through phosphate modification of the surface with a phosphate functionality which: a) may offer a stable electrokinetic potential over a large enough pH window; and b) may offer improved sorption kinetics, as well as enhanced uptake capacity.

Impact of Repetitive Elution Cycles

Figure 5A:
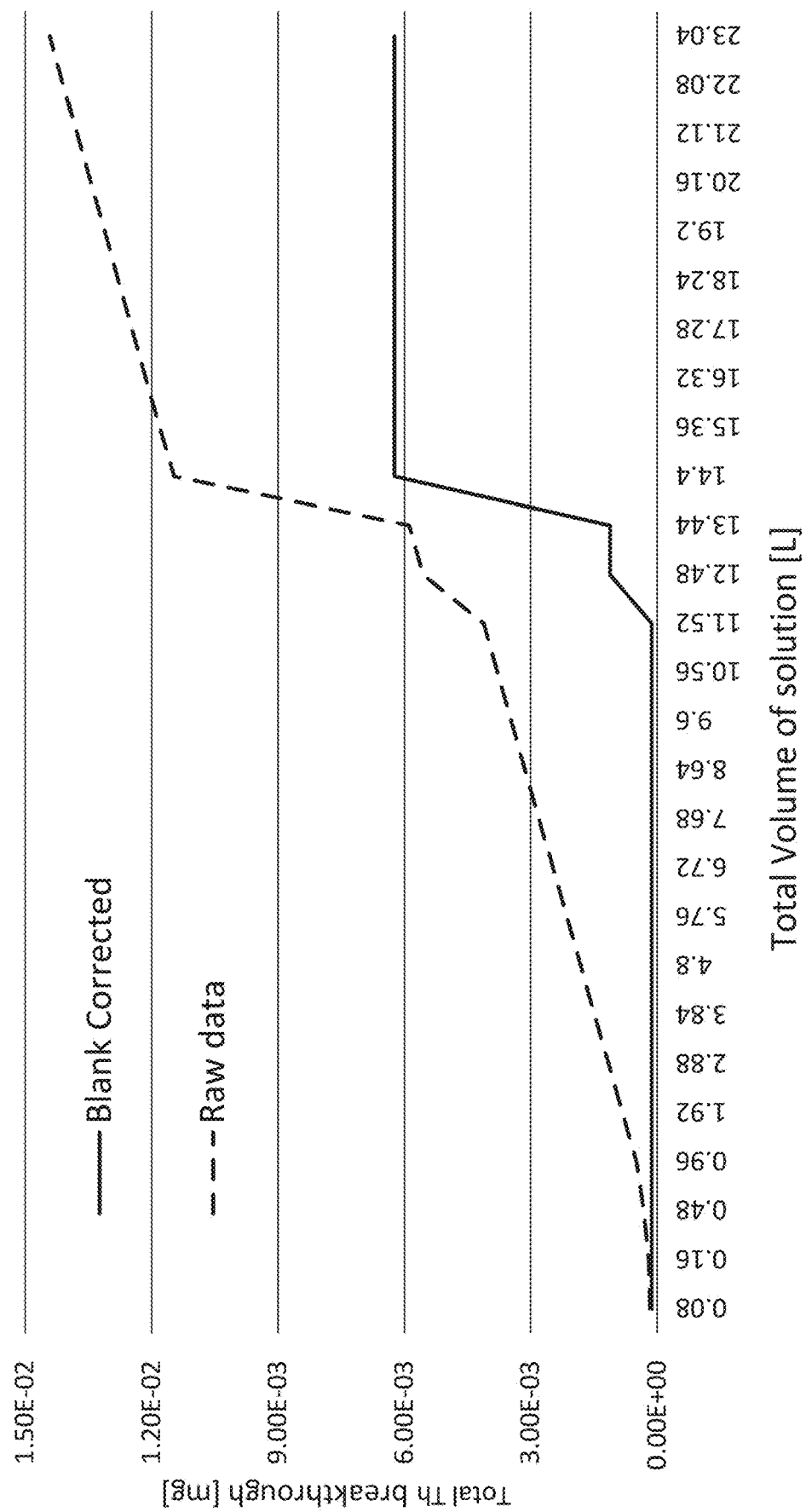
FIGS. 5-13 are plots of variations in Th and Ra concentration with respect to eluting volumes, according to various examples of the present disclosure.
Figure 5B:
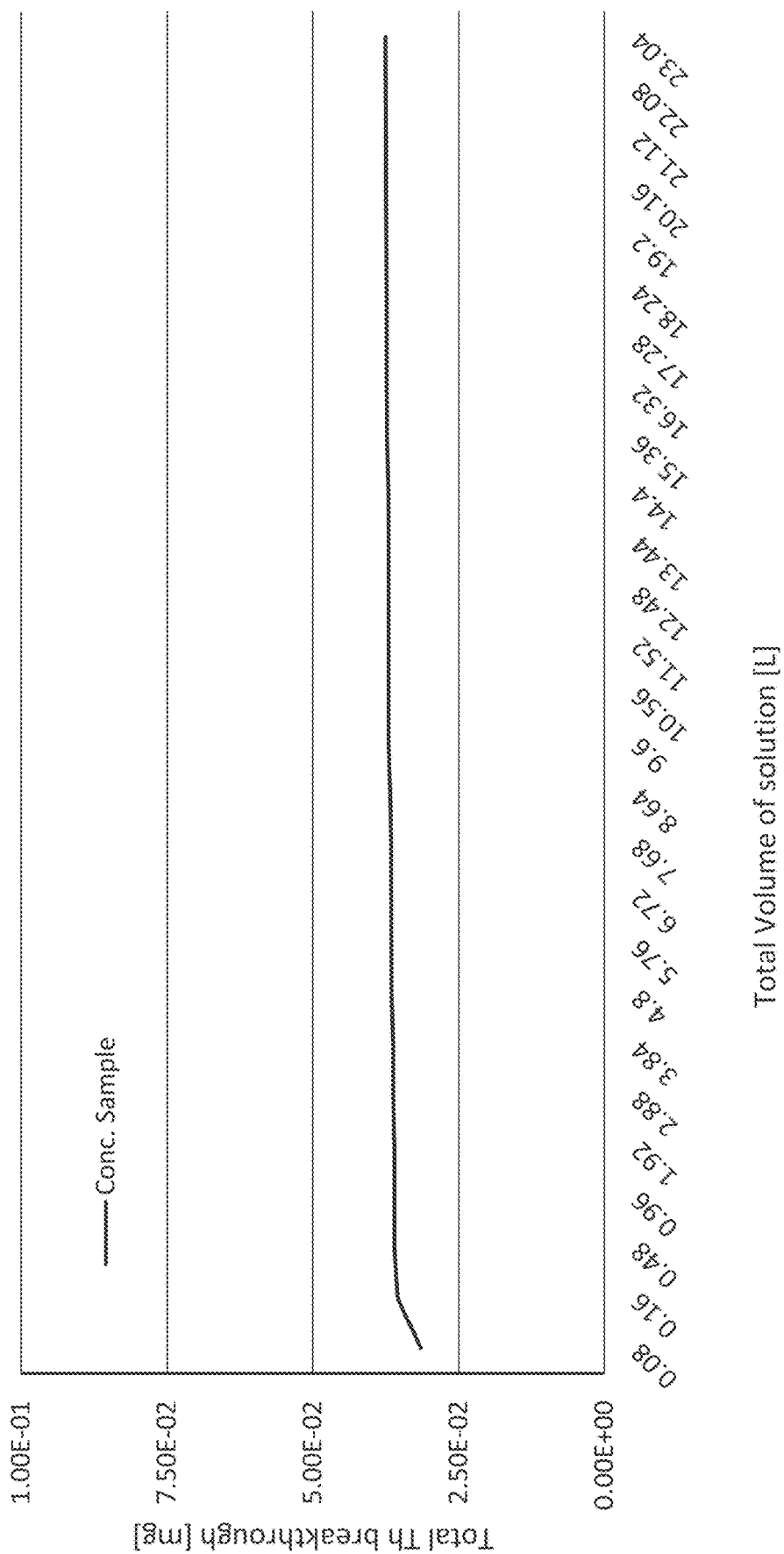
Figure 5C:
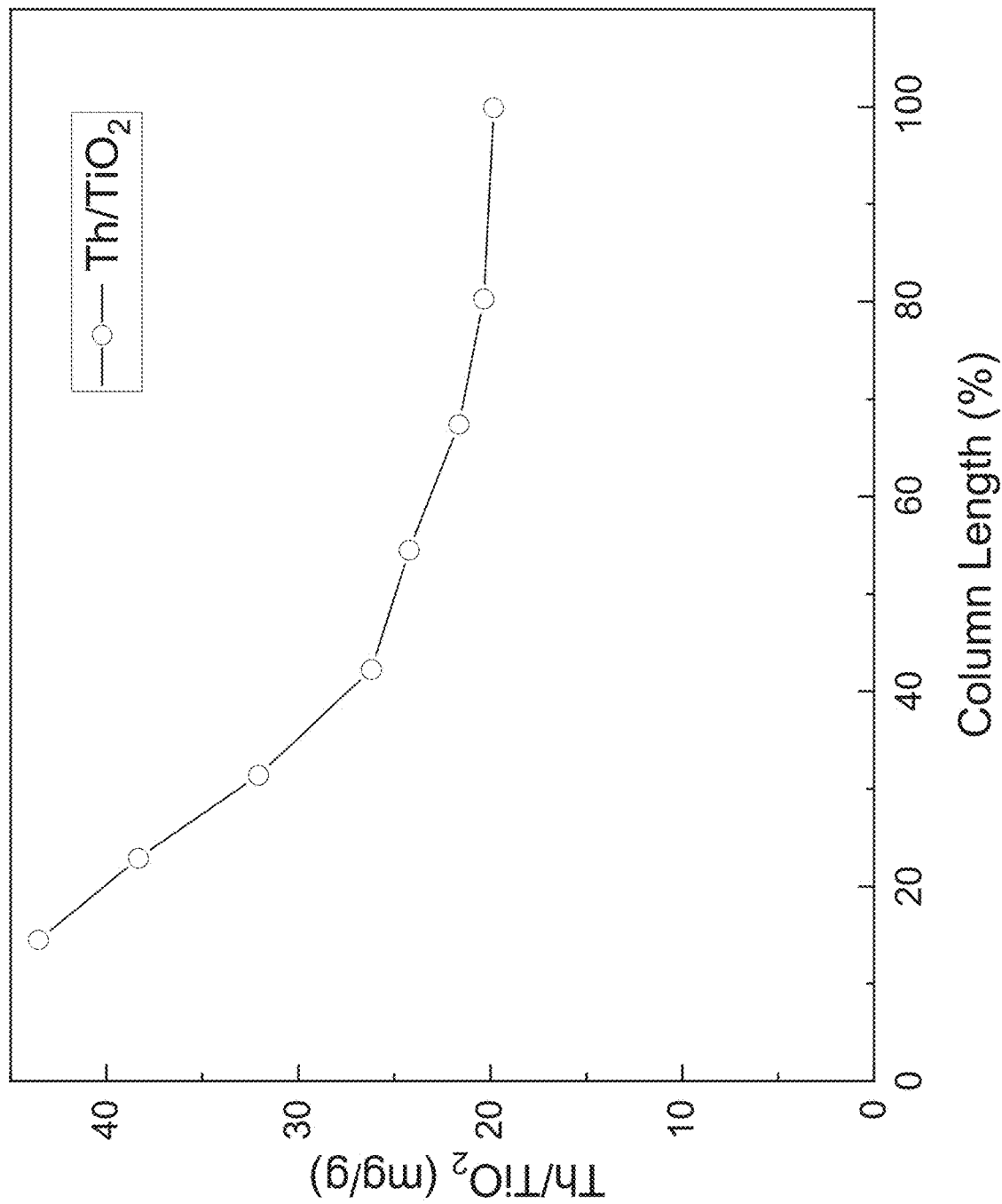
Figure 5D:
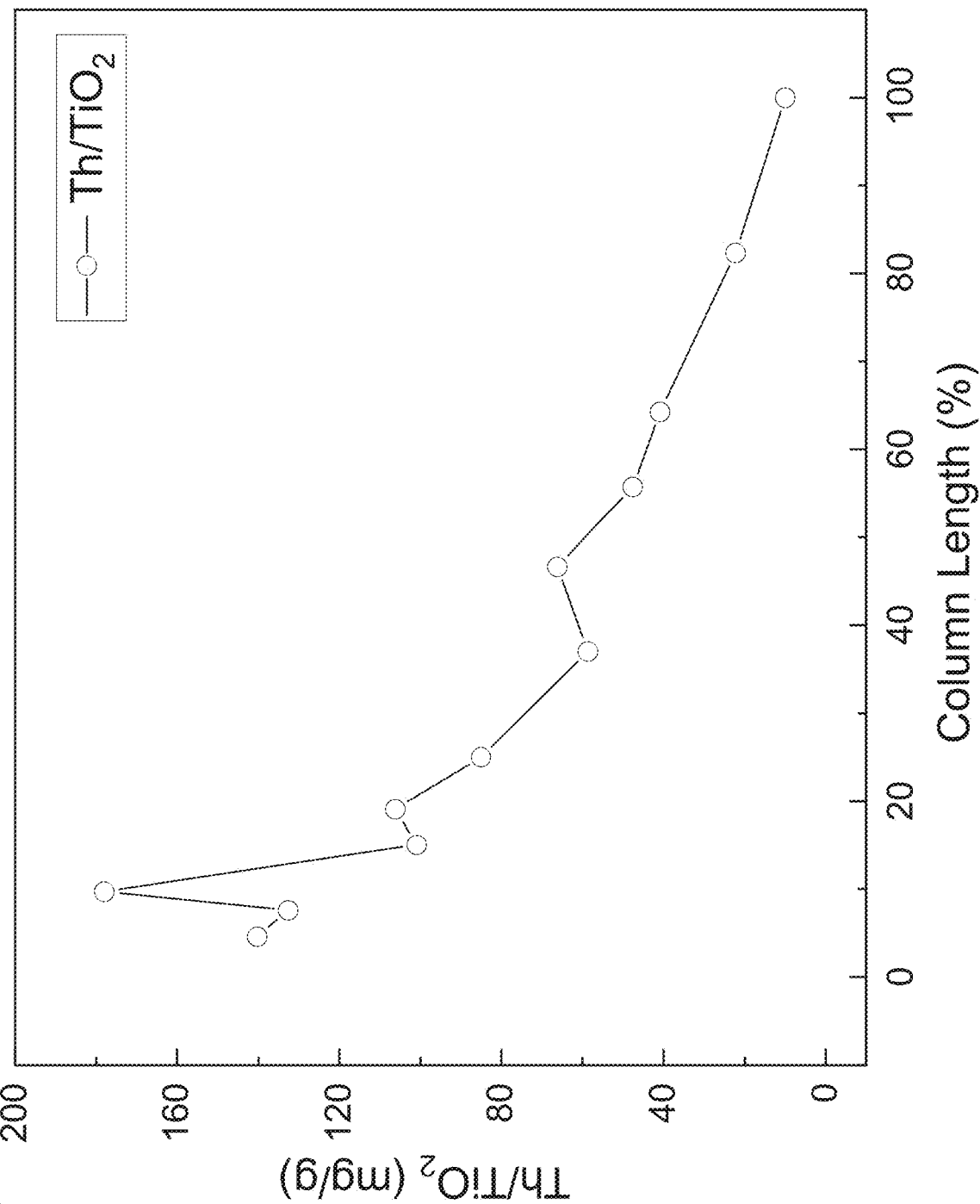

FIGS. 5A-5D are illustrations of the effect of elution over thorium retention, in accordance with various principles of the disclosure. In various examples, a column of phosphate-modified $TiO_2$ loaded with 280 mg of Th-232 was tested to simulate repetitive elution cycles over 20 years of projected life. For each cycle, 80 ml of a $HNO_3$ solution having a pH of 4 is passed through the column at 20 ml/h, and the eluant is collected. Every 12 cycles were combined (960 ml) to represent approximately one year of elution. 10 ml of the sample is pulled from the group for analysis via ICP-MS, and the rest of the solution is concentrated to dryness and redissolved in 20 ml of 2% $HNO_3$ for ICP-MS analysis. Accordingly, a total of 24 groups are analyzed. After 288 elution cycles, the column is cut into sections, and each section is extracted with 1 M HCl to analyze the amount of thorium absorbed. The result is then compared to a similar section experiment of a fresh loaded column to determine the rate of Th migration within the column during eluting cycles. In examples, eluting tests illustrated in FIGS. 5A and 5B reveal no significant Th loss during the 20 years' equivalent cycles. For example, the total Th loss is 0.006 to 0.04 mg (~0.013%), as illustrated in FIGS. 5A and 5B. In addition, section tests do not show any significant Th migration during the eluting cycles, as illustrated in FIGS. 5C and 5D.

Impact of Buffer

In various examples, a pH that is equal to about 4 provides a balance of appreciable Th uptake without significant concern for Th precipitation as oxide or hydroxide. As such, a buffer may be selected to be appropriate around this pH value. Therefore, acetic acid (HOA)/sodium acetate (NaOA) buffer may be chosen as (i) acetic acid has a pKa of 4.2 and may therefore be effective in the pH range of 3.6 to 4.4, (ii) while acetate can coordinate with Th, the Th—OA binding is unlikely to interfere with $TiO_2$ binding due significantly higher number of Ti—O sites overriding the similarity in binding group natures of Ti—O— and AO—.

In order to improve the column conditions, a variety of parameters that included buffer concentrations, feed stock pH and elution speed are tested. The list of column runs and their different parameters are tabulated in Table 7 below. In general, the use of HOA/NaOA buffer may significantly improve the Th uptake capacity; for feedstocks consisting of ~100 mg of Th, the Th retention by a column containing ~5 g of $TiO_2$ range from 97.00-99.99%.

14% of the total acetate (or, 0.014 M out of 0.1 M HOA/NaOA) is expected to be in the salt form. Assuming that the capture of Th on the column involves an 1:1 association between the Th and Ti—O, the total capture of 0.043 M Th ions would involve that many surface sites on $TiO_2$. A 0.014

TABLE 7

Tabulation of the Column Elution in Presence of Buffer Solutions

| Unique column identifier | Column conditions | Flow | Feed pH | IX material mass (g) | Column bed volume (mL) | Column type | Th mass in feed (g) | % Th retention |
|---|---|---|---|---|---|---|---|---|
| 166-109 | column preconditioned by cycling 0.1 M HOA/NaOA (pH = 4) at 60 mL/h for 6 hours | Th loading at 2 mL/h; washing at 2 mL/h | 3.6 | 5.0 | 3.7 | 5 mL VWR column | 0.096 g in 10 mL | 96.7 |
| 166-111 | column preconditioned by cycling 0.25 M HOA/NaOA (pH = 4.1) at 60 mL/h for 6 hours | Th loading at 2 mL/h; washing at 2 mL/h | 4.1 | 5.0 | 3.7 | 5 mL VWR column | 0.098 g in 20 mL | >99.99 |
| 166-115 | column preconditioned by cycling 0.25 M HOA/NaOA (pH = 4.2) at 60 mL/h for 6 hours | Th loading at 10 mL/h; washing at 10 mL/h | 4.3 | 5.0 | 3.7 | 5 mL VWR column | 0.092 g in 20 mL | 99.8 |
| 166-128 | column preconditioned by circulating 500 mL of 0.25 M HOA/NaOA (pH = 4.3) at 300 mL/h | Th loading at 10 mL/h; washing at 10 mL/h | 4.3 | 51.6 | 37 | 5 mL VWR column | 1.005 g in 500 mL | >99.99 |

Figure 6:
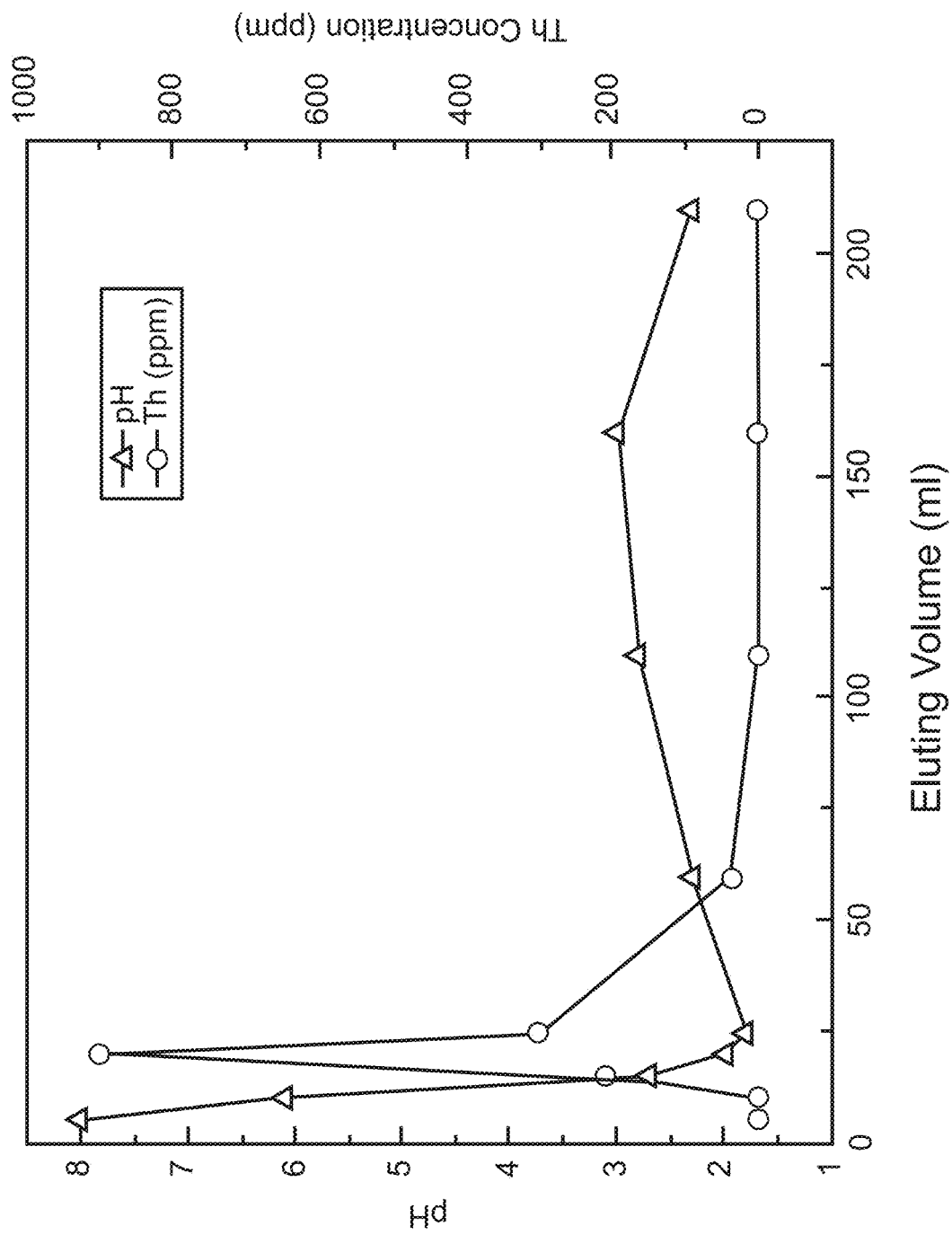

In various examples, in order to appreciate the effect of the buffer, the uptake in the absence of buffer may be visualized and compared to that in the presence of the buffer. In the absence of a buffer, as Th cations are loaded onto the column, they replace the protons of the Ti—O—H to form Ti—O—$Th^{3+}$, releasing $H^+$ ions into the contact solutions. As more of such $H^+$ ions get released in the vicinity of the column, they or their solvated hydronium ion analogs are free to form a positively charged layer adjacent to the surface of the $TiO_2$ layer loaded onto the column. This can create a large overpotential adding a thermodynamic barrier to the binding of other Th cations and impact the overall Th uptake capacity. As a representative example of a column run in the absence of a buffer solution, the elution data for the column run 166-99 in Table 5 above is represented in FIG. 6 (initial Th concentration ~0.043 M). In FIG. 6, a plot of Th concentration in the eluant as a function of eluting solution volume is superimposed with the changes in pH of the eluant as shown in FIG. 6. FIG. 6 provides an indirect evidence of the above effect, as a significant pH drop may directly correlate with a significant Th breakthrough. Overall, a 90% Th retention is observed, amounting to a total Th breakthrough of 10%. For example, the eluting solution may include 0.05 M $HNO_3$. In other examples, the eluting solution may include $HNO_3$ at a concentration in a range of 0.01-10 M.

Figure 7:
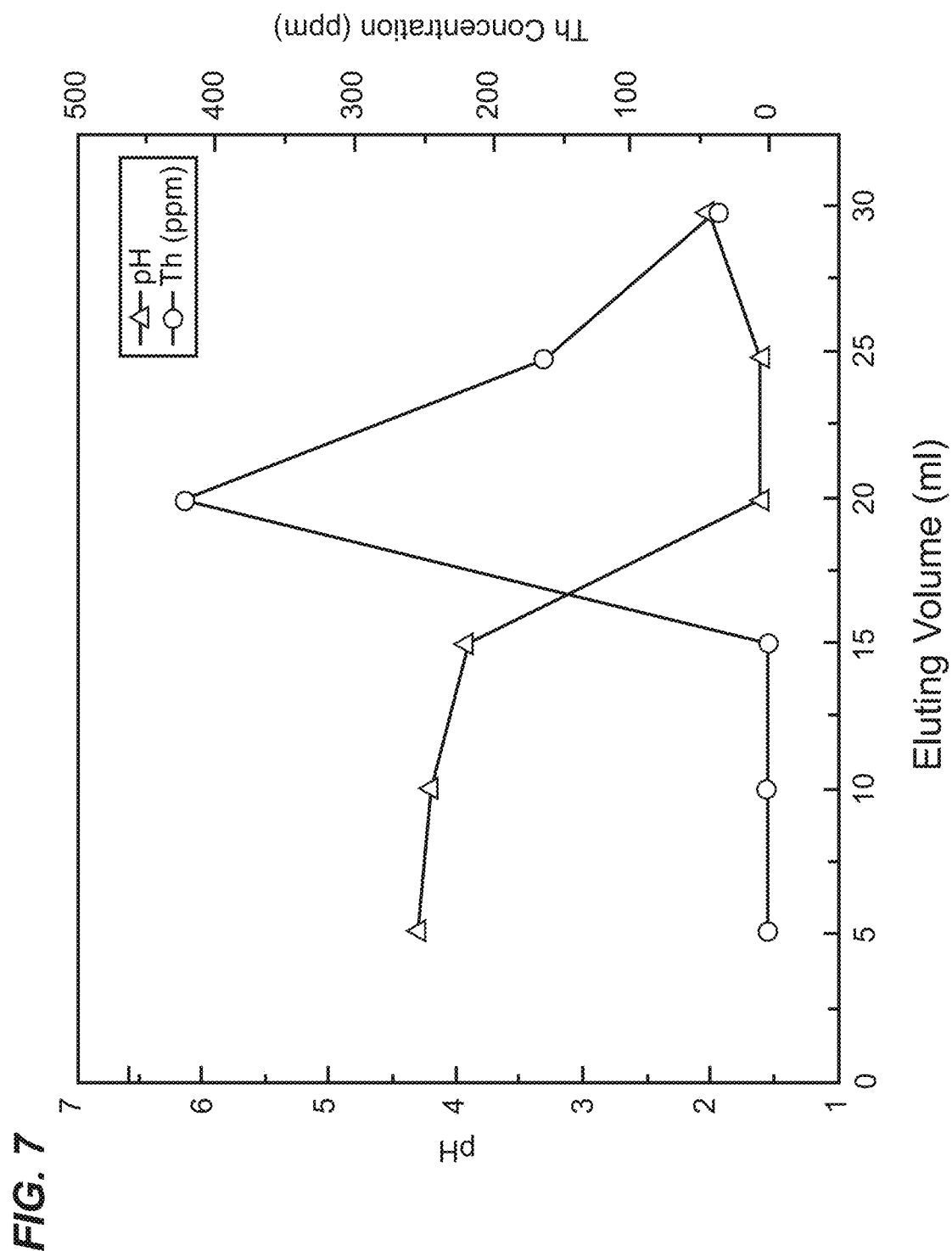

In other examples, preconditioning the column to a 0.1 M acetic acid/sodium acetate buffer and adjusting the solution pH to 4 may significantly arrest the Th breakthrough, and improve the overall Th retention to 97% for an approximately similar Th feed concentration (~0.043 M), as in the case of column run 166-109. This is also reflected in a much smaller change in pH when Th is added to the column, as illustrated in FIG. 7. The pH is still observed to drop after the addition of Th, which may be a consequence of the buffer capacity at the concentrations used being insufficient to quantitatively moderate and resist the pH change during the loading process. This is not unexpected as at a pH=4, only 14% of the total acetate (or, 0.014 M out of 0.1 M HOA/NaOA) is expected to be in the salt form. Assuming that the capture of Th on the column involves an 1:1 association between the Th and Ti—O, the total capture of 0.043 M Th ions would involve that many surface sites on $TiO_2$. A 0.014 M buffer concentration is presumably too low to impact all these sites quantitatively, and this is the possible reason leading the 3% breakthrough, which although small is still quantifiable.

Figure 8:
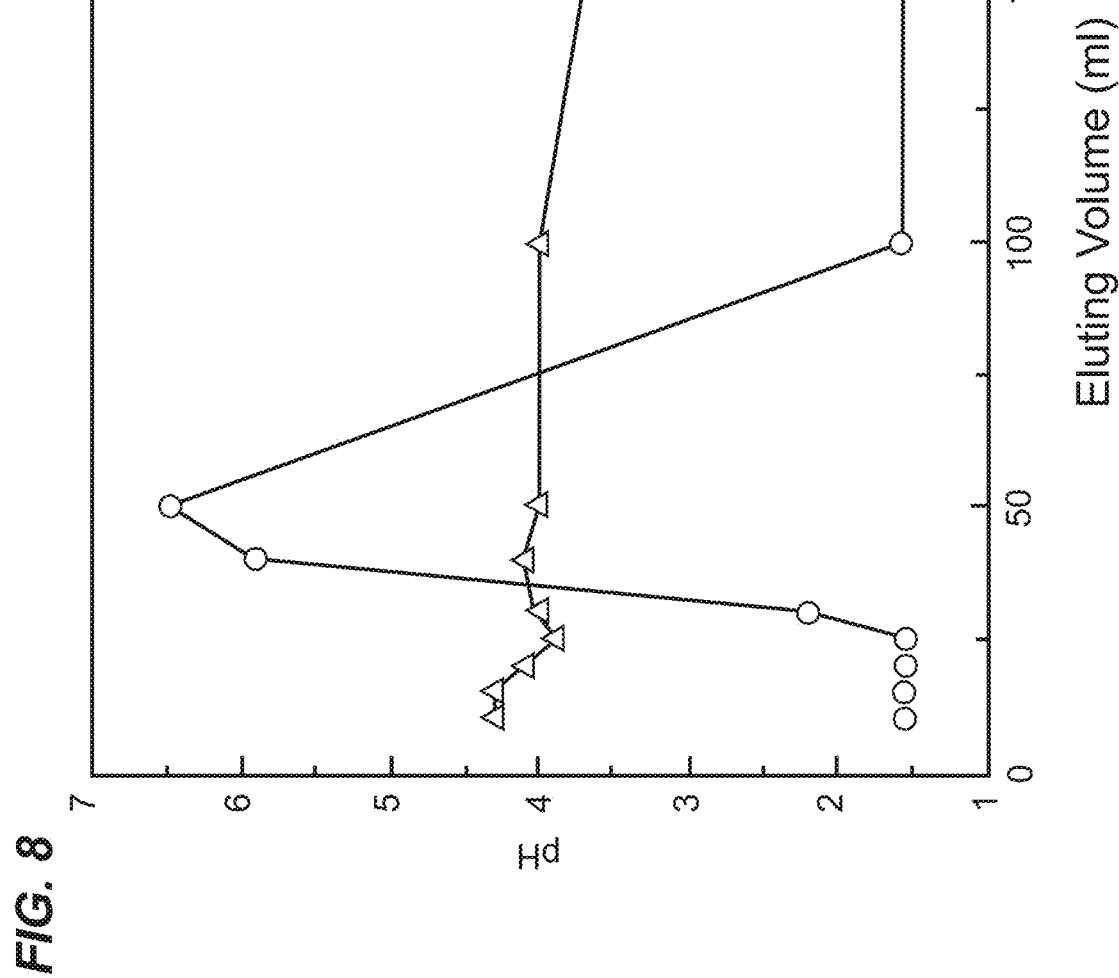

This is in fact validated by increasing the buffer concentration to 0.25 M HOA/NaOA while reducing the Th concentration by half (column run 166-111), which results in a further enhancement of Th retention to 99.99% in the presence of this buffer, with a low Th breakthrough (226 ppb at the highest point, see FIG. 8). At pH 4.2, 20% of total acetate species is in salt form, or 0.05 M out of 0.25 M buffer, which would provide sufficient buffer capacity for 0.022 M of Th. Also, in the presence of acetate species, the Th cations may stabilize and resist precipitation even at pH 4.2. This may presumably be a consequence of the acetate complexing with Th and preventing it from precipitating as the hydroxide.

Effect of Flow Rate

The flow rate may play a role in Th uptake although the effect is significantly less pronounced compared to that in the absence of the buffer. Therefore, while a loading rate of 2 mL/h is able to result in a Th retention of >99.99%, increasing the loading speed to 10 mL/h slightly reduces the retention to 99.8%.

Column Saturation & Uptake Capacity

An assessment of the total Th uptake capacity of the material is helpful to improve the Th/IX ratio to ensure no breakthrough of the Th occurs. For the saturation experiment using $TiO_2$ materials, a column is continuously fed with Th feedstock solution at 6 ml/h (column 166-117). This process is continued until a significant breakthrough is observed, at which point the Th concentration in the eluant solution matched the Th concentration of the stock being fed to the column. Based on this study, a Th loading capacity of the $TiO_2$ material is determined at ~50 mg/g Th/$TiO_2$.

Figure 9:
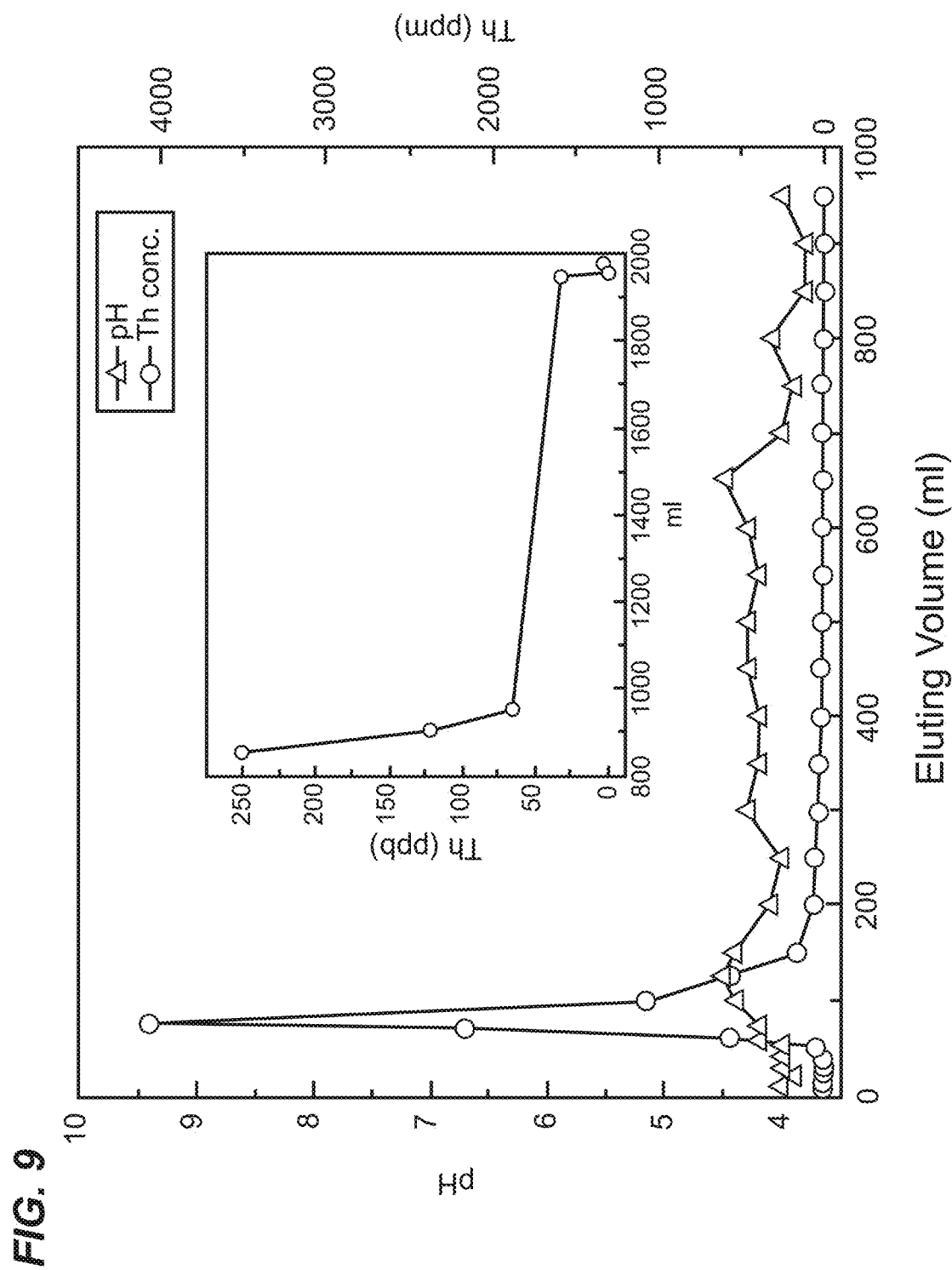
Figure 10:
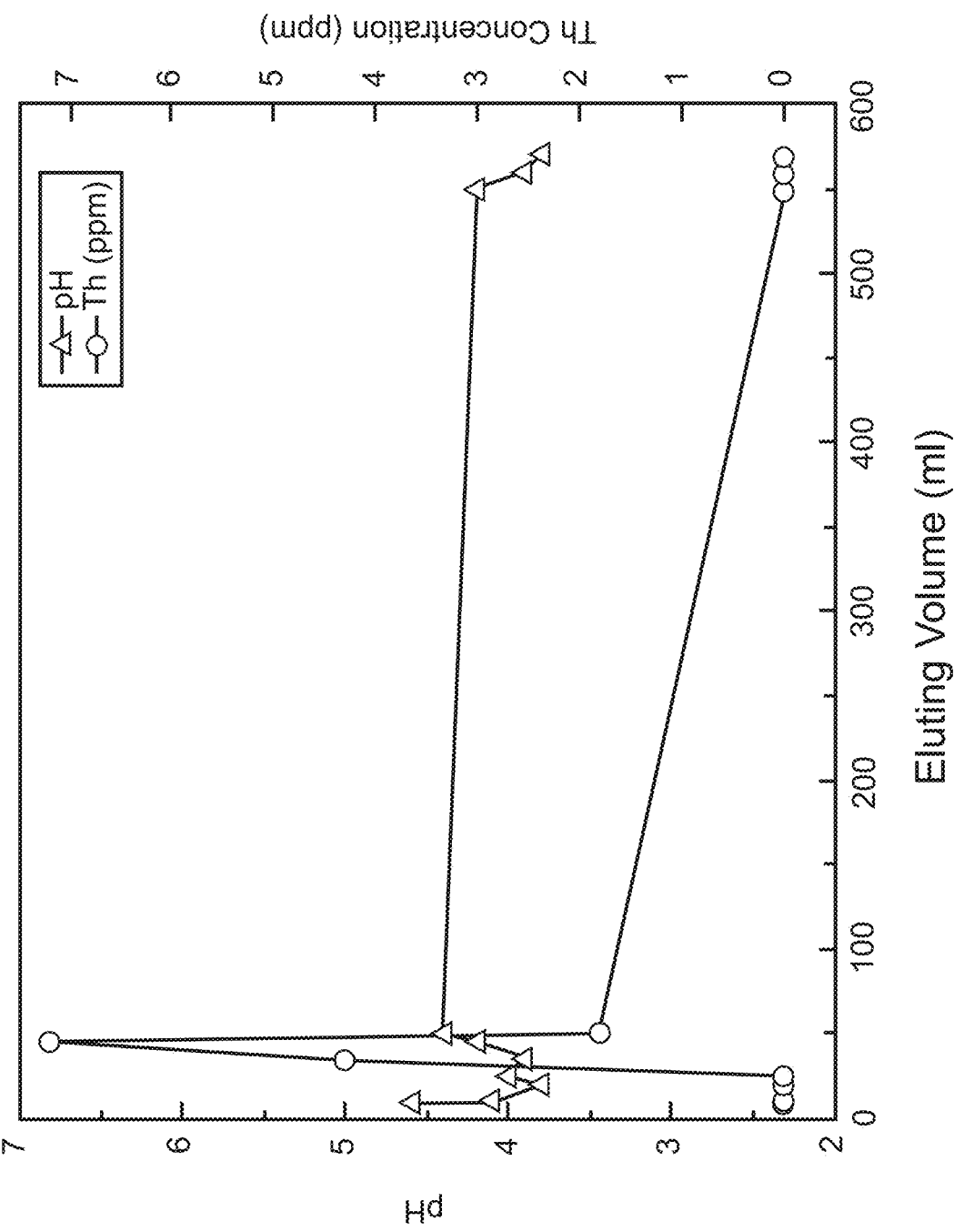

In various examples, post saturation the column is thoroughly washed by passing 2000 mL of DI water. A slight trace of Th in the eluant after the breakthrough is observed up to ~100 mL, which is presumably a carryover from the breakthrough, after which the Th concentration in the eluant dropped rapidly, as shown in FIG. 9. Further, as demonstrated in the inset, after the traces of the Th carryover from the breakthrough are substantially completely washed off, the Th concentration in the eluant dropped down to 100 ppb, as determined by ICP-MS. A further elution of the column with another 1000 mL of DI water showed Th concentration well below 100 ppb. This suggests little release or leaching of Th from the column. This low Th concentration in the eluant indicates a strong binding of Th to the column resulting in its improved retention. A more elaborate study of the leaching behavior is discussed later.

A second column is loaded to 90% saturation at 2 ml/h flow rate (column 166-122). The near saturation led to an elevated Th breakthrough of 7.2 ppm. Despite this, the overall Th retention is 99.95%. This amounts to a 95.1% Th remaining in the column after 100 separations based on the equation [4]. A detailed list of the $^{229}$Th post $^{225}$Ac elution as a function of number of separation cycles is shown in Table 11.

$$\text{Relative Th retention} = \text{Th recovery}^{number\ of\ batches} \quad [4]$$

Scalability

Figure 11:
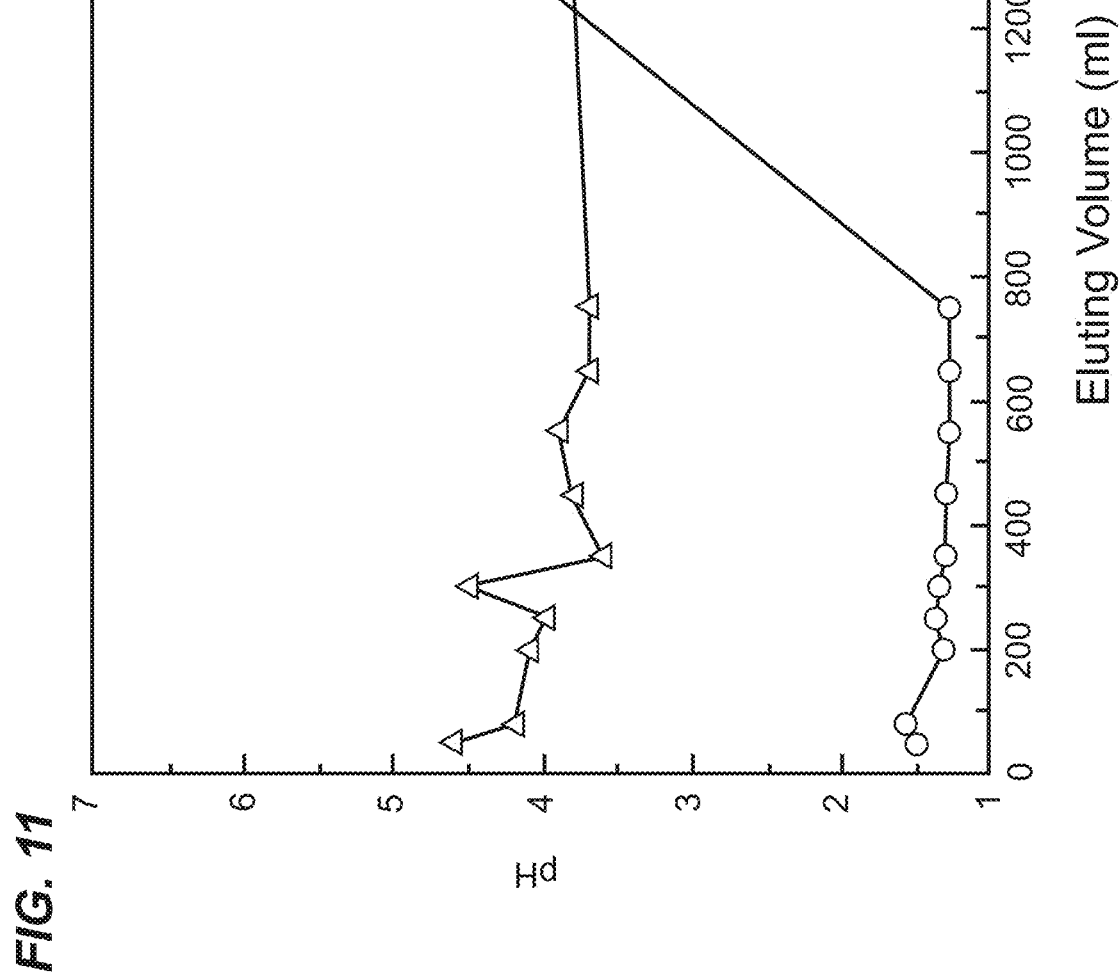

Based on the quantitative retention of Th by $TiO_2$, the scalability of Th retention when both the Th content in the feedstock as well as the column bed volume is increased by an order of magnitude is assessed. Therefore, here, a 1.005 g of Th is dissolved in 500 mL of 0.25 M HOA/NaOA buffer solution, and eluted through a column consisting of 51.6 g of $TiO_2$ (bed volume=37 mL) at a flow rate of 10 mL/h. The column behavior with regards to the variation of Th concentration in the eluant and the pH of the eluant as a function of the eluting volume are shown in FIG. 11. With regards to Th retention, the Th break through may be below the detection limit of ICP-OES, while ICP-MS revealed a cumulative Th breakthrough of around 5 ppb, amounting to >99.99% overall retention. This suggests a seemingly lower breakthrough, and consequently a greater retention of Th in the larger column, compared to the 5 mL columns. This may be a consequence of the larger column dimensions which lead to a greater contact of Th with the $TiO_2$. The diameter of the scale up column is measured at 26.5 mm compared to 12 mm in the 5 mL column; at a flow rate of 10 mL/h in the column with 26.5 mm diameter, the flow rate per cross section equals to a flow rate of 2 mL/h in the column with 12 mm diameter. The column length here is also almost twice the 5 mL column (67 mm vs. 33 mm) which results in doubling the length of contact of Th with the column. These cumulative effects result in the superior Th retention upon scale up.

Th Stripping/Recovery from $TiO_2$ Column

The $TiO_2$-based IX column provides a robust, convenient configuration for periodic harvesting of Ra and Ac. However, in the instance where the $TiO_2$ material proves susceptible to radiation over time and the material may be decommissioned, a stripping method for recovering the valuable $^{229}$Th may be available.

Figure 12:
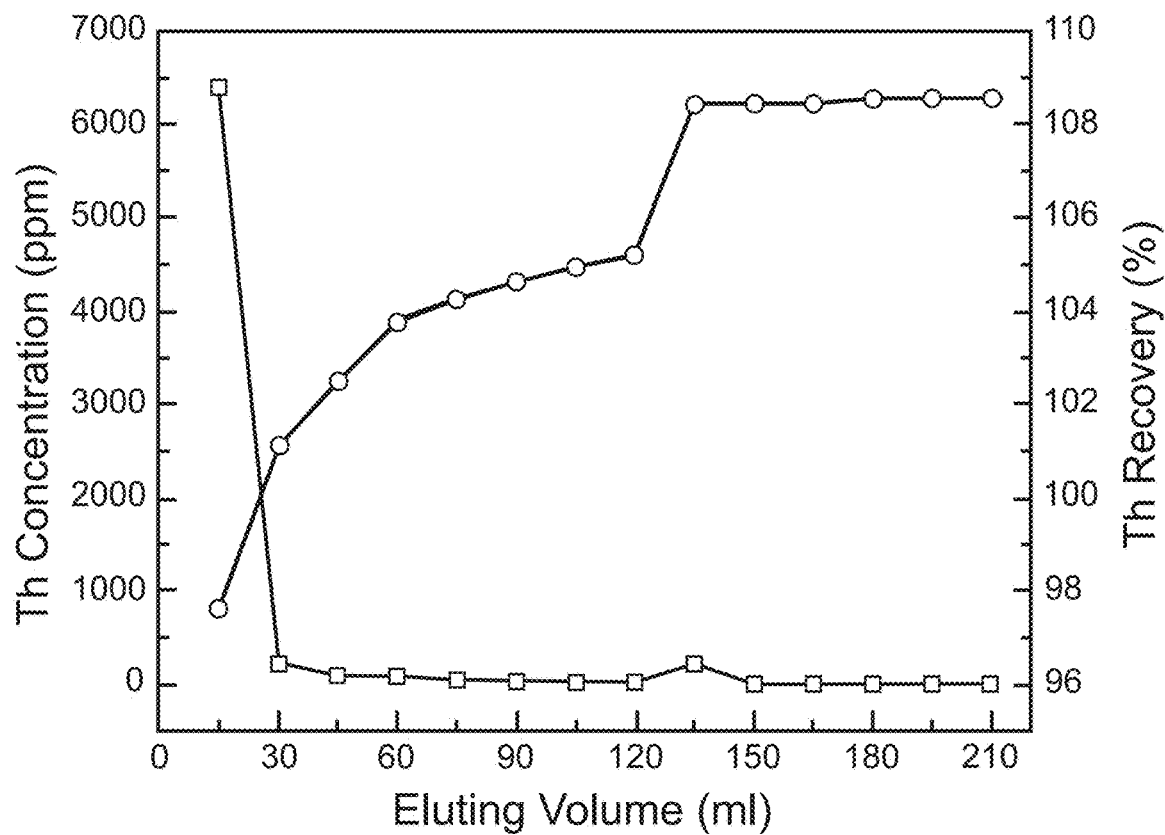
Figure 12:
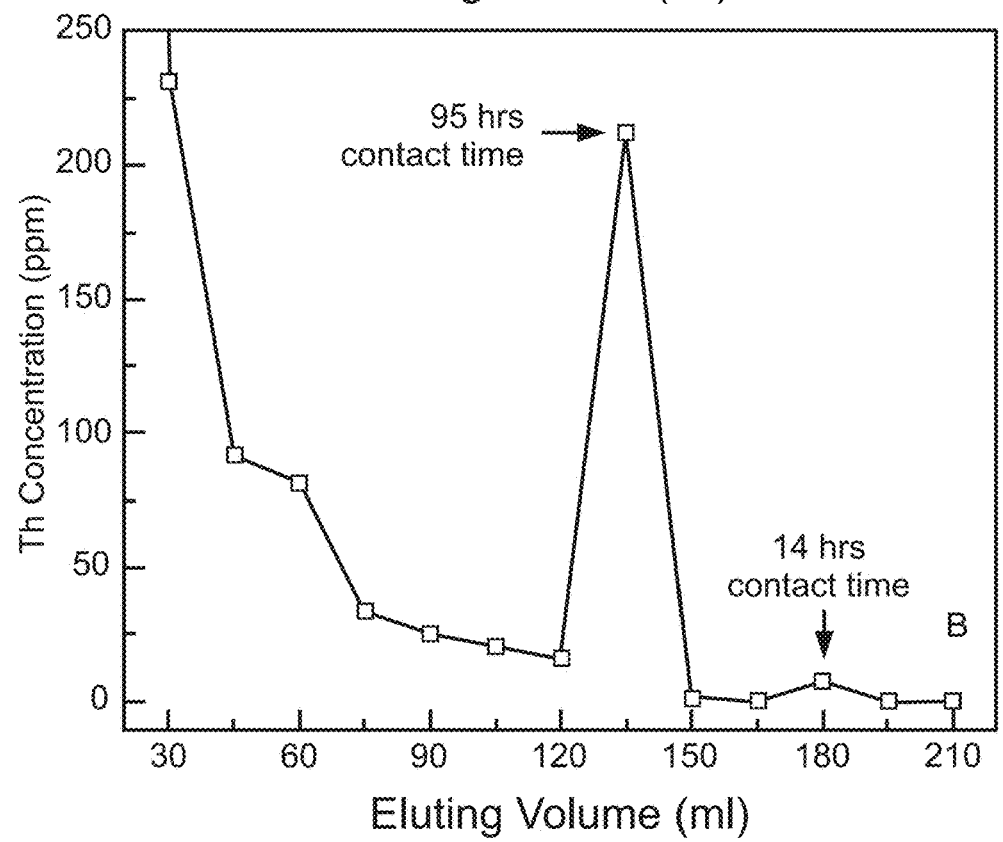

For example, a stripping method may be used on the Th pre-loaded column 166-111 as a representative example, using 1 M HCl. The stripping process may be relatively straightforward, triggered by the HCl elution through the column, as shown in the plot of Th concentration in the stripping solution as a function of the solution volume shown in FIG. 12, top panel. It is observed that this solution is able to strip Th quantitatively, with the majority of Th being eluted within the first 15 mL (or ~4 column bed volumes). A closer look at the elution profile shows Th concentration spikes at stripping volumes of 135 ml and 180 mL respectively, as shown in FIG. 12, bottom panel. The spikes are a consequence of two stray incidents where the column is left in contact with the stripping solution for a prolonged period compared to the rest of the stripping process. The time points are indicated within the lower panel of FIG. 12. This actually suggests that the Th release from the column follows slow desorption kinetics even in the presence of a reasonably strong stripping solution such as 1 M HCl. Thus, it would be desirable to increase the contact time of HCl and $TiO_2$ substrate to promote more efficient and uniform elution of Th species from the column, while allowing reduction of the total rinse volume at the same time. However, such contact time may be improved to limit the solubilization of Ti.

In various examples, the actual recovery is substantially equal to 100.0±0.001%, which suggests no significant Th loss during the loading, elution or stripping process. In addition to demonstrating the feasibility of this method for quantitative Th recovery, these observations also demonstrate the overall process to preserve the Th mass balance. Elemental analysis is also done on the eluant solution post stripping for Ti to ensure no discernible loss of the materials of the column; ICP-OES shows that the Ti concentration remains below 5-17 ppm throughout the column. This small mass loss is anticipated based on the processing conditions and demonstrates that significant quantities of impurities are not incorporated into the Th stock.

Sequential Ac/Ra Harvesting & Recovery from $TiO_2$ Column

Figure 13:
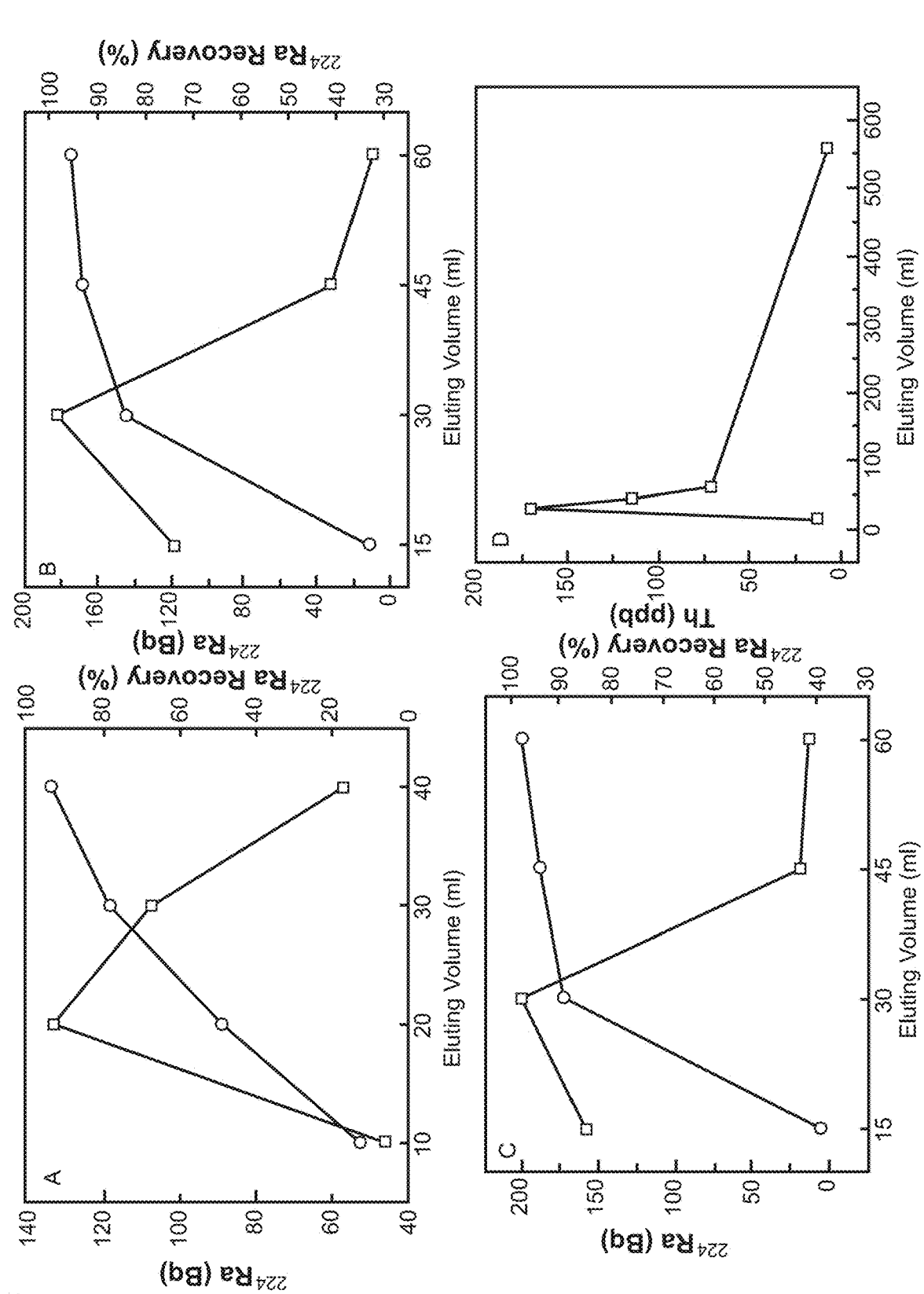

One aspect of performance of a generator is the ability to periodically harvest and elute the generated Ra/Ac progenies from the column. To explore this, alpha spectroscopy is used to probe $^{224}$Ra build up from $^{228}$Th decay. Two Th-loaded columns are tested for Ac/Ra harvesting. Immediately post loading, the column is washed repeatedly, which resulted in the elution of all the Ra and Ac progenies present in the Th feedstock at the time of loading. This is verified by gamma spectroscopy as shown in FIG. 13, showing ~100% Ra/Ac recovery in the washes. Post washing, the column is allowed to stand for 3-4 weeks to allow $^{224}$Ra to build up from $^{228}$Th decay, following which it could be rinsed to collect and monitor $^{224}$Ra using alpha spectroscopy. Unfortunately, the long half-life of $^{232}$Th precludes $^{228}$Ac detection in the harvesting cycles.

The column 166-96 is subjected to two harvesting cycles, where the columns are washed with 0.25 M HOA/NaOA buffer solutions maintained at pH 4 at an elution rate of 60 mL/h. For the first cycle, 95% of $^{225}$Ra recovery is observed in 40 mL eluant (~11 bed volumes) while for the second harvest, 60 mL (~16 bed volumes are used) for a similar recovery. Column 166-101 is subjected to one harvesting cycle and is eluted with similar buffer solutions under identical elution rates. Here, 97% of $^{225}$Ra recovery is observed in 60 ml of eluant (~16 bed volumes). While the total bed volumes >95% elution mounted to appreciable cumulative solution volumes, a contributing factor is the fast flow rate. It is anticipated that in case a reduction in the elution volume is desired to reduce the post concentration time, a slower elution rate may be used.

In various examples, Th breakthrough may also be monitored for all these columns. Overall breakthrough concentration is low, amounting to a loss of less than 0.001% of the total Th loaded onto column. Also, Th concentration rose sharply in Column 166-101 then decreased during rinse, indicating slow Th release from $TiO_2$, that gradually built up over time. Extended rinses showed no further loss of Th above limits detectable by ICP-MS, indicating high Th retention in the columns and low desorption kinetics.

Th Retention in the Column

As indicated above, the columns may be extensively rinsed periodically every 3-4 weeks after Th loading harvest Ra/Ac using a pH-4 buffer solution. During this time, the eluant is also tested for Th leaching into the eluant to assess the effectiveness of Th retention. In each of these instances, the cumulative Th loss is less than 0.001% of the total Th loaded onto column. In fact, no Th loss is observed unless the column is treated with strong acidic stripping solution such as 1 M HCl. This indicates a robust configuration of Th in the column, suggesting high Th retention and consequently, high affinity of Th towards the $TiO_2$.

Impact of Surface Modifications of Titania With Phosphate

Preparation of Surface Modified Titania

In various examples, the surface structure of titania may be modified with phosphate functionalities. However, a large contributing factor to the binding tendency and sorption capacity of $TiO_2$ is dictated by its surface charge and pore structure and it is unknown whether the surface modified titania would detrimentally affect the particle size, porosity and/or the structural integrity of the titania, or otherwise degrade the binding or chemical affinity of the material. To determine the actual effects of phosphate modification in this system, the following experiments are performed.

Materials Characterizations

Figure 14:
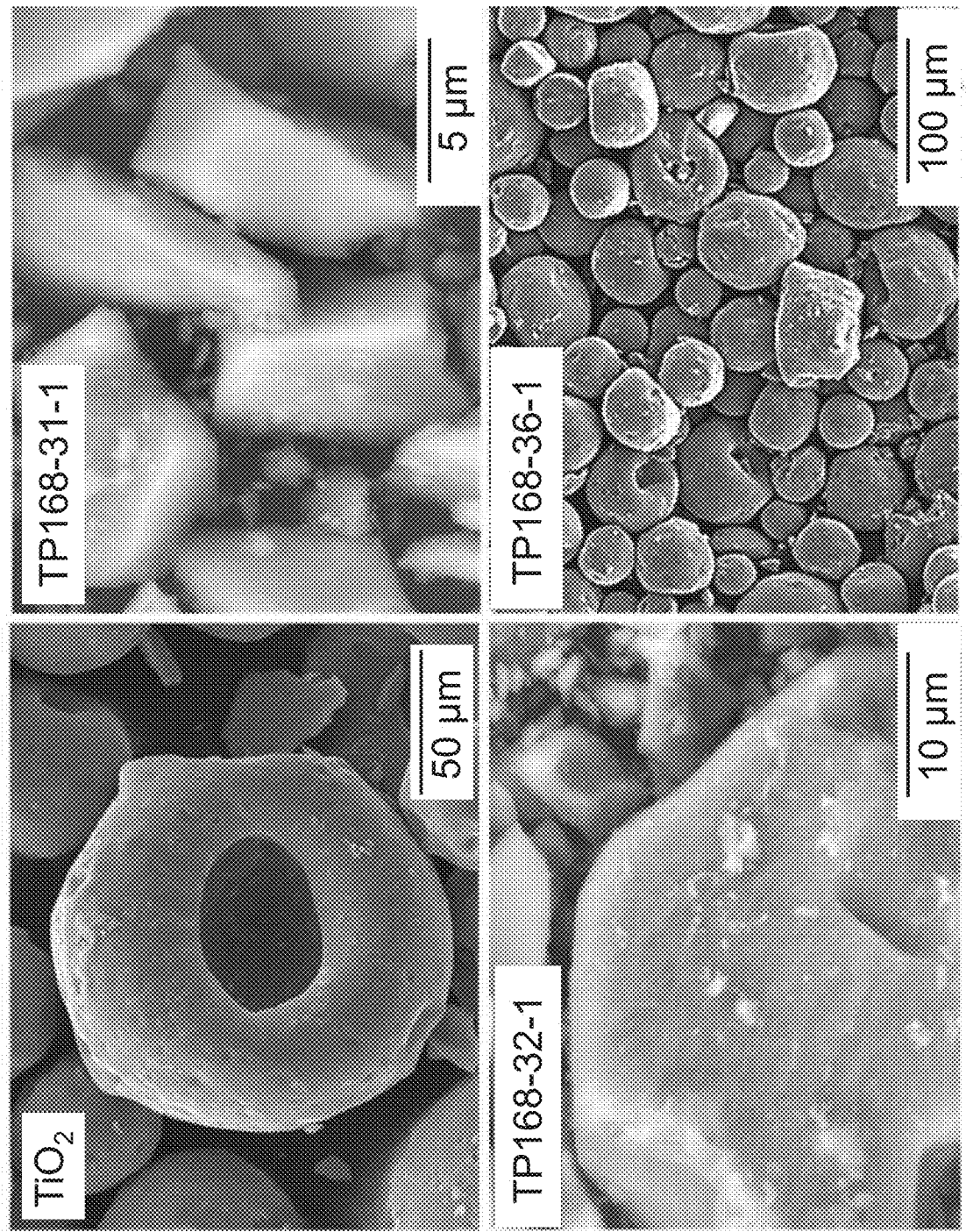
FIG. 14 illustrates a plurality of SEM photographs of surface-modified $TiO_2$ materials, according to various examples of the present disclosure.

FIG. 14 illustrates a plurality of SEM photographs of surface-modified $TiO_2$ materials, according to various examples of the present disclosure. The X-ray diffraction analyses of the solids revealed that their diffraction is consistent with a single phase consistent with the anatase phase of $TiO_2$. The SEM observation reveals that the TP168-36-1 materials have an average particle size distribution similar to the starting $TiO_2$ material (~70-80 μm mean diameter), while the other three have smaller particle sizes (~5-10 μm mean diameter) (representative scanning electron micrographs are shown in FIG. 14). This is presumably a consequence of the reaction conditions with prolonged reaction time, thermal activation and higher agitation via enhanced stirring speed promoting greater agitation of the particles and resulting in breaking of the particles into smaller sizes, with the stirring speed observed to have the dominant effect in controlling the particle size.

Figure 15B:
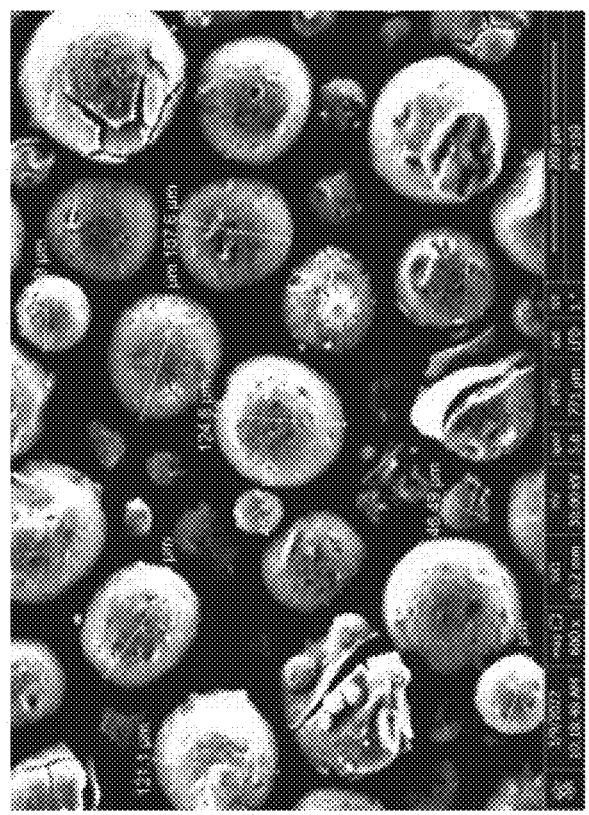
FIGS. 15A-15D are SEM photographs of $TiO_2$ starting material and of as-synthesized material, in accordance with various principles of the disclosure.
Figure 15A:
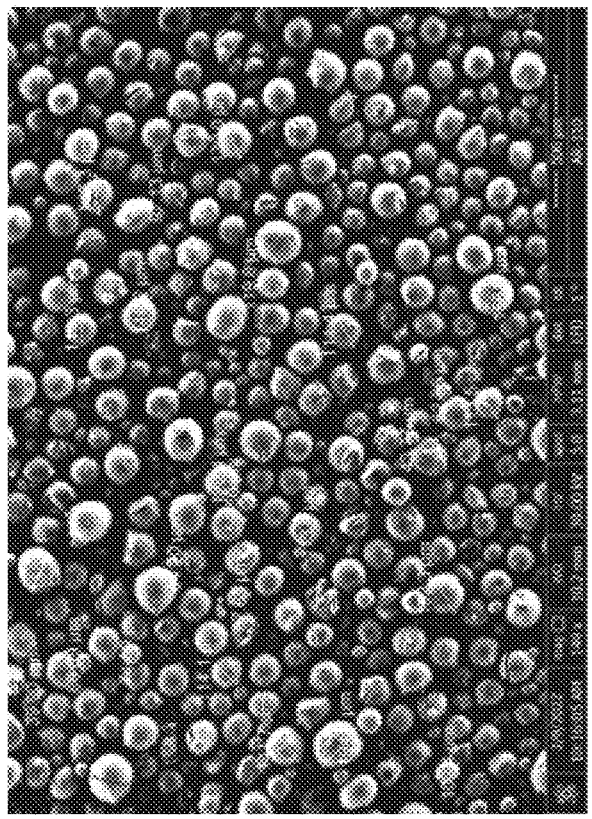
Figure 15D:
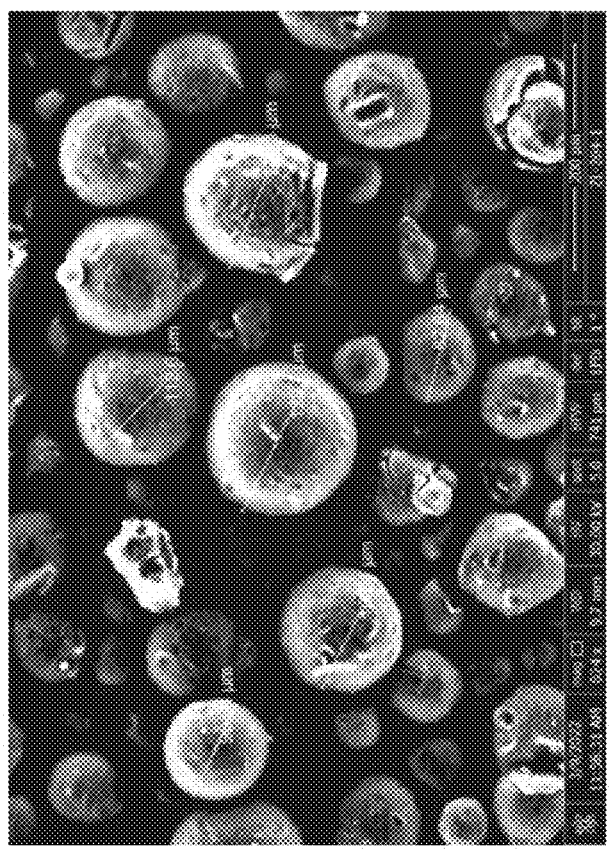
Figure 15C:
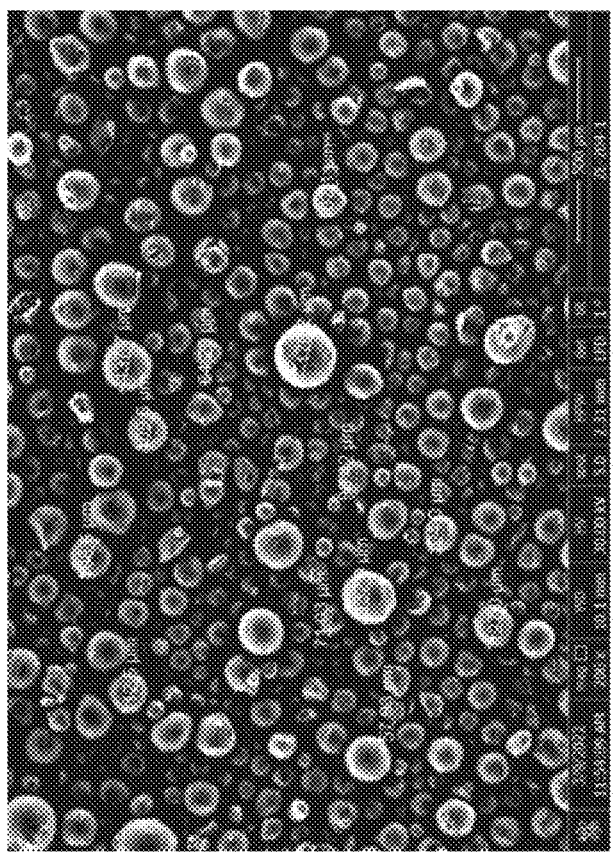

FIGS. 15A-15D are SEM photographs of $TiO_2$ starting material (FIGS. 15A and 15B) and of as-synthesized material (FIGS. 15C and 15D), in accordance with various principles of the disclosure. In FIGS. 15A and 15B, the particle size of the starting material is shown, which can be seen to vary from 40 μm to 200 μm, in agreement with 110 μm average size specification from manufacturer. In FIGS. 15C and 15D, the particle size of the synthesized material is shown, which varies from 50 μm to 170 μm, and no significant breaking down is observed.

Batch Sorption

Figure 16:
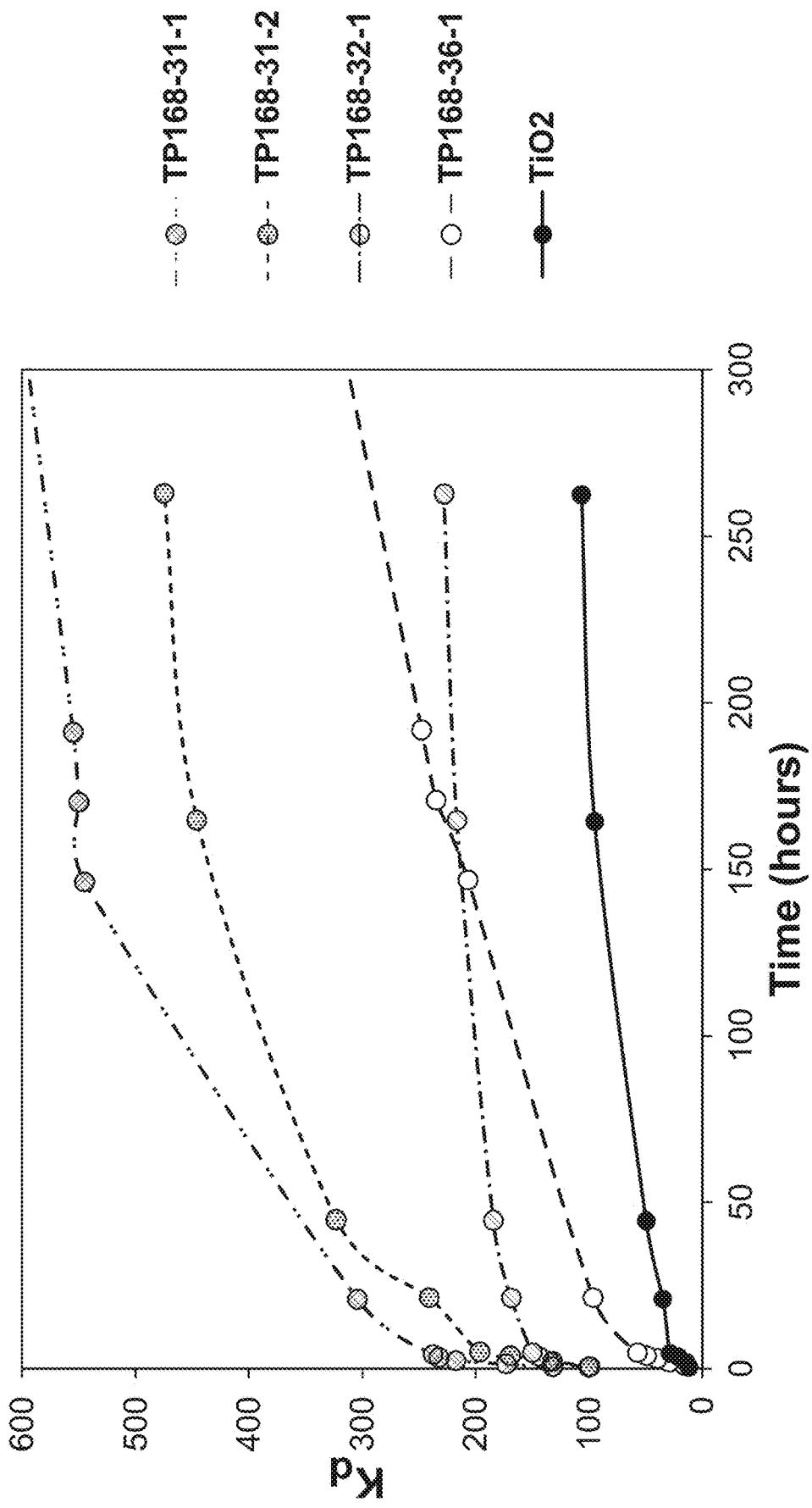
FIG. 16 is a plot illustrating the evolution of the distribution coefficient of $Th^{4+}$ uptake by $TiO_2$ and surface-modified $TiO_2$ as a function of pH, according to various examples of the present disclosure.

FIG. 16 is a plot illustrating the evolution of the distribution coefficient of $TiO_2$ and surface-modified $TiO_2$ as a function of pH, according to various examples of the present disclosure. Kinetics plays a role in the sorption behavior of any sorbent, and the hallmark of any good sorbent is rapid uptake kinetics and slow desorption kinetics. Therefore, the kinetics of Th sorption of the surface modified $TiO_2$ material and compare and contrast that with the Th sorption kinetics of the commercial $TiO_2$ are discussed below. The uptake kinetics is monitored, where ~50 mg of each of the sorbent materials are individually contacted with 10 mL of 2.5 mM Th stock solution at pH ~3. The uniform contact between the sorbent and Th solution is ensured via uniform shaking of the contact solutions, from which aliquots are periodically withdrawn to determine the Th content in the supernatant.

The uptake kinetics may be slow to moderate for unmodified $TiO_2$ under these conditions, with a $K_d$ value of ~28 after 4.6 hours of contact and reaching a maximum of 107 before approximately plateauing off at ~110 after 262 hours. The surface modified titania, on the other hand, exhibited a significantly improved sorption kinetics, that seemed to be dependent on the particle size, the smaller the particle size, the better the sorption kinetics. Therefore, TP168-36-1, with average particles sizes that approximately matched with the commercial titania, showed a $K_d$ value of ~60 after 4 hours of contact, and continued an upward rise. After 340 hours of monitoring, a $K_d$ value of 340 is reached, and the rate of increase of $K_d$ with time had significantly tapered off although a plateau had still not been reached. By contrast, the TP168-31-1 composite with an average particle size of ~5 μm, showed the best sorption kinetics among the materials tested, reaching a $K_d$ value of ~240 after 4.2 hours, and eventually tapering off at a $K_d$ value of ~610 after 330 hours. An overlay of the variation of $K_d$ with time is shown in FIG. 16. In various examples, the P-modified titania material has an average particle size of about one of 5 to 10 μm, 30 μm, and 70 to 80 μm. In other examples, the P-modified titania material has an average particle size in a range of 5-100 μm.

The significant improvement in distribution coefficients in going from pure $TiO_2$ to phosphate-modified $TiO_2$ shows promise towards use of these modified materials as the IX resins in an Ac generator. Furthermore, monitoring each of the supernatant contact solutions after being in contact with the sorbents for 30 days showed no fresh ingrowth of Th in the supernatant, suggesting minimal to no Th desorption from the composites. For subsequent columns, TP168-31-1 and TP168-36-1 are chosen. TP168-31-1 is chosen due to its superior $K_d$ compared to the other sorbents. TP168-36-1, on the other hand has particle sizes that are most representative of the unaltered $TiO_2$ material and consequently its physical column operation parameters such as the material resistance to flow rate and bed volume being expected to be similar with the unaltered material. The $K_d$ values of select materials after 4 and 200 hours respectively are shown in Table 8.

TABLE 8

Tabulation of $K_d$ values after 4 hours and after 200 hours for the unmodified $TiO_2$ and phosphate modified $TiO_2$.

| Material | $K_d$ (4 hours) | $K_d$ (200 hours) |
| --- | --- | --- |
| $TIO_2$ | ~25 | 100 |
| TP168-31-1 | 235 | 560 |
| TP168-31-2 | 169 | 450 |
| TP168-32-1 | 144 | 220 |
| TP168-36-1 | 50 | 250 |

Columns

Based on the significantly improved distribution coefficients of the phosphate modified $TiO_2$ materials, as demonstrated by the batch experiments, column exchanges may be performed under varying parameters of variable Th concentrations, flow rates, elution speeds. The column experiments may be focused on the TP168-36-1 and TP168-31-1 materials for reasons discussed above. The results are tabulated in Table 9. In general, exceptional Th uptake is observed for all the columns across the board ranging from 99.253±0.004% uptake in the worst case and improving to 99.999±0.001% in the best cases, where the Th loss is lower than the detection limits of the ICP-MS instruments. Therefore, for the TP168-36-1 materials, while a faster loading at 10 mL/h may result in 99.253% retention or 0.747% Th breakthrough (column 168-56), slowing down the loading to 2 mL/h resulted in an improvement in Th retention such that no Th loss is detected above the ICP-MS detection limits. Incidentally, the 99.999% Th removal corresponds to a 99.8% Th remaining after 200 separation batches, based on equation [4] above (as shown in Table 11). Increasing the $TiO_2$/Th ratio or using a buffer also produced similar improvements in Th removal and capture.

therefore it is recommended to maintain a flow rate of 5-10 mL/h for the failure-free, safe operation of columns using this material.

To summarize, the phosphate modified $TiO_2$ based materials demonstrated a near quantitative Th uptake even without the presence of a buffer solution and even without necessitating slow Th loading rates, therefore demonstrating superior Th uptake capacity and faster Th sorption kinetics compared to unaltered $TiO_2$. This ability to obtain quantitative Th uptake without the need for a buffer significantly minimizes the post processing purification steps and helps simplifying the overall Ac generation and recovery process.

TABLE 9

Tabulation of the Column Elution in Presence of Phosphate Modified Titania

| Unique column identifier | Column conditions | Flow | Feed pH | IX mass (g) | Column BV (mL) | Column type | Th mass in feed (g) | % Th retention |
|---|---|---|---|---|---|---|---|---|
| 168-56* | TP168-36-1 material washed with 550 mL DI water and 25 mL of pH = 4 solution | flow rate 120 mL/h during preload wash; 10 mL/h during loading and post load wash | 3.7 | 4.9 | 3.7 | 5 mL VWR column | 0.174 g in 20 mL | 99.253 ± 0.004 |
| 168-50 | TP168-36-1 material washed with 225 mL DI water and 25 mL of pH = 4 solution | flow rate 45 mL/h during preload wash; 10 mL/h during loading and post load wash | 3.7 | 4.5 | 3.7 | 5 mL VWR column | 0.093 g in 10 mL | 99.991 ± 0.003 |
| 168-75 | TP168-36-1 material washed with 550 mL DI water and 25 mL of pH = 4 solution | flow rate 120 mL/h during preload wash; 3.5 mL/h during loading and 10 mL/h post load wash | 3.6 | 9.4 | 3.7 | 10 mL VWR column | 0.144 g in 10 mL | 99.999 ± 0.001 |
| 168-106 | TP168-36-1 material washed with 150 mL DI water and 25 mL of pH = 4 solution | flow rate 60 mL/h during preload wash; 2 mL/h during loading and post load wash | 3.8 | 5 | 3.7 | 5 mL VWR column | 0.099 g in 10 mL | 99.998 ± 0.003 |
| 168-113 | TP168-36-1 material washed with 100 mL DI HOA/NaOA buffer and 25 mL of pH = 4 solution | flow rate 60 mL/h during preload wash; 2 mL/h during loading and post load wash | 3.9 | 5 | 3.7 | 5 mL VWR column | 0.099 g in 10 mL | 99.999 ± 0.001 |
| 168-66* | TP168-36-1 material washed with 350 mL of pH = 4 solution | flow rate 120 mL/h during preload wash; 5 mL/h during loading and 10 mL/h post load wash | 3.8 | 5 | 8.0 | 10 mL VWR column | 0.174 g in 20 mL | 99.999 ± 0.001 |

These columns are subsequently subjected to saturation experiments, only the initial Th loading data is presented in this table.

Figure 17:
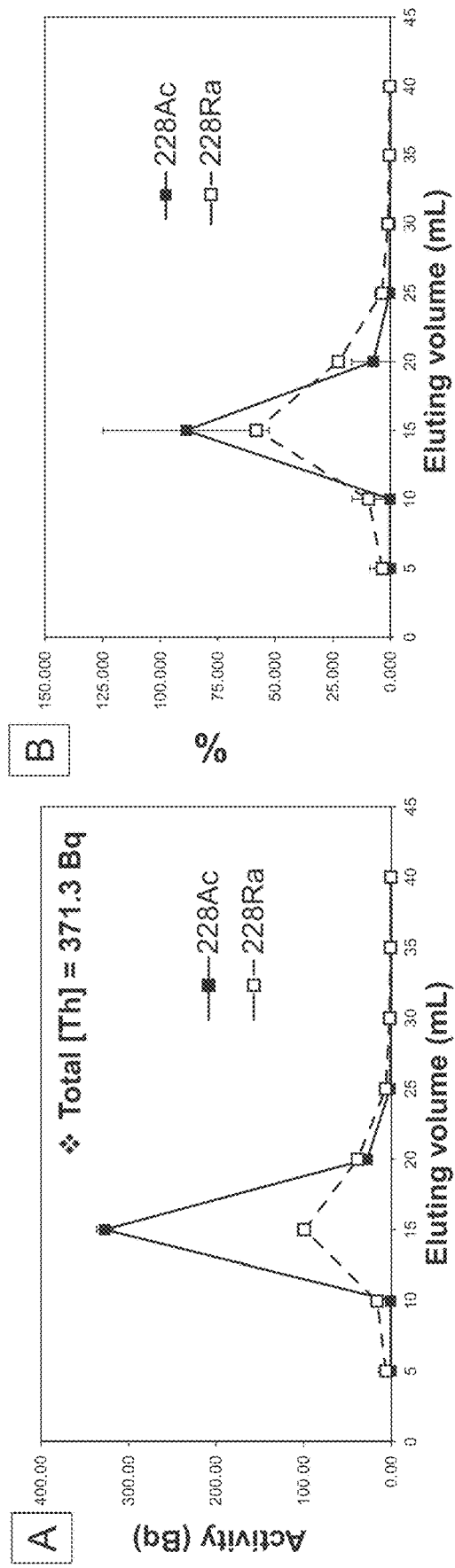
FIGS. 17-19 are plots illustrating $^{228}$Ra and $^{228}$Ac activities and percentage recoveries, according to various examples of the present disclosure.

For the TP168-31-1 material, even using a faster loading of 10 mL/h and the absence of buffer generated a >99.999% Th retention. This indicates that the slow/moderate kinetics demonstrated by unmodified $TiO_2$ is overcome in the phosphate modified materials resulting in faster sorption kinetics, which supports the batch contact kinetics results discussed above. The TP168-31-1 material has a significantly smaller particle size which helpfully results in its volume to mass ratio being 1.6 mL/g compared to that of unmodified $TiO_2$ or TP168-36-1 where this ratio is 0.72 mL/g. This is also manifested in TP168-31-1 material requiring a 10 mL column to accommodate 5 g of the material, evidenced by the bed volume of 5 g of TP168-31-1 measuring to ~7.7 mL, when compared to a 3.7 mL bed volume for the same mass of $TiO_2$ or TP168-36-1. Therefore, the improved retention by this material is a combination of (i) the enhanced active surface area of this material leading to more effective contact of Th and consequently better uptake, (ii) the increased volume to mass ratio increasing the contact time between Th and the material which further contributes to the better uptake. For example, the smaller sized particles in the case of TP168-31-1 can result in a stronger back pressure if the elution speed is made significantly fast, which may lead to mechanical breakthrough or failure of the column, and Relation Between Th in the Column and Ra/Ac Uptake FIGS. 15-17 are plots illustrating $^{228}$Ra and $^{228}$Ac activities and percentage recoveries, according to various examples of the present disclosure. Post the Th loading on the columns, gamma spectroscopy is conducted on the eluting fractions to probe the recovery of the $^{232}$Th progenies, namely $^{228}$Ra and $^{228}$Ac. The $^{228}$Ra and $^{228}$Ac recoveries for select column runs are shown in Table 10.

TABLE 10

$^{228}$Ra and $^{228}$Ac recoveries for select phosphate modified-$TiO_2$ column runs

| # | IX (g) | [Th] (Bq) | % $^{228}$Ac recovery | % $^{228}$Ra recovery |
|---|---|---|---|---|
| 168-50 | 4.5 | 371.3 | 99.3 ± 6.9 | 45.9 ± 6.1 |
| 168-56 | 4.9 | 708.3 | 98.1 ± 3.4 | 70.0 ± 4.9 |
| 166-95 | 5.0 | 370.3 | 98.9 ± 6.3 | 95.3 ± 5.1 |

Figure 18:
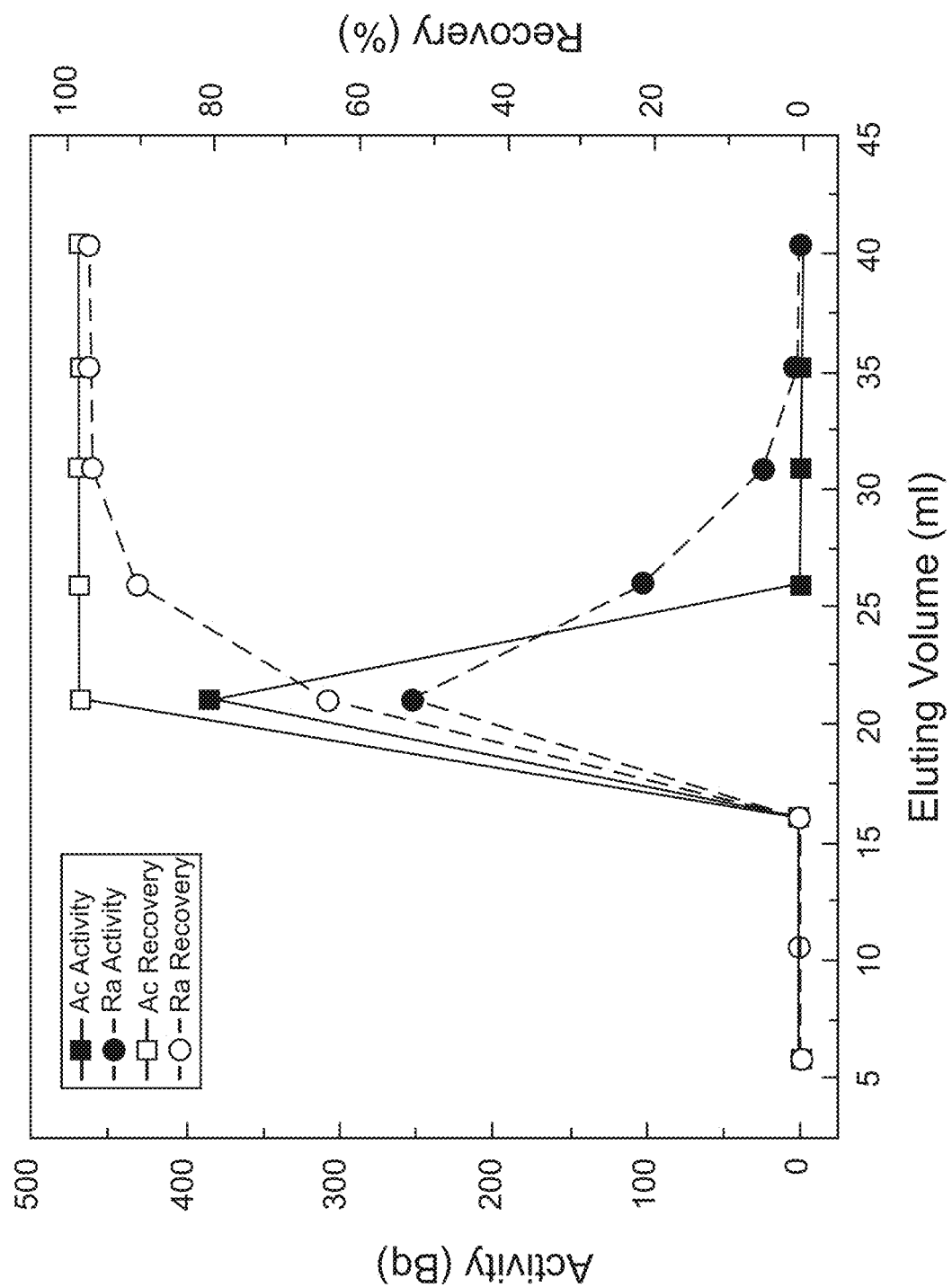
Figure 19:
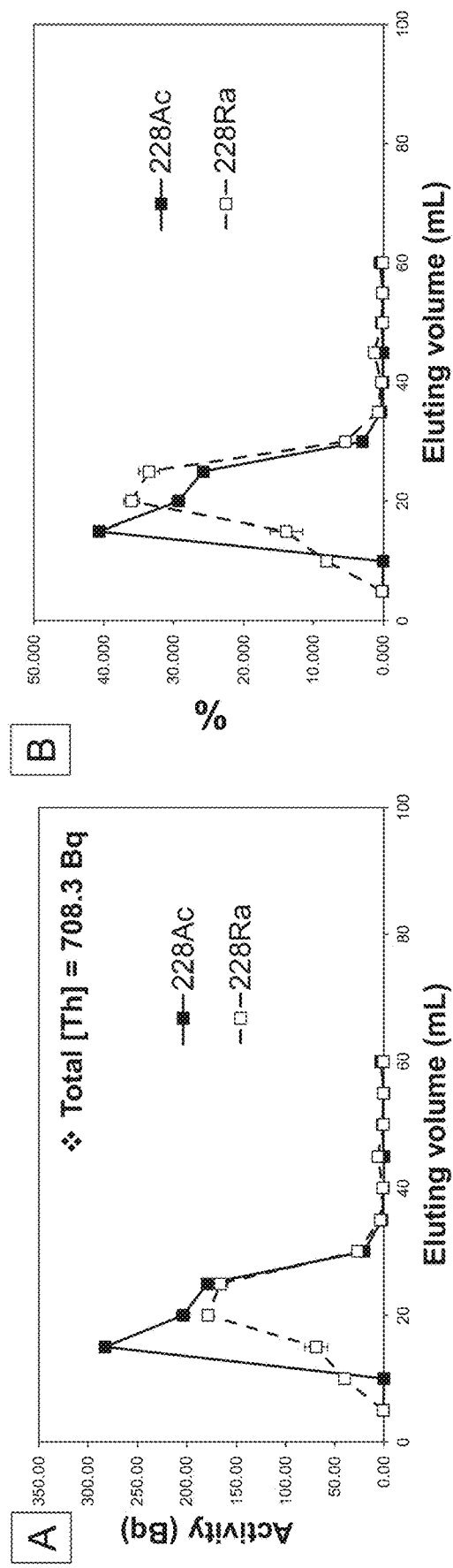

When the total Th concentration in the feedstock is 0.093 g or ~371 Bq for a total of 4.5 g IX material (column 168-50), a >99% of $^{228}$Ac recovery is observed as shown in FIG. 17. Notably, only 46% of $^{228}$Ra recovery is observed, suggesting the retention of the rest of the material in the column. This result is in contrast to that observed for the pristine $TiO_2$ (representative example for column 166-96 shown in FIG. 18) and is presumably a consequence of Ra binding to the surface phosphate groups in the column. This is also suggestive that while there is some affinity of the phosphate modified $TiO_2$ towards Ra, the near quantitative Ac recovery indicates no affinity of the resin towards Ac. For example, when the Th concentration is approximately doubled to 0.174 g or ~708 Bq in the feed (column 168-56), the $^{228}$Ac recovery is still near quantitative at 98% while the $^{228}$Ra recovery increases to ~70%, as shown in FIG. 19. This is suggestive of a greater affinity of the phosphate modified titania towards Th compared to Ra. At a lower Th concentration of 371 Bq, more surface sites are available for Ra to bind. As the Th concentration is increased without increasing the IX resin quantity, more surface sites on the modified titania are now occupied by the Th, leaving less sites available for Ra, and therefore a higher concentration of Ra now passes through the column uncaptured, leading to greater recovery. Therefore, the binding affinity of the resin towards Th and its two daughters, Ra and Ac follows the trend: Th>>Ra>>Ac. A schematic representation to justify the Ra/Ac elution behavior is shown in FIG. 20.

Figure 20:
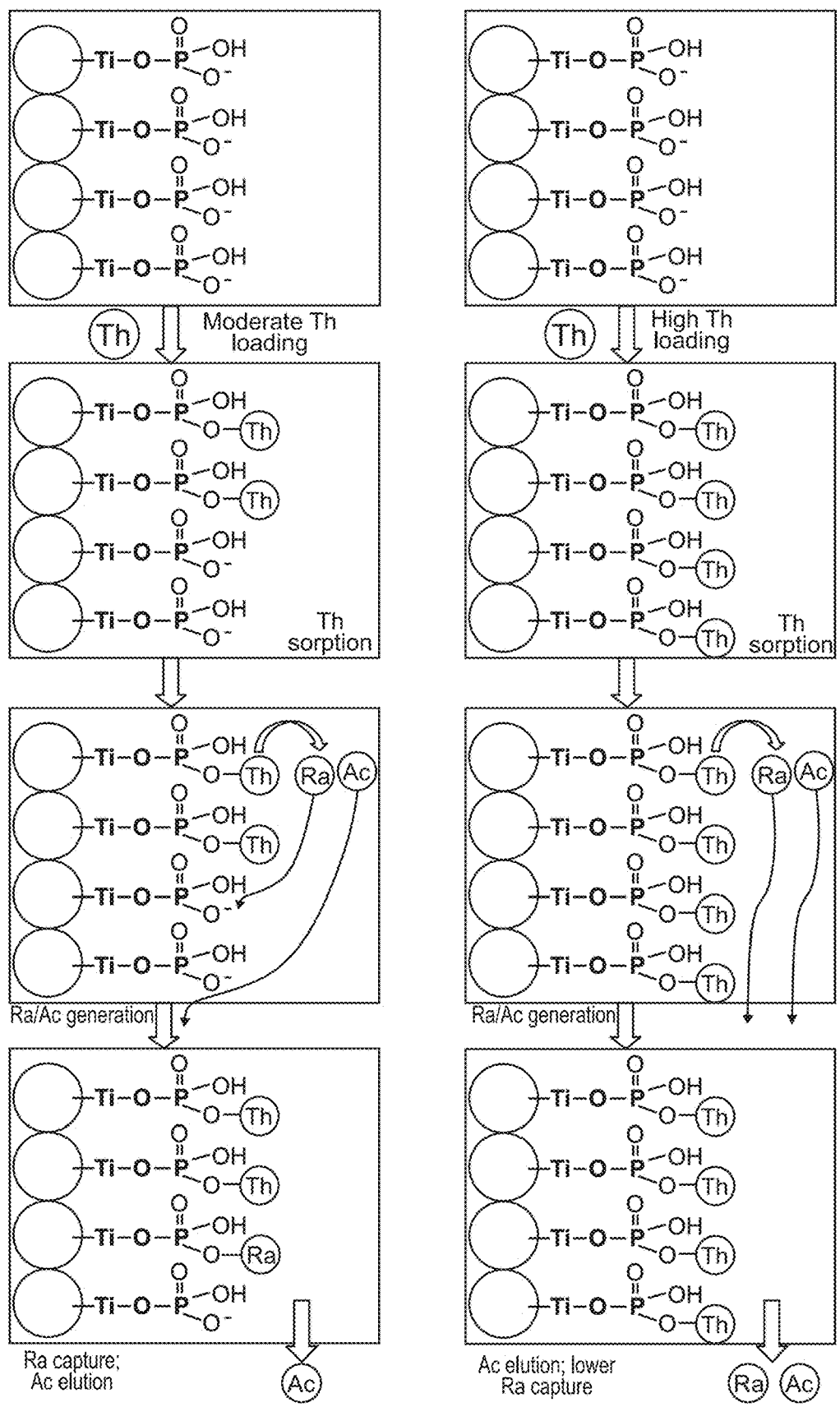
FIG. 20 is a schematic representation of $^{228}$Ra and $^{228}$Ac elution behavior as a function of Th loading, according to various examples of the present disclosure.

FIG. 20 is a schematic representation of $^{228}$Ra and $^{228}$AC elution behavior as a function of Th loading, according to various examples of the present disclosure. In an example, the preference shown by the phosphate modified IX resin towards Th compared to both Ra and Ac is expected based on the relative charges and charge densities. The >95% consistent Ac recovery in the eluant is a desired result. The interaction of Ra with phosphate is not surprising as the Ra—$PO_4^{3-}$ interactions have been the basis for the medical use of $^{223}$Ra in TAT applications in bone cancer. In fact, the binding affinity of the material towards Ra opens up the possibility of a new generator class where both the Th as well as its Ra progeny will be captured while Ac will elute through; this may reduce or eliminate the need for a subsequent Ra/Ac separation step and simplify the process flowsheet.

Uptake Capacity

FIGS. 19 and 20 are example elution profiles during Th saturation, according to various examples of the present disclosure. A desirable feature of a good generator material is a high uptake capacity for Th. A high uptake capacity will signify the Th preconcentration within a reasonably small bed volume of column material, which would translate to a high concentration of Ac during its elution. This can in fact translate to a subsequent evaporation step to concentrate the eluted fraction being substantially reduced or even unnecessary, in instances where uptake capacity is high. Motivated by the higher uptake tendency towards Th, faster uptake kinetics and slow desorption kinetics, the uptake capacity of the two sets of materials, namely TP168-31-1 and TP168-36-1 are studied via saturation experiments (continuation of columns 168-56 and 168-66 respectively). The process consisted of repetitive cycles of passing a Th loaded stock through a column of the material, followed by its thorough washing. The process is repeated till the concentration of Th in the stock being passed through the column matched the concentration of Th eluting out, signifying that the column had reached its capacity.

Figure 21:
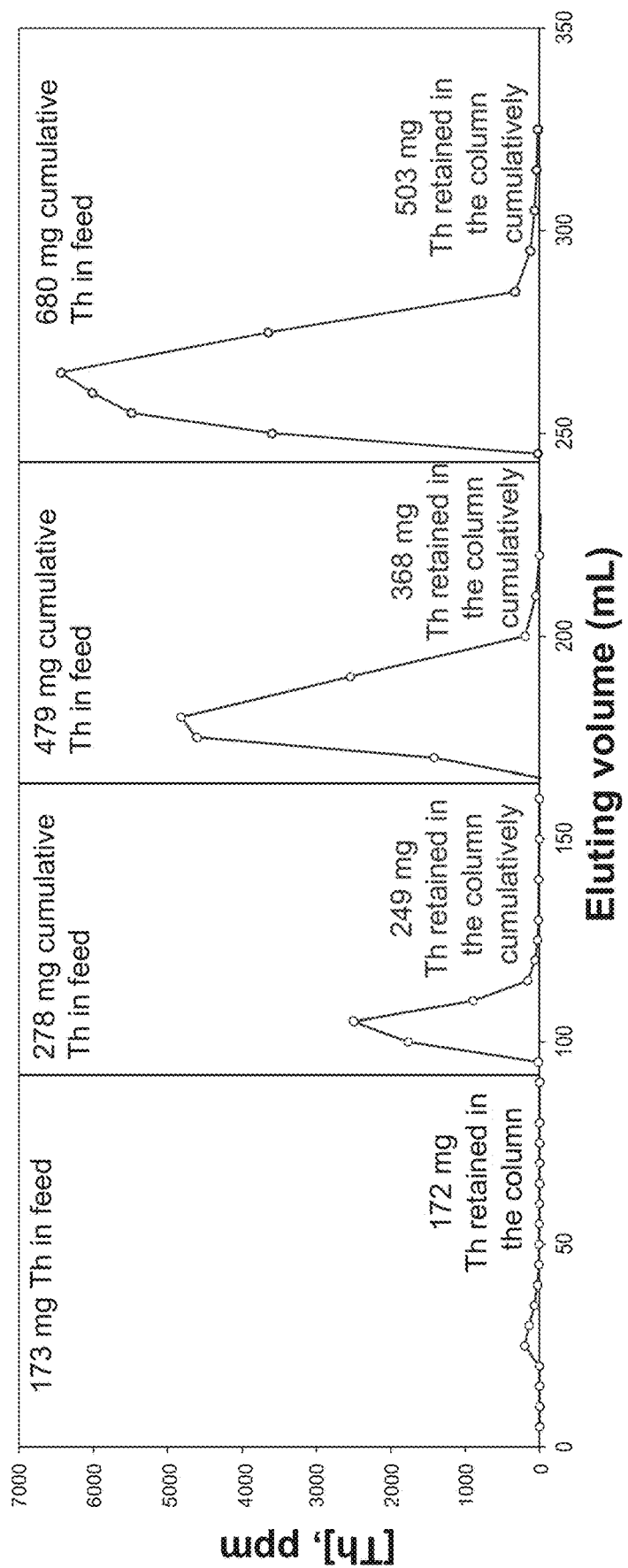
FIGS. 21 and 22 are example elution profiles during Th saturation, according to various examples of the present disclosure.
Figure 22:
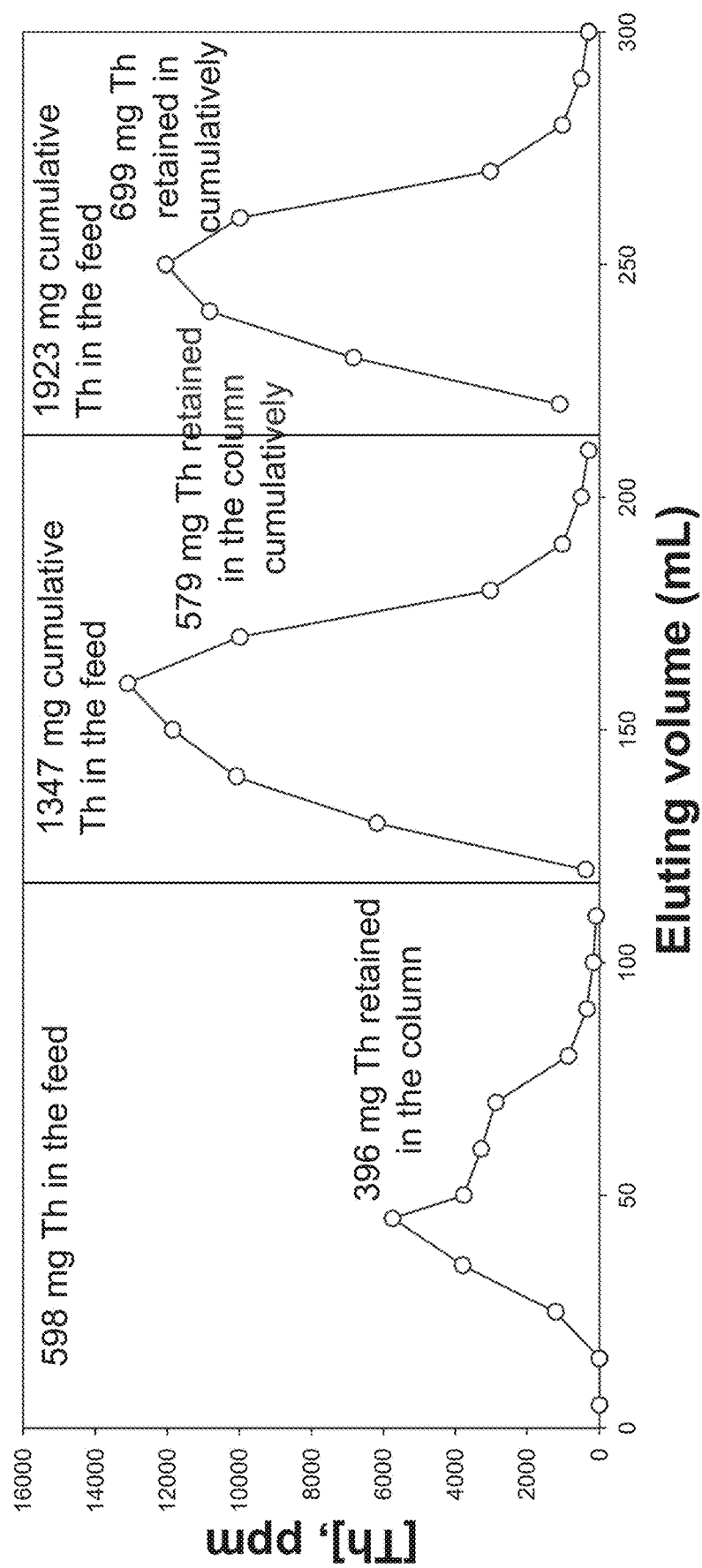

For both the materials, ~5.0 g of total material is used. For the TP168-36-1 material it amounted to a column bed volume of ~3.5 mL, while for the TP168-31-1 it amounted to a bed volume of ~8 mL. The higher bed volume of TP168-31-1 is due to its smaller particle size, which accounts for its higher contact surface volume per unit mass. A representative elution profile for 4.9 g of TP168-36-1 material is shown in FIG. 21, where the Th breakthroughs are plotted as a function of eluting volume. It is observed that as more and more Th is fed to the column, higher and higher Th breaks through with the elution till the eluting concentration equals the Th concentration of the feed. The higher breakthrough is not surprising; as the Th saturates the upper layers, more and more Th reaches the lower layers and a portion of that breaks through due to the moderate sorption kinetics. We can anticipate that if the loading is done at a significantly slower pace, a significantly smaller quantity of Th would break through pre-saturation. Not shown in FIG. 21, the column with TP168-36-1 material reached a complete saturation at 0.524 g of Th, which equates to an uptake capacity of ~0.107 g of Th per 1.0 gram of TP168-36-1. A similar study conducted on TP168-31-1 demonstrated an uptake capacity >0.140 g of Th per 1.0 g of the sorbent material, as shown in FIG. 22. The above examples demonstrate the Th capacity of the TP168-36-1 material being twice that of $TiO_2$, and the capacity of the TP168-31-1 material greater than three times the pristine $TiO_2$.

Ac and Ra Eluting and Subsequent Ra Harvesting

As discussed earlier, one criteria for the selection of a generator is the efficiency of the recovery of the generated Ra/Ac progenies from the column. An effective way to probe the efficiency of the recovery of the daughters is through alpha spectroscopy to probe $^{224}$Ra build up from $^{228}$Th decay. For the phosphate modified materials, the sorption of Ra by the phosphate modified materials are observed, as demonstrated in above. Therefore, to avoid complexities, Th saturated columns 168-56 and 168-66 are used.

As discussed earlier, column 168-56 is loaded with 4.9 g of TP168-36-1, with similar size and density as unaltered $TiO_2$, and amounted to a bed volume of 3.7 mL. To probe the $^{224}$Ra recovery, the column is eluted with aqueous solutions adjusted at pH 4, following a period of 20 days after the first Th loading. An elution rate of 30 mL/h is used. A total of 95% $^{225}$Ra recovery is observed within 10 mL of eluant, amounting to ~3 bed volumes. This demonstrates a significant reduction in elution volume compared to the unaltered $TiO_2$, presumably due to the higher affinity of the modified materials leading to Th preconcentration within a smaller mass/volume of the sorbent. For example, no Th is detected in the alpha spectroscopy, demonstrating efficient Th retention leading to no Th breakthrough from the column.

Column 168-66 on the other hand, is loaded with 4.9 g of TP168-31-1, a material with significantly enhanced volume to mass ratio, leading to a bed volume of 8.1 mL. To probe the $^{224}$Ra recovery, the column is eluted with aqueous solutions adjusted at pH 4, following a period of 21 days after the first Th loading. An elution rate of 30 mL/h is used. A total of 95% $^{225}$Ra recovery is observed within 20 mL of eluant, amounting to ~2.5 bed volumes. As in the case of the TP168-36-1 material, no Th breakthrough from the column is detected.

Th Retention in the Column & P Loss

As in the case of $TiO_2$ based IX resin, a similar high retention of Th in the phosphate modified columns are also observed. Similar to the $TiO_2$ based IX resin, the phosphate columns post Th loading are extensively rinsed periodically every 3-4 weeks to harvest Ra/Ac using a pH ~4 solution. During this time, the eluant is also tested for Th leaching into the eluant to assess the effectiveness of Th retention. In each of these instances, the cumulative Th loss is less than 0.001% of the total Th loaded onto column. This indicates a high Th retention and consequently, high affinity of Th towards the phosphate-based resins as well.

An additional set of experiments consisted of evaluation of the amount of P being released from the columns in each of the elution and washing steps. To reduce or eliminate and limit P loss, the phosphate-modified materials, post their loading in the column, are extensively washed with pH 4 solution prior to Th loading. It is observed that while an appreciable amount of P is observed in the eluants in the initial stages of washing, they rapidly dropped to below ~50 ppm within 5-7 bed volumes, prior to Th loading. Subsequently, no appreciable P loss is observed in both Th wash and subsequent Ra/Ac elution cycles, with the maximum P amounting to <10 ppm. It is expected that the P loss can be made even lower by a more vigorous and through washing of the column prior to Th loading.

Column Design Considerations of Phosphate Based Materials

The phosphate-modified titania offers superior Th uptake capacity, faster Th sorption kinetics, and improved Th retention compared to unaltered $TiO_2$. Among these, TP168-31-1 has the fastest Th sorption kinetics and the highest Th uptake capacity among the materials tested. However, this material has considerable size differences compared to unaltered $TiO_2$; this leads to the surface volume to mass ratio of this material being significantly larger than $TiO_2$. This requires a column twice the volume required for $TiO_2$ for the same mass of the sorbent. On the other hand, the TP168-36-1 material, still offers a significant improvement compared to unaltered $TiO_2$ albeit not as great as TP168-31-1. This material also has similar particle size and density as the unaltered $TiO_2$, and therefore can be used with similar column configurations as $TiO_2$.

EXPERIMENTAL CONCLUSIONS

The overall aim of this study is to test the feasibility of $TiO_2$ and phosphate-modified $TiO_2$ inorganic ion exchange resins formulated in a column configuration to (i) quantitatively uptake Th from a feedstock separating it from its progenies, and (ii) secondly to immobilize and retain the Th for extended periods such that it can be used to harvest Ra/Ac daughters periodically.

In various examples, we demonstrated that untreated $TiO_2$ demonstrated moderate Th uptake capacity and slow Th sorption kinetics. However, preconditioning the $TiO_2$ by either (i) treating it with a HOA/NaOA buffer solution, or (ii) by modifying the surface of the $TiO_2$ with high affinity phosphate groups resulted in significantly enhancing uptake capacity. Furthermore, surface functionalization of the $TiO_2$ with phosphate significantly enhanced the sorption kinetics while retarding the desorption kinetics.

The materials in general exhibited high Th retention, as demonstrated by periodic rinsing of the Th loaded columns indicating ultratrace to no leaching of Th with the eluate. Th loss per each production cycle is below 0.01%. On the other hand, the Ac and Ra daughters could be conveniently harvested from the column through its periodic rising, demonstrating this to be an ideal configuration as an Ac generator. Furthermore, the deliberate stripping of the columns using acid solutions of moderate concentrations demonstrated quantitative recovery of the Th, indicating the preservation of Th mass balance during the column operations.

Accordingly, in various examples, both the $TiO_2$ and phosphate modified $TiO_2$ materials provide an improved option as a generator for $^{225}Ac$, providing all the necessary qualities that are desired in the generator.

In an example, the column configurations employing either the use of a buffer solution on unaltered $TiO_2$ or the phosphate modified $TiO_2$ in the absence of buffer consistently demonstrated ~100% Th capture from the feedstocks.

Furthermore, 99.999% Th retention is observed with no Th mass loss observed across multiple washing and elution cycles across multiple column batches, demonstrating the strong Th affinity and low desorption kinetics.

In another example, deliberate stripping of the columns using 1 M HCl solutions post Th loading demonstrated 100% Th recovery.

In a further example, a greater than 99.99% Th mass balance and recovery may be deciding factors in the long-term success probability of an $^{225}Ac$ generator, as given by Equation [2] above and demonstrated in Table 11 below.

The phosphate modified titania provides additional benefits of enhanced Th capture capacity, e.g., a capture capacity of 3 times or more, compared to the unmodified $TiO_2$ without the need of a buffer solution. The enhanced uptake capacity allows the Th to be preconcentrated within a smaller column bed volume, thus requiring a smaller volume of eluant during Ac elution. This in unison with the reduction or elimination of the need for the buffer reduces the concentrating and purification steps post Ac elution and simplifies the overall process.

The slow/moderate Th sorption kinetics of the unaltered $TiO_2$ is overcome by the phosphate modification of the surfaces; in the latter case, little effect is observed on increasing the loading rates from 2 mL/h to 10 mL/h, suggesting a significantly enhanced sorption kinetics presumably due to the higher Th affinity of $PO_4^{3-}$ compared to oxide binders in unmodified $TiO_2$.

The column configuration provides a format that is tailor made for operational flexibility; it allows a configuration where the Th can be immobilize and subjected to periodic washing for Ac recovery without the need for involved or labor intensive pre- or post-processing steps.

TABLE 11

Relationship between $^{229}Th$ recovery post 225Ac elution and Th retention after 5, 10 and 20 years

| Thorium Recovery | Thorium Remaining After 50 batches (5 years) | Thorium Remaining After 100 batches (10 years) | Thorium Remaining After 200 batches (20 years) |
|---|---|---|---|
| 95% | 7.7% | 0.6% | 0% |
| 99% | 61% | 36% | 13% |
| 99.9% | 95% | 90% | 82% |
| 99.99% | 99% | 99% | 98% |
| 99.999% | 99.9% | 99.9% | 99.8% |

According to various examples, the phosphate-modified $TiO_2$ based materials demonstrated a near quantitative Th uptake even without the presence of a buffer solution and even without necessitating slow Th loading speeds, therefore demonstrating superior Th uptake capacity and faster Th sorption kinetics compared to unaltered $TiO_2$. This ability to obtain quantitative Th uptake without the need for a buffer significantly minimizes the post processing purification steps and helps simplifying the overall Ac generation and recovery process.

Treatment to Reduce Ra Sorption onto the IX Material

Figure 23:
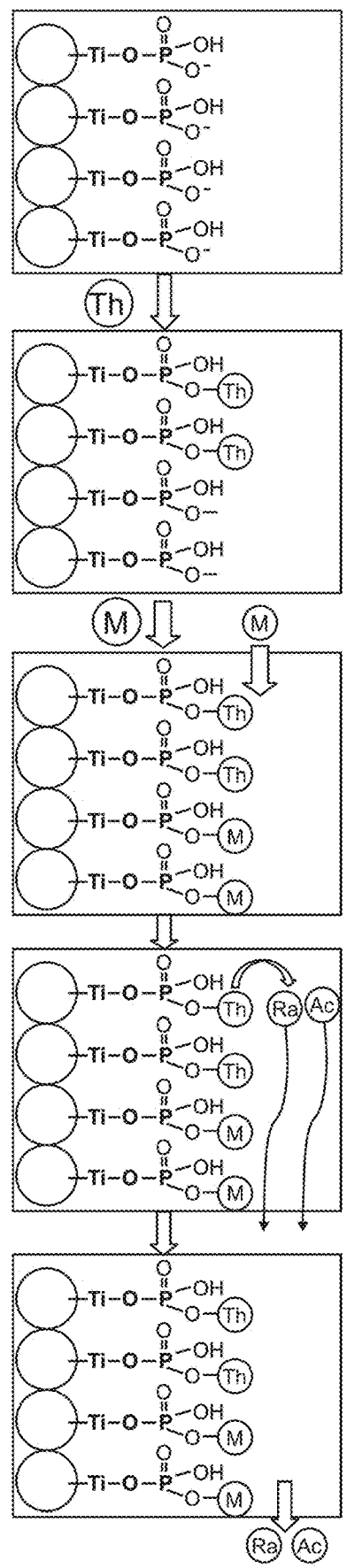
FIG. 23 illustrates an example of a method to reduce Ra sorption onto IX material in a column and, thereby, increase recovery of Ra, according to various examples of the disclosure.

FIG. 23 illustrates an example of a method to reduce Ra sorption onto IX material in a column and, thereby, increase recovery of Ra, according to various examples of the disclosure. In the example shown, Th feedstock is passed through the column containing IX material to load the column with Th. The IX material could be any one of the phosphate-modified titania, the buffered titania, or unmodified titania as described above or, even, a combination of two or more of the IX materials, although FIG. 23 is illustrated as the phosphate-modified titania.

After loading the column Th, a secondary solution of a tetravalent $M^{4+}$ cationic salt (representative examples of $M^{4+}$ being $Ti^{4+}$ and $Zr^{4+}$) will be passed through the column. This will lead to these ions filling up any vacant sites on the column that are not occupied by $Th^{4+}$ provided that sufficient $M^{4+}$ concentrations are passed through the column. The use of a tetravalent metal ion will provide separation from Ra and Ac as well as a means for purification from Th. The excess $M^{4+}$ ions not sorbed onto the column and eluting through will be captured by an UTEVA column.

This entire process will lead to the capture sites on the column being occupied. Therefore, any Ra that is generated along with Ac during Th decay will not have available sites on the column and will pass through.

Column Design Suitable for Use as an Ac Generator

Figure 24:
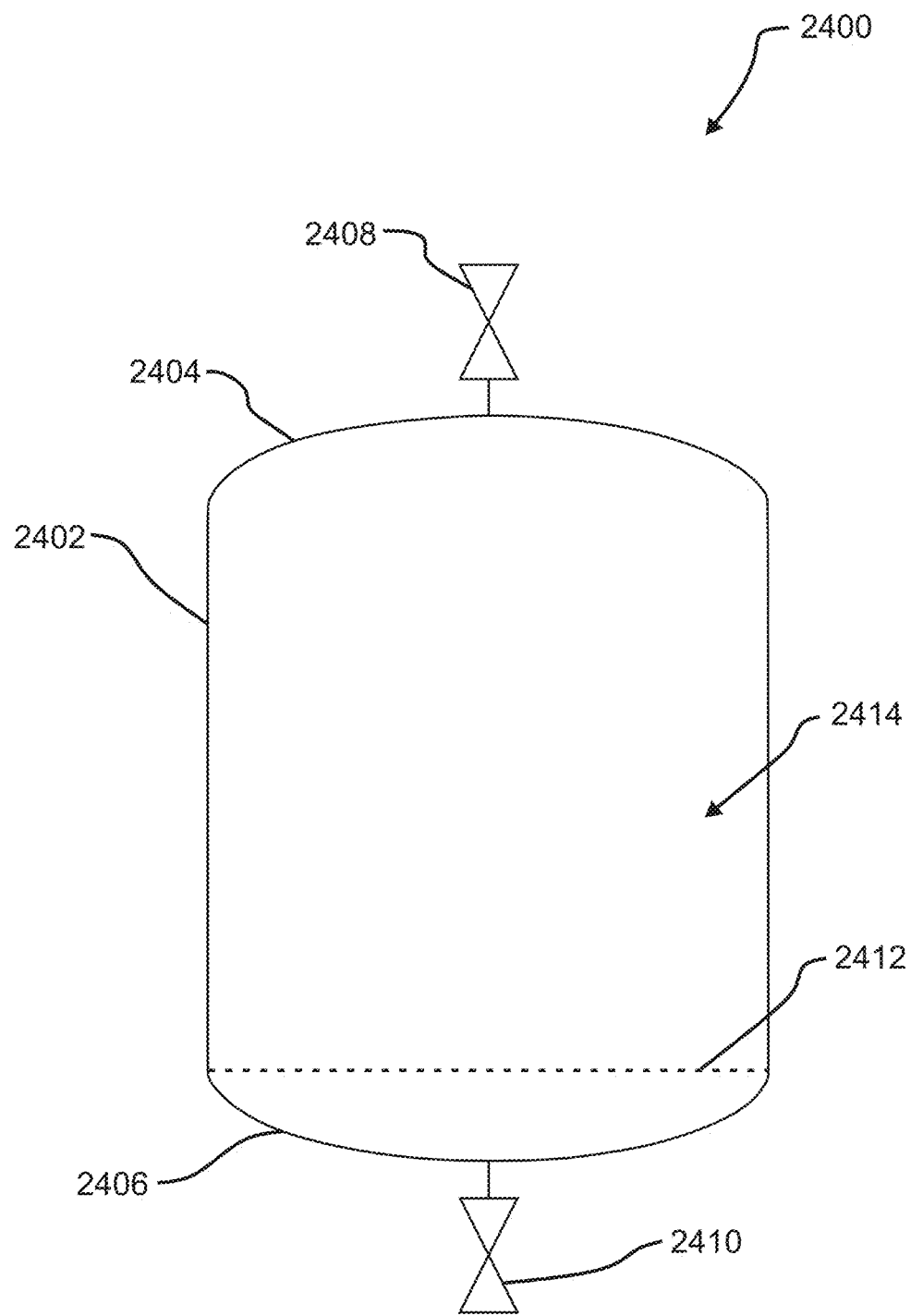
FIG. 24 illustrates an example of a generator in the form of a column filled with IX material.

FIG. 24 illustrates an example of a generator in the form of a column filled with IX material. The generator 2400 includes a cylindrical column body 2402 defining an internal cavity, a top or lid portion 2404 that, when engaged, seals the cavity, and a bottom 2406 which defines an interior chamber 2414 that contains the source material, that is, the IX material in any of the forms described above. One or both of the top 2404 and the bottom 2406 may be removably attached to the body 2402 to allow the source material to be inserted into or removed from the generator 2400. This may be achieved by any known system, such as corresponding threaded portions, for example on the lid portion and in the cylindrical body (not shown). Alternatively, the generator 2400 may be of a unitary construction and the source material charged through a sealable access port (not shown) or during the construction of the generator.

In the example illustrated in FIG. 24, two fluid flow valves 2408, 2410 are provided, first valve 2408 (which may be an output value in some examples) in the top 2404 and a second valve 2410 (which may be an input valve in some examples) in the bottom 2406. In yet another example, the generator may not be completely sealed when the lid is engaged, for example, to allow gas to escape or to allow the generator to be immersed in the extraction material rather than having extraction material injected into the generator through a valve or access port. Although valves 2408, 2410 are shown at the top and bottom of the generator 2400 respectively, one of skill in the art will recognize that the valves 2408, 2410 can be located in any appropriate location and/or orientation and do not necessarily have to be placed on opposing sides of the generator. Similarly, any type, shape or number of valves, u-tubes, or openings may be used for access ports instead of the simple top and bottom configuration shown. For example, one valve 2408 or additional valves (not shown) may be used as access ports for any of input, output, redundancy, and/or safety measures of the extraction material and/or generator. In a simple configuration, the generator 2400 may have only one access port such as a bottle or beaker.

A generator 2400 may be of any shape, both externally and internally in the source material chamber. For example, the generator 2400 may take any shape including capsule-shaped (spherocylindrical) as illustrated, cylindrical, spherical, conical, pyramidal, frustoconical, or frustopyramidal, to name but a few.

Any number, type, and configuration of access ports, valves, shackles, connectors, contact points, or other ancillary components may be used as desired. For example, in the example shown a diffuser 2412 is provided so that the generator may be readily used as a fluidized bed or packed bed contacting reactor. In the example, the diffuser is in the form of a perforated plate with perforations sized such that the source material (such as the particulate matter) is prevented or reduced from passing through it. Solvent introduced from the bottom valve 2410, however, passes readily through the diffuser 2412 allowing contact with the source material. This is but one example of ancillary components that could be provided on the generator. For example, many different fluidized bed reactor designs could be incorporated into a generator having additional ancillary components such as additional diffusers, manifolds, baffles for distributing solvent flow evenly, non-cylindrical internal shape of the source material chamber/cavity 2414, baffles for directing flow, etc.

Generators may be made with an opening to facilitate the insertion and removal of the physical form of source material to be used. For example, when one or more large masses of source material are used as discussed above, a generator may be provided with a relatively large opening that allow for the insertion and removal of the masses. This would allow generators to be reused after the source material is spent. Alternatively, a generator may be constructed around the source material with the intention that the source material be disposed of with the generator and no provision is made for removing the source material from the generator once the material is sufficiently spent which may reduce waste and/or waste processing.

Figure 25:
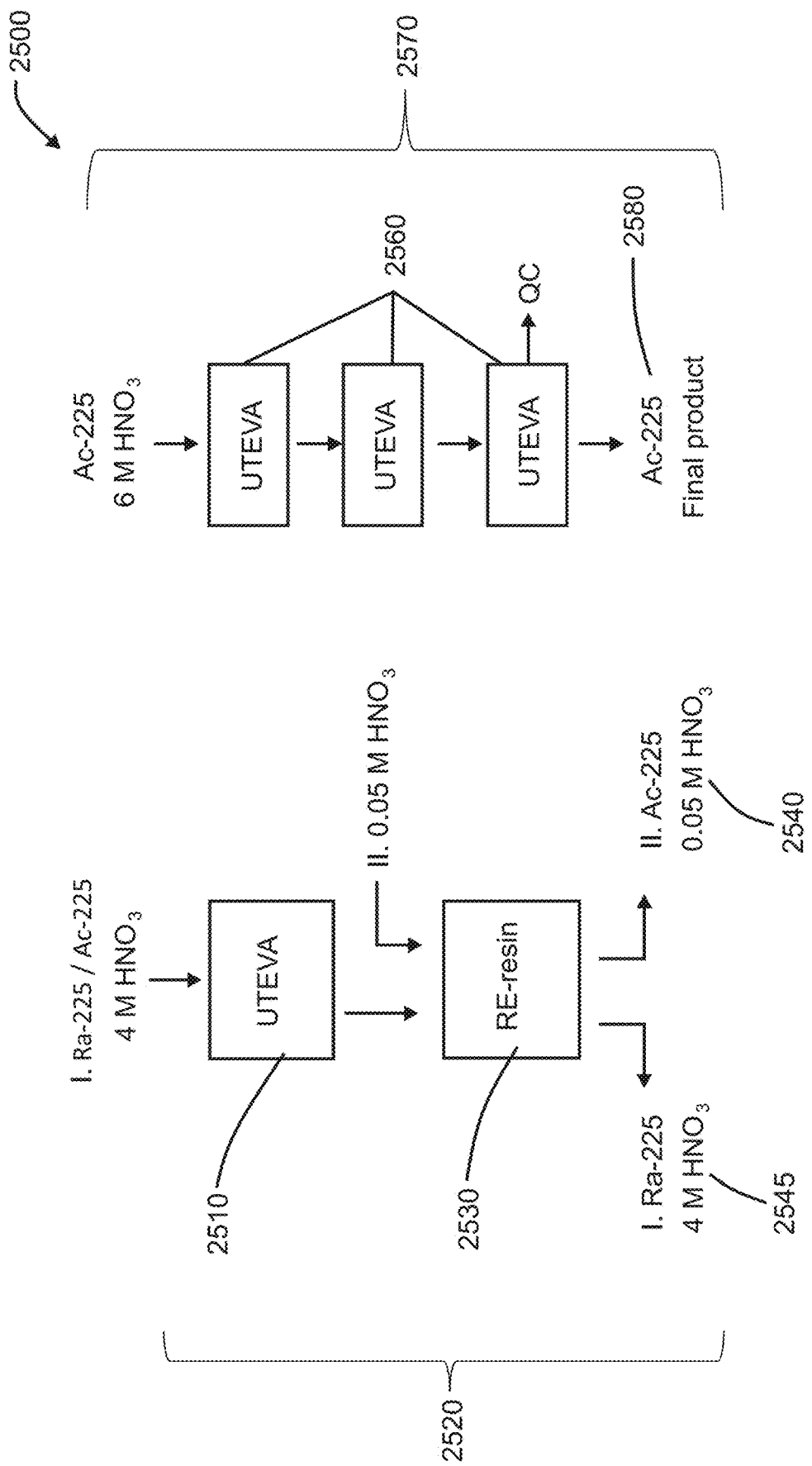
FIG. 25 illustrates another example of a generator in the form of a column filled with IX material.

FIG. 25 illustrates another example of the separation system and method for the separation of $^{225}$Ra ($t_{1/2}$=14.9 days) from $^{225}$Ac ($t_{1/2}$=9.92 days). As illustrated in FIG. 25, the system uses an ion chromatography section 2520 using chromatography resins such as, e.g., UTEVA or Eichrom resins in a first column 2510, as well as rare earth resins in a second column 2530, for the purification of $^{225}$AC.

As an example, the $^{225}$Ra and $^{225}$Ac may be dried and dissolved in 4 M $HNO_3$, or diluted to 4 M $HNO_3$, before passing through ion chromatography section 2520. As an example, the solution may be passed through the UTEVA resin 2510 and then the rare earth (RE) resin 2530. For example, the $^{225}$Ra and $^{225}$AC materials, after passing through the UTEVA resin 2510, may be dissolved in a solution of $HNO_3$ such as, e.g., 0.05 M $HNO_3$. In various examples, after being dissolved in the solution of $HNO_3$, the diluted $^{225}$Ra and $^{225}$AC material may pass through the RE resin 2530, where the $^{225}$Ac may be sorbed on the RE resin 2530 to generate the $^{225}$AC material 2540, and a residual amount of $^{225}$Ra 2545 may be generated. Although the resin 2530 is described as an RE resin, the resin 2530 may also be a DGA resin.

In the ion chromatography section 2520, the $^{225}$Ra and $^{225}$Ac may form anions with nitrate and may sorb to the column 2520. For example, the $^{225}$Ra material 2545 may be diluted in the solution of 4 M $HNO_3$ to separate $^{225}$Ra. Accordingly, the $^{225}$Ra and $^{225}$AC may elute within the volume of the column 2520 and achieve separation. The $^{225}$Ra passes through the ion chromatography section 2520 with the initial 4 M $HNO_3$ while the $^{225}$Ac remains on the RE resin 2530. Although the above example describes a solution of 4 M $HNO_3$, other concentrations of $HNO_3$ may be used such as, e.g., concentrations in a range of 0.1-10 M $HNO_3$.

In examples, the $^{225}$Ac material 2540 may then be rinsed off of the RE resin with 0.05 M HNO$_3$ to remove $^{225}$Ac from the ion chromatography section 2520. The collected $^{225}$AC may then be dried, dissolved in 6 M HNO$_3$, and purified by treatment by passing through three (3) UTEVA resin columns 2560 in polishing section 2570 to generate the final product $^{225}$AC 2580. The purified $^{225}$Ac 2580 may then be dried. Although the above example describes a solution of 0.05 M HNO$_3$, other concentrations of HNO$_3$ may be used such as, e.g., concentrations in a range of 0.01-10 M HNO$_3$.

In various examples, the separated $^{225}$Ra 2540 may be rinsed in 4 M HNO$_3$ and allowed to decay to $^{225}$AC, and the $^{225}$AC separation and purification process discussed above may be repeated. Modifications to this method by the use of other resins with similar properties is anticipated. In addition, more or fewer columns or combinations of columns may be used depending on the embodiment. For example, in an alternative embodiment, the polishing section 2570, instead of being three separate columns 2560, is a single column with three sections of UTEVA resin. Likewise, in an alternative embodiment, the ion chromatography section 2520, instead of being two separate columns 2510 and 2530, is a single column with the UTEVA resin on top of the RE resin.

In various examples, generation of $^{225}$AC may also be performed via the use of thorium hydroxide or peroxide precipitate as the source material instead of using thorium on an IX material as described above. In solutions having a pH of about 5, thorium hydroxide solubility is low while Ra and Ac remain in solution phase. In the case of thorium peroxide, the pH is preferably equal to about 1.5. In an example, the thorium precipitate may be rinsed, and the collected rinsed solution may include Ra, Ac, and trace Th. The solution may then be dried and dissolved in 8 M HNO$_3$. As in the $^{225}$AC separation system 2500 described above, the solution may be passed through an anion exchange resin to remove the trace Th and the Ra and $^{225}$AC may pass through the resins 2510 and 2530. The $^{225}$AC may then be separated from Ra and purified using the chromatography method described above with respect to FIG. 25.

Figure 26:
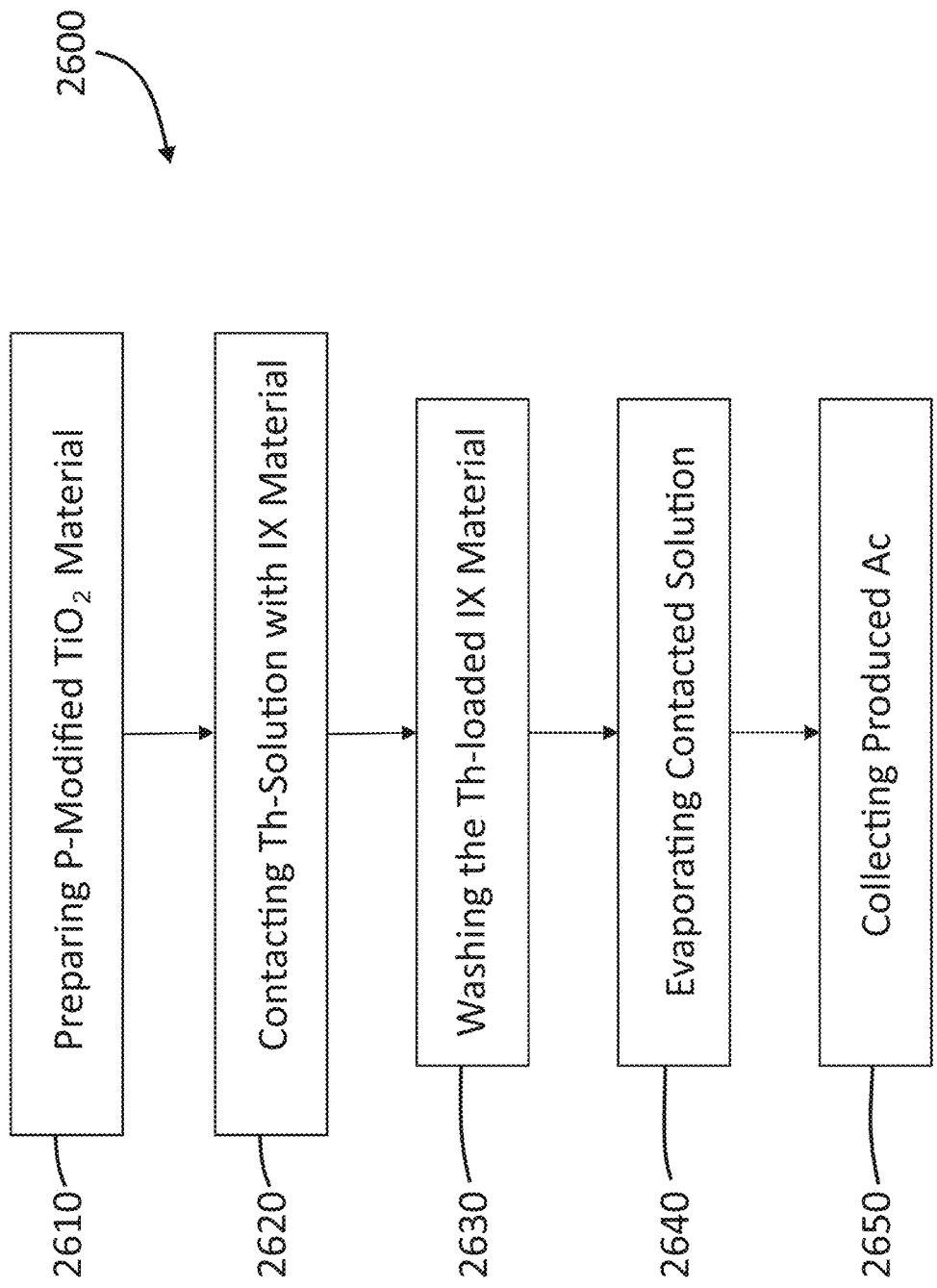
FIG. 26 is a flowchart illustrating a method of producing Ac, according to various examples of the present disclosure.

FIG. 26 is a flowchart illustrating a method of producing Ac, according to various examples of the present disclosure. In FIG. 26, the method 2600 includes a series of operations 2610-2650, according to various principles of the present disclosure. In operation 2610, a phosphate-modified titania material such as, e.g., TiO$_2$, is prepared. Operation 2610 is described in greater detail with reference to FIG. 27 below.

In operation 2620, a thorium-containing stock solution is contacted with an ion-exchange material. For example, the ion-exchange material includes a titania material such as, e.g., TiO$_2$, or porous TiO$_2$. In another example, the thorium-containing solution is the result of a thorium purification process and includes any one or more of, e.g., NaNO$_3$, HOA, NaOA and HNO$_3$. In another example, the thorium-containing solution is contacted with the titania material in a column that includes the titania material. In another example, the flow rate of the thorium-containing solution in the column when contacting the titania material is in a range of 2-10 mL/h. In yet another example, at least some of the $^{229}$Th is sorbed onto the titania material.

In another example of operation 2620, the thorium-containing solution is contacted with a phosphorous-modified titania material such as, e.g., phosphorous-modified TiO$_2$, or phosphorous-modified porous TiO$_2$. The result of operation 2620 is a thorium-loaded titania material. Over time, some of the thorium will decay into daughter products, thus continuously generating $^{225}$Ac. As discussed above and without being bound to any particular theory, the generated actinium does not appear to be bound to the titania as the thorium parent was and, thus, is in a form that is available to be eluted from the titania material with a simple washing step.

During operation 2630, the thorium-loaded titania material, after is eluted with a wash solution to produce an eluant containing $^{225}$Ac. For example, the elution speed of the wash solution is in a range of 30-60 mL/h. In another example, the eluant used during operation 2630 includes, e.g., a HOA/NaOA solution.

During operation 2640, the eluant containing $^{225}$Ac obtained from operation 2630, which may also be referred to as the $^{225}$AC solution, is dried in order to concentrate eluted compounds, i.e., the $^{225}$AC and any $^{225}$Ra that may also have been washed out. In an example, after the evaporation, the remaining, now concentrated, solution may be passed through a resin such as, e.g., a UTEVA resin, in order to collect any residual thorium left therein such as, e.g., $^{229}$Th. In an example, the Th retention after operation 2640 is in a range equal to or greater than 99.253±0.004%.

During operation 2650, any $^{225}$AC solution that is produced from the elution operation 2630 and the evaporation operation 2650 is collected. For example, the $^{225}$AC is collected by, e.g., separating $^{225}$AC from $^{225}$Ra in the concentrated eluted compounds, and collecting the separated $^{225}$AC from the concentrated eluted compounds. In other examples, operation 2650 also includes collected the separated $^{225}$Ra from the concentrated eluted compounds. In examples, the recovery rate of at least one of $^{225}$Ac or $^{225}$Ra from the concentrated eluted compounds is greater than 96%.

Figure 27:
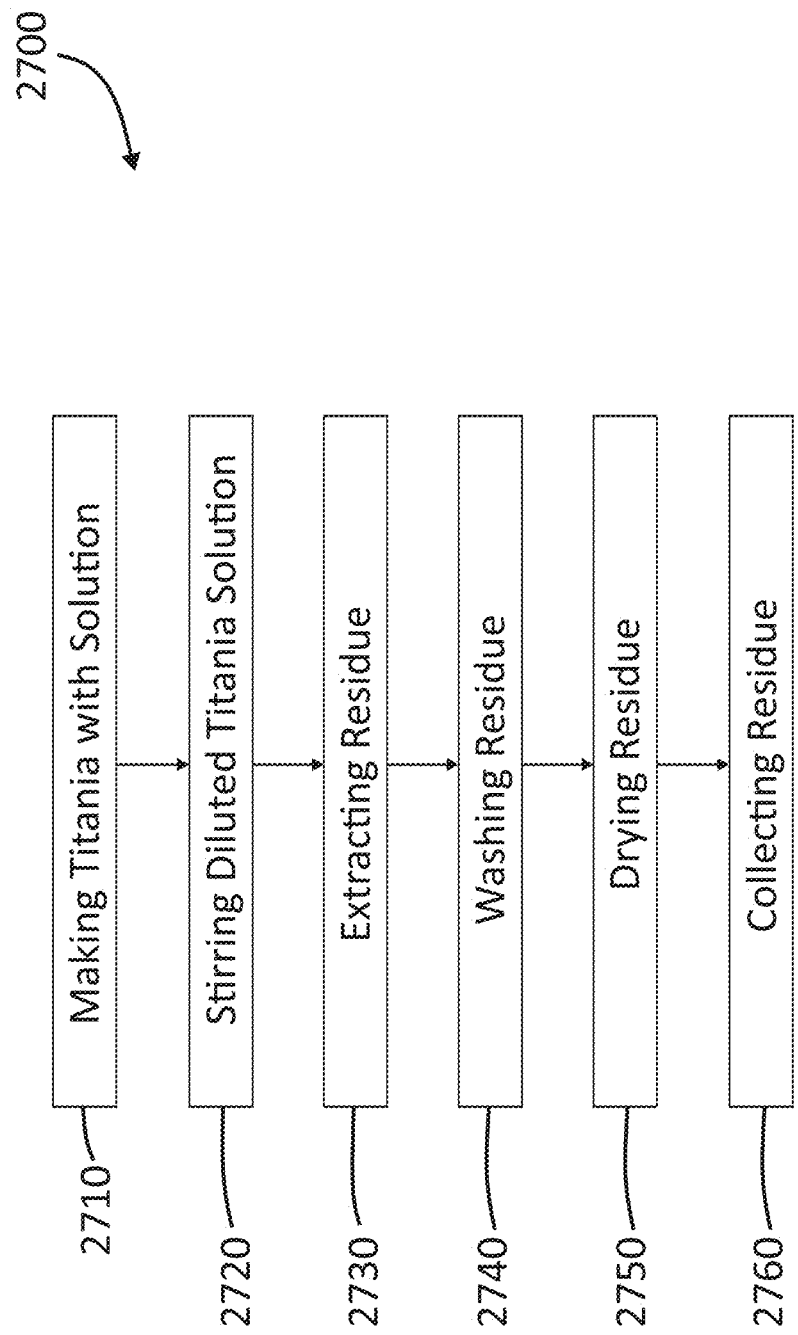
FIG. 27 is a flowchart illustrating a method of preparing a phosphate-modified titania material, according to various examples of the present disclosure.

FIG. 27 is a flowchart illustrating a method of preparing a phosphate-modified titania material, according to various examples of the present disclosure. In FIG. 27, the method 2700 includes operation 2710 during which a titania material such as, e.g., TiO$_2$, is mixed with a solution to produce a diluted titania solution, also referred to herein as slurry to remind the reader that the titania remains a solid during the process in a heterogeneous mixture with solid in contact with the reactant solution of diluted phosphoric acid and the titania is never actually dissolved per se. In other examples, the titania material may be or include porous TiO$_2$. For example, the solution may be or include H$_3$PO$_4$. In other examples, the solution may be or include H$_3$PO$_4$ at a 1 M concentration. In another example, about 1.0 g of titania is mixed with about 125 ml of the solution.

In various examples, operation 2720 includes stirring the diluted titania solution, or slurry, that is produced from the mixing of the titania material with the solution. For example, the diluted titania solution is stirred using, e.g., a rotating rod, the rotating rod rotating at a speed of, e.g., 300 rpm, or 800 rpm, or in a range of 300 rpm to 800 rpm. In other examples, the diluted titania solution is stirred for a duration of 5 h, 16 h, 21 h or 45 h. For example, the diluted titania solution is stirred using, e.g., a rotating rod, the rotating rod rotating at a speed of, e.g., 300 rpm, or 800 rpm, or in a range of 300 rpm to 800 rpm, and for a duration of 5 h, 16 h, 21 h or 45 h. In further examples, the diluted titania solution is stirred at room temperature, at a temperature of 80° C., or at a temperature in a range of room temperature and 80° C. In yet other examples, the diluted titania solution is stirred using, e.g., a rotating rod, the rotating rod rotating at a speed of, e.g., 300 rpm, or 800 rpm, or in a range of 300 rpm to 800 rpm, for a duration of 5 h, 16 h, 21 h or 45 h, and at a temperature of 80° C., or at a temperature in a range of room temperature and 80° C. Although the above durations of 5 h, 16 h, 21 h or 45 h have been described, other durations may also be used. For example and as discussed above, the durations may be in the range of 5-50 h In an example, operation 2730 includes extracting a residue from the diluted titania solution or slurry by decanting the residue. For example, during operation 2730, the residue is extracted by settling the diluted titania solution. As another example, the residue is extracted by settling the diluted titania solution for a duration of about an hour. Other methods of separating the solid titania from the liquid residue are also possible and any suitable method may be used.

In another example, operation 2740 includes washing the residue to produce a washed phosphate-modified titania. For example, the residue is washed one or more times in, e.g., deionized water. As another example, the residue is washed one or more times in, e.g., 10 ml of deionized water or in a volume of deionized water in a range of 1-100 ml.

In another example, operation 2750 includes drying the washed phosphate-modified titania to produce a dried phosphate-modified titania. For example, the residue is dried by being placed on a heating device such as, e.g., a hot plate. As another example, the residue is dried by being placed on a heating device such as, e.g., a hot plate, at a temperature of, e.g., 100° C., or in a range of 50-150° C. As yet another example, the residue is dried by being placed on a heating device such as, e.g., a hot plate, at a temperature of, e.g., 100° C. for a period of e.g., one hour. During operation 2760, the dried reside is collected, the dried phosphate-modified titania being or including phosphate-modified titania. When the titania is porous titania, then the dried phosphate-modified titania being or including phosphate-modified porous titania.

Various examples of the disclosure may be described via the following clauses:

1. A method of producing Ac, the method comprising:
   preparing a phosphate-modified titania material to produce an ion-exchange material;
   contacting a solution including $^{229}$Th with the ion-exchange material to produce a thorium-loaded ion-exchange material and a contacted solution;
   eluting the thorium-loaded ion-exchange material with a wash solution to produce an eluted solution of $^{225}$AC; and
   concentrating the eluted solution to generate eluted compounds; and
   separating the $^{225}$Ac from other radioisotopes in the eluted compounds.
2. The method of clause 1, wherein preparing the phosphate-modified titania material comprises:
   mixing titania with a phosphate solution to produce a diluted titania solution;
   stirring the diluted titania solution;
   extracting a phosphate-modified titania from the diluted titania solution by decanting the phosphate solution;
   washing the phosphate-modified titania to produce a washed phosphate-modified titania; and
   drying the washed phosphate-modified titania to produce a dried phosphate-modified titania.
3. The method of clause 1 or 2, wherein the phosphate solution comprises $H_3PO_4$.
4. The method of any one of clauses 1-3, wherein the phosphate solution comprises one of 1.0 M $H_3PO_4$, a range of 0.1-0.5 M $H_3PO_4$, a range of 1-5 M $H_3PO_4$, and a range of 5-10 M $H_3PO_4$.
5. The method of any one of clauses 1-4, wherein stirring the diluted titania solution comprises stirring the diluted titania solution at a speed in a range of 10 rpm-2000 rpm.
6. The method of any one of clauses 1-5, wherein stirring the diluted titania solution comprises stirring the diluted titania solution for a duration in a range of 0.1-100 h.
7. The method of any one of clauses 1-6, wherein stirring the diluted titania solution comprises stirring the diluted titania solution at temperature in a range of 10-100° C.
8. The method of any one of clauses 1-7, wherein extracting the phosphate-modified titania comprises settling the diluted titania solution.
9. The method of any one of clauses 1-8, wherein extracting the phosphate-modified titania comprises settling the diluted titania solution for an hour.
10. The method of any one of clauses 1-9, wherein washing the phosphate-modified titania comprises washing the phosphate-modified titania one or more times in deionized water.
11. The method of any one of clauses 1-10, wherein washing the phosphate-modified titania comprises washing the phosphate-modified titania one or more times in 1-100 ml of deionized water.
12. The method of any one of clauses 1-11, wherein drying the washed phosphate-modified titania comprises placing the washed reside on a heating device.
13. The method of any one of clauses 1-12, wherein drying the washed phosphate-modified titania comprises placing the washed reside on a heating device at a temperature in a range of 50-150° C.
14. The method of any one of clauses 1-13, wherein drying the washed phosphate-modified titania comprises placing the washed reside on a heating device at a temperature in a range of 50-150° C. for a period of one hour.
15. The method of any one of clauses 1-14, wherein mixing titania comprises mixing about 1.0 g of titania with about 125 ml of the solution.
16. The method of any one of clauses 1-15, wherein the solution has a pH in a range of 3.6 to 4.3.
17. The method of any one of clauses 1-16, wherein the solution is a result of a Th purification process and comprises at least one of $NaNO_3$, HOA, NaOA, or $HNO_3$.
18. The method of any one of clauses 1-17, wherein contacting the solution comprises contacting the solution with the phosphate-modified titania material in a column that comprises the phosphate-modified titania material.
19. The method of any one of clauses 1-18, wherein a column flow rate is in a range of 2-10 mL/h.
20. The method of any one of clauses 1-19, wherein the titania material comprises porous $TiO_2$.
21. The method of any one of clauses 1-20, wherein an elution speed of the wash solution is in a range of 30-60 mL/h.
22. The method of any one of clauses 1-21, further comprising evacuating a residual solution that includes $^{229}$Th out of the column before contacting the column.
23. The method of clause any one of clauses 1-22, wherein evacuating the residual solution comprises:
   drying the residual solution to create a solid residue;
   eluting the solid residue with an eluting solution to produce an eluted residue;
   passing the eluted residue through a recovering resin to recover $^{229}$Th; and
   recovering $^{229}$Th.

24. The method of any one of clauses 1-23, wherein eluting solution comprises $HNO_3$.

25. The method of any one of clauses 1-24, wherein eluting solution comprises $HNO_3$ in a range of 0.01-10 M.

26. The method of any one of clauses 1-25, wherein the recovering resin comprises a UTEVA resin.

27. The method of any one of clauses 1-26, wherein recovering $^{229}$Th comprises recovering $^{229}$Th at a rate equal to or greater than 99.253±0.004%.

28. The method of any one of clauses 1-27, wherein contacting the solution with the ion-exchange material comprises contacting the solution with the ion-exchange material in a column.

29. The method of any one of clauses 1-28, wherein contacting the solution with the ion-exchange material comprises sorbing the $^{229}$Th onto the titania material to produce a Th-loaded material.

30. The method of any one of clauses 1-29, wherein the eluting comprises using an eluant comprising a HOA/NaOA solution.

31. The method of any one of clauses 1-30, wherein collecting the produced $^{225}$AC comprises:
separating $^{225}$AC from $^{228}$Ra in the concentrated eluted compounds; and
collecting at least one of the separated $^{225}$AC or the separated $^{228}$Ra from the concentrated eluted compounds.

32. The method of any one of clauses 1-31, wherein collecting at least one of the separated $^{225}$Ac or the separated $^{228}$Ra comprises collecting at least one of the separated $^{225}$AC or the separated $^{228}$Ra at a collecting rate greater than 96%.

33. The method of any one of clauses 1-32, wherein the P-modified titania material has an average particle size in a range of 5-100 µm.

34. A method for separating Ac from a Ra/Ac mixture, the method comprising:
concentrating the Ra/Ac mixture in a first solution;
passing the Ra/Ac mixture through a first resin;
adding a second solution;
passing the Ra/Ac mixture through a second resin; and
separating Ra from Ac to produce separated Ra and separated Ac.

35. The method of clause 34, wherein the first solution comprises $HNO_3$.

36. The method of clause 34 or 35, wherein the first solution comprises $HNO_3$ at a concentration in a range of 0.1-10 M.

37. The method of any one of clauses 34-36, wherein the first resin comprises a UTEVA resin.

38. The method of any one of clauses 34-37, wherein the second solution comprises $HNO_3$.

39. The method of any one of clauses 34-38, wherein the second solution comprises $HNO_3$ at a concentration in a range of 0.01-10 M.

40. The method of any one of clauses 34-39, wherein the second resin comprises a rare earth resin.

41. The method of any one of clauses 34-40, further comprising drying the separated Ra and the separated Ac to produce a dried Ra and a first dried Ac.

42. The method of any one of clauses 34-41, further comprising diluting the dried Ra and the first dried Ac to produce a diluted Ra and a first diluted Ac, respectively.

43. The method of any one of clauses 34-42, wherein diluting the dried Ra comprises adding a third solution to the dried Ra.

44. The method of any one of clauses 34-43, wherein the third solution comprises $HNO_3$.

45. The method of any one of clauses 34-44, wherein the third solution comprises $HNO_3$ at a concentration in a range of 0.1-10 M.

46. The method of any one of clauses 34-45, wherein diluting the first dried Ac comprises adding a fourth solution to the first dried Ac to produce the first diluted Ac.

47. The method of any one of clauses 34-46, wherein the fourth solution comprises $HNO_3$.

48. The method of any one of clauses 34-47, wherein the fourth solution comprises $HNO_3$ at a concentration in a range of 0.01-10 M.

49. The method of any one of clauses 34-48, further comprising:
drying the first diluted Ac to produce a second dried Ac; and
diluting the second dried Ac in a fifth solution to produce a second diluted Ac.

50. The method of any one of clauses 34-49, wherein the fifth solution comprises $HNO_3$.

51. The method of any one of clauses 34-50, wherein the fifth solution comprises 6 M $HNO_3$.

52. The method of any one of clauses 34-51, further comprising:
passing the second diluted Ac through one or more third resins; and
collecting the Ac to produce a collected Ac as a final product.

53. The method of any one of clauses 34-52, wherein the one or more third resins comprise one or more UTEVA resins.

54. The method of any one of clauses 34-53, wherein the collected Ac comprises $^{225}$Ac.

55. An Ac producing generator, comprising:
a first portion of the generator;
a column body defining an interior chamber;
a first access port at the first portion of the generator providing access to the interior chamber; and
a phosphate-modified titania material within the interior chamber, the phosphate-modified titania material loaded with an amount of $^{229}$Th.

56. The generator of clause 55, further comprising:
a second portion of the generator; and
a second access port at the second portion of the generator,
wherein:
the first portion of the generator is a top portion of the generator;
the first access port is an upper valve;
the second portion of the generator is a bottom portion of the generator; and
the second access port is a bottom valve or a u-tube.

57. The generator of clause 55 or 56, wherein the interior chamber includes a filter to prevent the phosphate-modified titania material loaded with an amount of $^{229}$Th from removal via at least one of the first access port or the second access port.

58. The generator of any one of clauses 55-57, wherein the column body is one of capsule-shaped (spherocylindrical), cylindrical, spherical, conical, pyramidal, frustoconical, or frustopyramidal.

59. The generator of any one of clauses 55-58, wherein the first portion and the second portion form a seal to the internal chamber.

60. The generator of any one of clauses 55-59, wherein the first portion and the second portion are removably attached to the column body.

61. The generator of any one of clauses 55-60, wherein the first portion, the column body and the second portion are integrally formed.

62. The generator of any one of clauses 55-61, further comprising a third sealable access port.

63. The generator of any one of clauses 55-62, further comprising a diffuser in the second portion.

64. The generator of any one of clauses 55-63, wherein the diffuser comprises a perforated plate including perforations, the perforations have sizes configured to prevent passage of the phosphate-modified titania material therethrough.

65. The generator of any one of clauses 55-64, wherein the perforations are configured to allow a solvent to pass therethrough.

66. A system for separating Ra and Ac from a Ra/Ac mixture, the system comprising:
   a first separating column including a first resin and a second resin in separate portions of a first internal chamber thereof; and
   a second separating column including a plurality of second resins in separate portions of a second internal chamber thereof.

67. The system of clause 66, wherein the first resin comprises a UTEVA resin.

68. The system of clause 66 or 67, wherein the second resin comprises a rare earth resin.

69. The system of any one of clauses 66-68, wherein the first separating column comprises a first sealable access port configured to allow adding and removal of Ra/Ac mixture and of the first resin.

70. The system of any one of clauses 66-69, wherein the second separating column comprises a second sealable access port configured to allow adding and removal of dried Ra residue, dried Ac residue, or the second resin.

71. An Ac producing generator, comprising:
   a first portion of the generator;
   a first fluid valve at the first portion of the generator;
   a column body defining an interior chamber; a phosphate-modified titania material within the interior chamber, the phosphate-modified titania material loaded with an amount of $^{229}$Th;
   a first separating column including a first resin and a second resin in separate portions of a first internal chamber thereof; and
   a second separating column including a plurality first resins in separate portions of a second internal chamber thereof.

72. A method of preparing an Ac producing generator, the method comprising:
   cycling a preconditioning solution in a column containing titania material at a predetermined cycling rate for a predetermined duration of time;
   after the cycling, loading a Th material onto the titania material in the column at a predetermined loading rate to obtain a Th-loaded titania material; and
   washing the Th-loaded titania material at a predetermined washing rate.

73. The method of clause 72, wherein the preconditioning solution comprises at least one of acetic acid (HOA) or sodium acetate (NaOA).

74. The method of clause 72 or 73, wherein the preconditioning solution comprises at least one of 0.1 M HOA or 0.1 M NaOA.

75. The method of one of clauses 72-74, wherein the preconditioning solution comprises at least one of 0.25 M HOA or 0.25 M NaOA.

76. The method of one of clauses 72-75, wherein the predetermined cycling rate is equal to one of 60 ml/h or 300 ml/h.

77. The method of any one of clauses 73-76, wherein the acetic acid has a pKa of 4.2.

78. The method of any one of clauses 72-77, wherein a Th retention rate in the Th-loaded titania material is in a range of 97.00-99.99%.

79. The method of any one of clauses 72-78, wherein the column comprises one of 5 g, 51.6 g or a within a range of 5 g to 1000 g of $TiO_2$.

80. The method of any one of clauses 72-79, wherein a pH of the preconditioning solution is in a range of 3.6 to 4.3.

81. The method of any one of clauses 72-80, wherein a loading rate of the Th material is one of 2 ml/h and 10 ml/h.

82. The method of any one of clauses 72-81, wherein the predetermined washing rate is one of 2 ml/h and 10 ml/h.

83. The method of any one of clauses 72-82, wherein the predetermined loading rate and the predetermined washing rate are equal.

84. The method of any one of clauses 72-83, wherein loading the Th material in the column comprises loading 0.096 g of Th in 10 ml of the preconditioning solution.

85. The method of any one of clauses 72-84, wherein loading the Th material in the column comprises loading one of 0.092 g and 0.098 g of Th in 20 ml of the preconditioning solution.

86. The method of any one of clauses 72-85, wherein loading the Th material in the column comprises loading 1.005 g of Th in 500 ml of the preconditioning solution.

87. The method of any one of clauses 72-86, wherein the predetermined duration of time is about 6 h.

88. A pharmaceutical composition comprising the $^{225}$AC generated by any of the above clauses.

89. The pharmaceutical composition of clause 88 further comprising:
   a pharmaceutically acceptable carrier.

90. The pharmaceutical composition of clauses 88-89, wherein the $^{225}$AC is conjugated to an antibody.

91. A method of treating cancer in a patient comprising administering to the patient the pharmaceutical composition of any of clauses 88-90.

92. The method of clause 91, wherein the cancer is breast cancer, a leukemia, a lymphoma, brain cancer, liver cancer, lung cancer, melanoma, ovarian cancer, prostate cancer, pancreatic cancer, or bone cancer.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the examples are reported as precisely as possible. Any numerical value, however, inherently contain certain errors necessarily resulting from the standard deviation found in their respective testing measurements.

It will be clear that the systems and methods described herein are well adapted to attain the ends and advantages discussed as well as those inherent therein. Those skilled in the art will recognize that the methods and systems within this specification may be implemented in many manners and as such are not to be limited by the foregoing exemplified examples and examples. In this regard, any number of the features of the different examples described herein may be combined into one single example and alternate examples having fewer than or more than all of the features herein described are possible.

While various examples have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

This disclosure described some examples of the present technology with reference to the accompanying drawings, in which only some of the possible examples are shown. Other aspects can, however, be embodied in many different forms and should not be construed as limited to the examples set forth herein. Rather, these examples are provided so that this disclosure is thorough and complete and fully conveyed the scope of the possible examples to those skilled in the art.

Although specific examples are described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A method of producing Ac, the method comprising:
   preparing a phosphate-modified titania material to produce an ion-exchange material;
   contacting a starting solution including $^{229}$Th with the ion-exchange material to produce a thorium-loaded ion-exchange material and a contacted solution;
   eluting the thorium-loaded ion-exchange material with a wash solution to produce an eluted solution of $^{225}$Ac; and
   concentrating the eluted solution to generate eluted compounds; and
   separating the $^{225}$Ac from other radioisotopes in the eluted compounds.

2. The method of claim 1, wherein preparing the phosphate-modified titania material comprises:
   mixing titania with a phosphate solution to produce a diluted titania solution;
   stirring the diluted titania solution;
   extracting a phosphate-modified titania from the diluted titania solution by decanting the phosphate solution;
   washing the phosphate-modified titania to produce a washed phosphate-modified titania; and
   drying the washed phosphate-modified titania to produce a dried phosphate-modified titania.

3. The method of claim 2, wherein the phosphate solution comprises $H_3PO_4$.

4. The method of claim 3, wherein the phosphate solution comprises one of 1.0M $H_3PO_4$, a range of 0.1-0.5M $H_3PO_4$, a range of 1-5M $H_3PO_4$, and a range of 5-10M $H_3PO_4$.

5. The method of claim 2, wherein stirring the diluted titania solution comprises stirring the diluted titania solution at a speed in a range of 10 rpm-2000 rpm for a duration in a range of 0.1-100h and at temperature in a range of 10-100° C.

6. The method of claim 1, wherein contacting the starting solution including $^{229}$Th comprises contacting the starting solution with the phosphate-modified titania material in a column containing the phosphate-modified titania material.

7. The method of claim 6, further comprising evacuating a residual solution that includes $^{229}$Th out of the column before contacting the column.

8. The method of claim 7, wherein evacuating the residual solution comprises:
   drying the residual solution to create a solid residue;
   eluting the solid residue with an eluting solution to produce an eluted residue;
   passing the eluted residue through a recovering resin to recover $^{229}$Th; and
   recovering $^{229}$Th.

9. The method of claim 8, wherein the eluting solution comprises $HNO_3$.

10. The method of claim 9, wherein the eluting solution comprises $HNO_3$ in a range of 0.01-10M.

11. The method of claim 8, wherein the recovering resin comprises Uranium and Tetravalent Actinides resin.

12. The method of claim 8, wherein recovering $^{229}$Th comprises recovering $^{229}$Th at a rate equal to or greater than 99.253±0.004%.

13. The method of claim 8, wherein the eluting the solid residue comprises using an eluant comprising a HOA/NaOA solution.

14. The method of claim 1, wherein separating the produced $^{225}$Ac comprises:
   separating $^{225}$Ac from $^{228}$Ra; and
   collecting the separated $^{225}$Ac to obtain a $^{225}$Ac product.

15. An $^{225}$Ac producing generator, comprising:
   a first portion of the generator;
   a column body defining an interior chamber;
   a first access port at the first portion of the generator providing access to the interior chamber; and
   a phosphate-modified titania material within the interior chamber, the phosphate-modified titania material loaded with an amount of $^{229}$Th.

16. The method of claim 1, wherein preparing a phosphate-modified titania material comprises preparing phosphate-modified titania particles.

* * * * *